(12) United States Patent
Anderson et al.

(10) Patent No.: US 9,726,155 B2
(45) Date of Patent: Aug. 8, 2017

(54) CONCENTRATED SOLAR POWER GENERATION USING SOLAR RECEIVERS

(75) Inventors: Bruce N. Anderson, Great Falls, VA (US); William Dean Treece, La Mesa, CA (US); Dan Brown, Lebanon, NH (US); Florian Bennhold, Osnabruk (DE); Christoph Hilgert, Odenthal (DE)

(73) Assignee: Wilson Solarpower Corporation, Great Falls, VA (US)

( * ) Notice: Subject to any disclaimer, the term of this patent is extended or adjusted under 35 U.S.C. 154(b) by 0 days.

(21) Appl. No.: 13/823,013

(22) PCT Filed: Sep. 16, 2011

(86) PCT No.: PCT/US2011/052051
§ 371 (c)(1),
(2), (4) Date: Jul. 29, 2013

(87) PCT Pub. No.: WO2012/037532
PCT Pub. Date: Mar. 22, 2012

(65) Prior Publication Data
US 2013/0298557 A1     Nov. 14, 2013

Related U.S. Application Data

(60) Provisional application No. 61/383,561, filed on Sep. 16, 2010, provisional application No. 61/383,570, (Continued)

(51) Int. Cl.
*F24J 2/07*     (2006.01)
*F24J 2/46*     (2006.01)
(Continued)

(52) U.S. Cl.
CPC ............... *F03G 6/06* (2013.01); *F02C 1/04* (2013.01); *F02C 1/08* (2013.01); *F24J 2/05* (2013.01);
(Continued)

(58) Field of Classification Search
CPC ..... F24J 2/07; F24J 2/4649; F24J 2/05; Y02E 10/41; Y02E 10/46; Y02E 10/44; F03G 6/06; F02C 1/04; F02C 1/08
(Continued)

(56) References Cited

U.S. PATENT DOCUMENTS 608,755 A     8/1898  Cottle
2,680,565 A   6/1954  Lof
(Continued)

FOREIGN PATENT DOCUMENTS

CN     1161741 A     10/1997
CN     1821679 A     8/2006
(Continued)

OTHER PUBLICATIONS

[No Author Listed], High Concentration Solar Receiver. Rotemi Industries, Ltd. 2007.
(Continued)

*Primary Examiner* — Mark Laurenzi
*Assistant Examiner* — Wesley Harris
(74) *Attorney, Agent, or Firm* — Wolf, Greenfield & Sacks, P.C.

(57) ABSTRACT

Inventive concentrated solar power systems using solar receivers, and related devices and methods, are generally described. Low pressure solar receivers are provided that function to convert solar radiation energy to thermal energy of a working fluid, e.g., a working fluid of a power generation or thermal storage system. In some embodiments, low pressure solar receivers are provided herein that are useful in (Continued)

conjunction with gas turbine based power generation systems.

16 Claims, 26 Drawing Sheets

Related U.S. Application Data filed on Sep. 16, 2010, provisional application No. 61/383,608, filed on Sep. 16, 2010, provisional application No. 61/383,619, filed on Sep. 16, 2010, provisional application No. 61/383,631, filed on Sep. 16, 2010, provisional application No. 61/383,598, filed on Sep. 16, 2010.

(51) Int. Cl.
  *F24J 2/05* (2006.01)
  *F03G 6/06* (2006.01)
  *F02C 1/04* (2006.01)
  *F02C 1/08* (2006.01)

(52) U.S. Cl.
  CPC ............... *F24J 2/07* (2013.01); *F24J 2/4649* (2013.01); *Y02E 10/41* (2013.01); *Y02E 10/44* (2013.01); *Y02E 10/46* (2013.01)

(58) Field of Classification Search
  USPC ............... 60/641.8–641.15, 650, 682–684; 126/651, 652, 655, 663
  See application file for complete search history.

(56) References Cited

U.S. PATENT DOCUMENTS

| | | |
|---|---|---|
| 2,692,760 A | 10/1954 | Flurschutz |
| 2,925,880 A | 2/1960 | Munters |
| 2,965,361 A | 12/1960 | Schwartz |
| 3,183,649 A | 5/1965 | Teller |
| 3,216,486 A | 11/1965 | Hall et al. |
| 3,216,487 A | 11/1965 | Gallagher |
| 3,369,541 A | 2/1968 | Thomason |
| 3,918,516 A | 11/1975 | Carrasse et al. |
| 3,918,517 A | 11/1975 | Silverstone et al. |
| 3,970,524 A | 7/1976 | Funk |
| 4,011,731 A | 3/1977 | Meckler |
| 4,024,910 A | 5/1977 | Werner |
| 4,057,102 A | 11/1977 | Guillot |
| 4,085,590 A | 4/1978 | Powell et al. |
| 4,085,729 A | 4/1978 | Schmidt |
| 4,117,682 A | 10/1978 | Smith |
| 4,121,564 A * | 10/1978 | Schwartz ............... 126/684 |
| 4,135,489 A * | 1/1979 | Jarvinen ............... F24J 2/07 126/648 |
| 4,164,124 A | 8/1979 | Taylor et al. |
| 4,167,856 A * | 9/1979 | Seidel et al. ............... 60/641.14 |
| 4,176,523 A | 12/1979 | Rousseau |
| 4,193,441 A | 3/1980 | Scaringe |
| 4,203,489 A | 5/1980 | Swiadek |
| 4,215,553 A * | 8/1980 | Poirier ............... F02C 1/05 165/104.34 |
| 4,257,477 A | 3/1981 | Maloney |
| 4,259,836 A | 4/1981 | Finckh |
| 4,262,484 A | 4/1981 | Jubb et al. |
| 4,262,653 A | 4/1981 | Holland |
| 4,304,585 A | 12/1981 | Oda et al. |
| 4,312,324 A | 1/1982 | Ross et al. |
| 4,313,304 A * | 2/1982 | Hunt ............... 60/641.8 |
| 4,318,393 A * | 3/1982 | Goldstein ............... F24J 2/07 126/647 |
| 4,347,892 A | 9/1982 | Clyne et al. |
| 4,360,977 A | 11/1982 | Frohbieter |
| 4,373,512 A | 2/1983 | Hirt |
| 4,387,574 A | 6/1983 | Becker et al. |
| 4,394,859 A | 7/1983 | Drost |
| 4,401,103 A | 8/1983 | Thompson |
| 4,403,601 A | 9/1983 | Hunt |
| 4,405,010 A | 9/1983 | Schwartz |
| 4,433,551 A | 2/1984 | Dibrell |
| 4,446,698 A | 5/1984 | Benson |
| 4,449,573 A | 5/1984 | Pettersson et al. |
| 4,485,803 A | 12/1984 | Wiener |
| 4,489,774 A | 12/1984 | Ogawa et al. |
| 4,524,756 A | 6/1985 | Laverman |
| 4,546,758 A | 10/1985 | Ebernard |
| 4,581,897 A | 4/1986 | Sankrithi |
| 4,583,520 A | 4/1986 | Dietrich et al. |
| 4,589,938 A | 5/1986 | Drosdick |
| 4,602,614 A | 7/1986 | Percival et al. |
| 4,627,485 A | 12/1986 | Osborn |
| 4,727,930 A | 3/1988 | Bruckner et al. |
| 4,777,934 A | 10/1988 | De Laquil, III |
| 4,885,216 A | 12/1989 | Naik |
| 4,889,182 A | 12/1989 | Kosters |
| 4,901,787 A | 2/1990 | Zornes |
| 4,942,736 A | 7/1990 | Bronicki |
| 4,945,731 A * | 8/1990 | Parker et al. ............... 60/641.15 |
| 4,947,825 A * | 8/1990 | Moriarty ............... 126/685 |
| 4,953,627 A | 9/1990 | Ito et al. |
| 5,145,011 A | 9/1992 | Seike et al. |
| 5,182,912 A | 2/1993 | Parker et al. |
| 5,234,048 A | 8/1993 | Seike et al. |
| 5,241,824 A | 9/1993 | Parker et al. |
| 5,245,985 A | 9/1993 | Holland |
| 5,245,986 A | 9/1993 | Karni |
| 5,316,072 A | 5/1994 | Seike et al. |
| 5,323,764 A | 6/1994 | Karni et al. |
| 5,397,649 A | 3/1995 | Schienle et al. |
| 5,404,723 A | 4/1995 | Parker et al. |
| 5,417,052 A | 5/1995 | Bharathan et al. |
| 5,421,322 A | 6/1995 | Karni et al. |
| 5,444,972 A | 8/1995 | Moore |
| 5,448,889 A | 9/1995 | Bronicki |
| 5,483,950 A | 1/1996 | Keintzel et al. |
| 5,507,276 A | 4/1996 | Holland |
| 5,529,054 A | 6/1996 | Shoen |
| 5,577,551 A | 11/1996 | Kritzler et al. |
| 5,634,339 A | 6/1997 | Lewis et al. |
| 5,685,289 A | 11/1997 | Yogev |
| 5,796,892 A | 8/1998 | Karni et al. |
| 5,850,831 A | 12/1998 | Marko |
| 5,862,800 A | 1/1999 | Marko |
| 5,873,250 A | 2/1999 | Lewis et al. |
| 5,876,250 A | 3/1999 | Deng |
| 5,894,838 A | 4/1999 | Yogev |
| 5,899,071 A | 5/1999 | Stone et al. |
| 5,931,158 A | 8/1999 | Buck |
| 5,947,114 A | 9/1999 | Kribus et al. |
| 5,979,438 A | 11/1999 | Nakamura |
| 5,979,439 A | 11/1999 | Hoffschmidt et al. |
| 5,997,292 A | 12/1999 | Tanaka et al. |
| 6,000,211 A | 12/1999 | Bellac et al. |
| 6,003,508 A | 12/1999 | Hoffschmidt et al. |
| 6,041,599 A | 3/2000 | Obermoser |
| 6,085,829 A | 7/2000 | Neuhaus et al. |
| 6,099,671 A | 8/2000 | Pearson et al. |
| 6,099,931 A | 8/2000 | Heller et al. |
| 6,188,820 B1 | 2/2001 | Yogev |
| 6,237,337 B1 | 5/2001 | Bronicki et al. |
| 6,321,539 B1 | 11/2001 | Bronicki et al. |
| 6,484,506 B1 | 11/2002 | Bellac et al. |
| 6,510,695 B1 | 1/2003 | Fisher |
| 6,516,794 B2 | 2/2003 | Karni et al. |
| 6,557,804 B1 | 5/2003 | Carroll |
| 6,648,063 B1 | 11/2003 | Andraka et al. |
| 6,668,555 B1 | 12/2003 | Moriarty |
| 6,681,557 B2 | 1/2004 | Wilson |
| 6,694,738 B2 | 2/2004 | Bronicki et al. |
| 6,701,711 B1 | 3/2004 | Litwin |
| 6,708,687 B2 | 3/2004 | Blackmon et al. |
| 6,735,946 B1 | 5/2004 | Otting et al. |
| 6,736,134 B2 | 5/2004 | Marko |
| 6,764,279 B2 | 7/2004 | Meshenky |

(56) References Cited

U.S. PATENT DOCUMENTS

| | | |
|---|---|---|
| 6,814,544 B2 | 11/2004 | Tsukamoto et al. |
| 6,832,485 B2 | 12/2004 | Sugarmen et al. |
| 6,838,485 B1 | 1/2005 | Quintero |
| 6,864,198 B2 | 3/2005 | Merkel |
| 6,886,339 B2 | 5/2005 | Carroll et al. |
| 6,899,097 B1 | 5/2005 | Mecham |
| 6,911,110 B2 | 6/2005 | Blackmon et al. |
| 6,929,056 B2 | 8/2005 | Meshenky et al. |
| 6,931,851 B2 | 8/2005 | Litwin |
| 6,941,759 B2 | 9/2005 | Bellac et al. |
| 6,957,536 B2 | 10/2005 | Litwin et al. |
| 6,968,991 B2 | 11/2005 | Renteria et al. |
| 6,979,911 B2 | 12/2005 | Otting et al. |
| 7,011,086 B2 | 3/2006 | Litwin |
| 7,024,857 B2 * | 4/2006 | Karni et al. ............... 60/641.15 |
| 7,026,722 B1 | 4/2006 | Otting et al. |
| 7,028,481 B1 | 4/2006 | Morrow |
| 7,051,529 B2 | 5/2006 | Murphy et al. |
| 7,055,519 B2 | 6/2006 | Litwin |
| 7,084,518 B2 | 8/2006 | Otting et al. |
| 7,172,016 B2 | 2/2007 | Meshenky et al. |
| 7,191,597 B2 | 3/2007 | Goldman |
| 7,240,675 B2 | 7/2007 | Eickhoff |
| 7,263,992 B2 | 9/2007 | Zhang |
| 7,278,472 B2 | 10/2007 | Meshenky et al. |
| 7,294,316 B2 | 11/2007 | Harada et al. |
| 7,299,633 B2 | 11/2007 | Murphy et al. |
| 7,325,401 B1 | 2/2008 | Kesseli et al. |
| 7,331,178 B2 | 2/2008 | Goldman |
| 7,555,891 B2 | 7/2009 | Muller et al. |
| 7,954,321 B2 | 6/2011 | Shinnar |
| 2002/0073712 A1 | 6/2002 | Kopko |
| 2002/0083946 A1 | 7/2002 | Karni et al. |
| 2003/0145596 A1 | 8/2003 | Noelscher |
| 2004/0083731 A1 | 5/2004 | Lasker |
| 2004/0112374 A1 | 6/2004 | Litwin |
| 2004/0139960 A1 | 7/2004 | Blackmon et al. |
| 2004/0139961 A1 | 7/2004 | Blackmon et al. |
| 2005/0150225 A1 | 7/2005 | Gwiazda et al. |
| 2006/0174866 A1 * | 8/2006 | Zhang .................. F24J 2/07 126/651 |
| 2006/0225729 A1 | 10/2006 | Litwin |
| 2007/0186921 A1 | 8/2007 | Swanepoel |
| 2008/0011290 A1 | 1/2008 | Goldman et al. |
| 2008/0066736 A1 | 3/2008 | Zhu |
| 2008/0072425 A1 | 3/2008 | Whittenberger et al. |
| 2008/0250788 A1 | 10/2008 | Nuel et al. |
| 2008/0276616 A1 | 11/2008 | Flynn et al. |
| 2008/0302314 A1 | 12/2008 | Gonzalez et al. |
| 2008/0308152 A1 | 12/2008 | Grip |
| 2009/0000762 A1 | 1/2009 | Wilson et al. |
| 2009/0107485 A1 | 4/2009 | Reznik et al. |
| 2009/0121495 A1 | 5/2009 | Mills |
| 2009/0133685 A1 | 5/2009 | Pham et al. |
| 2009/0173337 A1 | 7/2009 | Tamaura et al. |
| 2009/0217921 A1 | 9/2009 | Gilon et al. |
| 2009/0241938 A1 | 10/2009 | Arbogast et al. |
| 2009/0241939 A1 | 10/2009 | Heap et al. |
| 2009/0322089 A1 | 12/2009 | Mills et al. |
| 2010/0034690 A1 | 2/2010 | Nishiyama et al. |
| 2010/0176602 A1 | 7/2010 | Shinnar |
| 2011/0277471 A1 | 11/2011 | Shinnar |
| 2011/0314813 A1 | 12/2011 | Cafri et al. |
| 2015/0033740 A1 | 2/2015 | Anderson et al. |

FOREIGN PATENT DOCUMENTS

| | | |
|---|---|---|
| CN | 201488319 U | 5/2010 |
| CN | 201488353 U | 5/2010 |
| CN | 101726116 A | 6/2010 |
| DE | 2401334 A1 | 8/1974 |
| DE | 2939416 A1 | 4/1981 |
| DE | 2945969 A1 | 5/1981 |
| DE | 2948355 | 6/1981 |
| DE | 31 00 090 A1 | 8/1982 |
| DE | 10149806 A1 | 4/2003 |
| DE | 10208487 A1 | 9/2003 |
| DE | 102004026517 B3 | 10/2005 |
| EP | 0151045 A2 | 8/1985 |
| EP | 0364106 B1 | 11/1995 |
| EP | 0960598 A1 | 12/1999 |
| EP | 1610073 A2 | 12/2005 |
| FR | 2 401 334 A1 | 3/1979 |
| GB | 666889 | 2/1952 |
| GB | 917307 | 1/1963 |
| GB | 1255262 | 12/1971 |
| RU | 2253429 C1 | 6/2005 |
| WO | WO 83/00995 A1 | 3/1983 |
| WO | WO 90/12989 A1 | 11/1990 |
| WO | WO 95/35469 A1 | 12/1995 |
| WO | WO 95/35470 A1 | 12/1995 |
| WO | WO 97/11321 A1 | 3/1997 |
| WO | WO 01/61254 A1 | 8/2001 |
| WO | WO 01/96791 A1 | 12/2001 |
| WO | WO 03/021160 A1 | 3/2003 |
| WO | WO 03/021161 A1 | 3/2003 |
| WO | WO 03/104629 A1 | 12/2003 |
| WO | WO 2004/023048 A1 | 3/2004 |
| WO | WO 2005/011503 A1 | 2/2005 |
| WO | WO 2005/071325 A1 | 8/2005 |
| WO | WO 2005/077265 A1 | 8/2005 |
| WO | WO 2006/030441 A2 | 3/2006 |
| WO | WO 2006/061825 A2 | 6/2006 |
| WO | WO 2008/069426 A1 | 6/2008 |
| WO | WO 2008/118980 A1 | 10/2008 |
| WO | WO 2008/153922 A1 | 12/2008 |
| WO | WO 2008/154599 A1 | 12/2008 |
| WO | WO 2009/015388 A2 | 1/2009 |
| WO | WO 2009/027986 A2 | 3/2009 |
| WO | WO 2009/048458 A1 | 4/2009 |
| WO | WO 2009/048479 A1 | 4/2009 |
| WO | WO 2009/101586 A2 | 8/2009 |
| WO | WO 2009/121030 A2 | 10/2009 |
| WO | WO 2009/121987 A1 | 10/2009 |
| WO | WO 2010/004545 A1 | 1/2010 |

OTHER PUBLICATIONS

[No Author Listed], Solgate Solar hybrid has turbine electric power system. European Commission. EUR 21615. Project Report. 2005.

Adkins et al., Heat Pipe Solar Receiver Development Activities at Sandia National Laboratories. The renewable and advanced energy conference for the 21$^{st}$ century conference. Apr. 1999.

Amsbeck et al., Development of a tube receiver for a solar-hybrid microturbine system. 14th Biennial CSP Solarpaces Symposium. 2008.

Bai, One dimensional thermal analysis of silicon carbide ceramic foam used for solar air receiver. Int. J Thermal Sci. Dec. 2010;49(12):2400-2404.

Brower et al., Conceptual design of advanced central receiver power systems. Sanders Associates Inc. proposal submitted by Energy Research and Development Administrations, (ERDA). vol. II. 1979.

Forsberg et al., High-Temperature Liquid-Fluoride-Salt Closed-Brayton-Cycle Solar Power Towers. J. Solar Energy Eng. May 2007;129:141-146.

Gallup, A solarized Brayton engine based on turbo-charger technology and DLR receiver. James Kesseli, Northern Research & Engineering Corp., Woburn, MA. Sandia National Laboratories under US Dept.of Energy contract AC04-78DP00789. 1719-1724. 1994.

Klein et al., Experimental Evaluation of Particle Consumption in a Particle Seeded Solar Receiver. J. Sol Energy Eng. Dec. 2007;130(1):1-8.

Konstandopoulos et al., Hydrosol advanced monolithic reactors for hydrogen generation from solar water splitting. Revue des Energies Renouvelables. 2006;9(3):121-126.

Roger et al., Multiple Air-Jet Window Cooling for High-Temperature Pressurized Volumetric Receivers: Testing, Evaluation, and Modeling. Sol. Energy Eng. Mar. 2006. 128(3):265-274.

(56) References Cited

OTHER PUBLICATIONS

Schwarzbözl et al., Solar Gas Turbine Systems: Design, Cost and Perspectives. Solar Energy. 2006;80;1231-1240.
Office Communication for Chinese Application No. 201180054722.X mailed Mar. 2, 2015.
Office Communication for Chinese Application No. 201180054722.X mailed Dec. 30, 2015.
Invitation to Pay Additional Fees for International Application No. PCT/US2011/052051 mailed Jan. 27, 2012.
International Search Report and Written Opinion for International Application No. PCT/US2011/052051 mailed Apr. 24, 2012.
International Preliminary Report on Patentability for International Application No. PCT/US2011/052051 mailed Mar. 28, 2013.
Invitation to Pay Additional Fees for International Application No. PCT/US2013/031627 mailed Jul. 15, 2013.
International Search Report and Written Opinion for International Application No. PCT/US2013/031627 mailed Nov. 4, 2013.
International Preliminary Report on Patentability for International Application No. PCT/US2013/031627 mailed Oct. 2, 2014.

\* cited by examiner

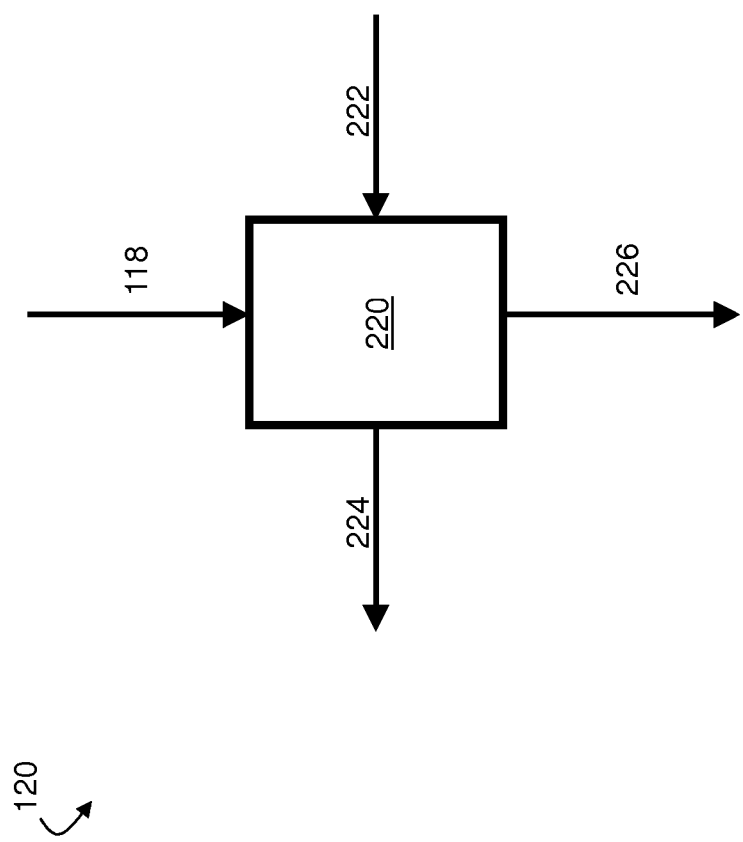

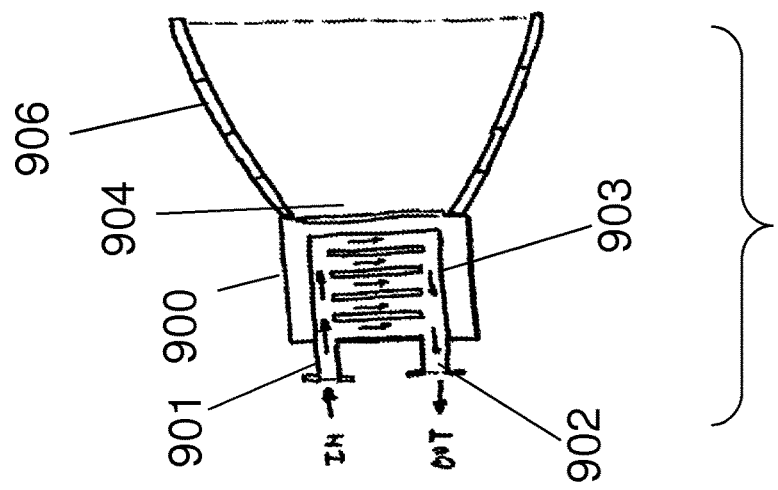
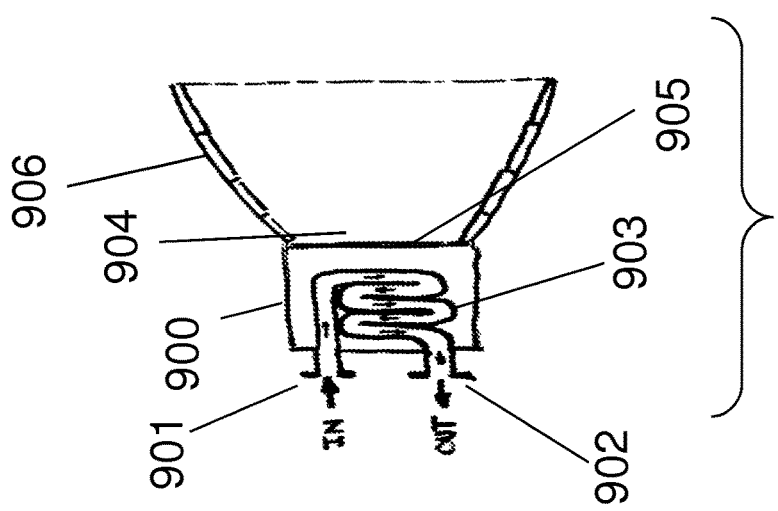
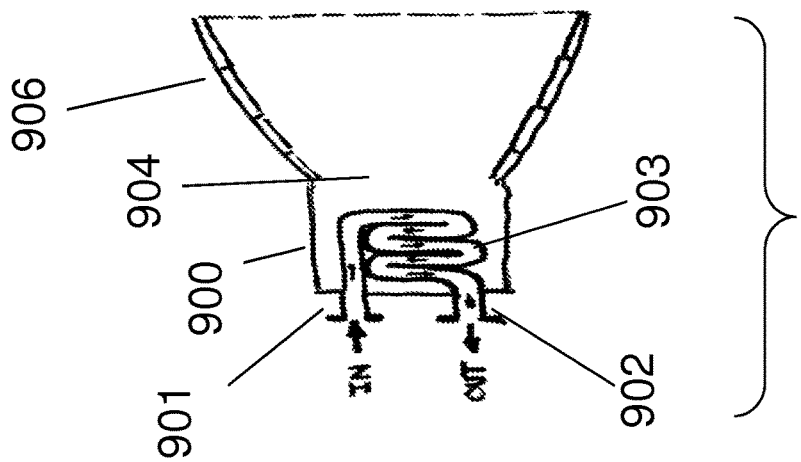

US 9,726,155 B2

CONCENTRATED SOLAR POWER GENERATION USING SOLAR RECEIVERS

RELATED APPLICATIONS

This application is a national stage of International Patent Application No. PCT/US2011/052051, filed Sep. 16, 2011, and entitled "Concentrated Solar Power Generation Using Solar Receivers," which claims priority under 35 U.S.C. §119(e) to U.S. Provisional Patent Application Ser. No. 61/383,561, filed Sep. 16, 2010, and entitled "Brayton Cycle Concentrated Solar Power Generation Using a Low Pressure Solar Receiver;" U.S. Provisional Patent Application Ser. No. 61/383,570, filed Sep. 16, 2010, and entitled "Heat Recovery in a Concentrated Solar Power Generation System;" U.S. Provisional Patent Application Ser. No. 61/383,608, filed Sep. 16, 2010, and entitled "Low Pressure Solar Receivers for Concentrated Solar Power Generation;" U.S. Provisional Patent Application Ser. No. 61/383,619, filed Sep. 16, 2010, and entitled "Secondary Concentrators for Concentrated Solar Power Generation;" U.S. Provisional Patent Application Ser. No. 61/383,631, filed Sep. 16, 2010, and entitled "Solar Power Generation System and Method with Modularized Components;" and U.S. Provisional Patent Application Ser. No. 61/383,598, filed Sep. 16, 2010, and entitled "Concentrated Solar Power Generation Using Pressurized Solar Receivers Comprising Single Crystal Nickel;" each of which is incorporated herein by reference in its entirety for all purposes.

GOVERNMENT SUPPORT

This invention was made with government support under grant DE-EE-0003587 awarded by the Department of Energy. The government has certain rights in the invention.

FIELD OF INVENTION

Systems, devices, and methods related to concentrated solar power generation using solar receivers are generally described.

BACKGROUND

Mounting concerns over the effect of greenhouse gases on global climate have stimulated research focused on limiting greenhouse gas emissions. Solar power generation is particularly appealing because substantially no greenhouse gases are produced at the power generation source.

Concentrated solar power (CSP) generation using solar receivers is known in the art. Briefly, concentrated solar power systems use lenses, mirrors, or other elements to focus sunlight incident on a relatively large area onto a small area called a solar receiver. The concentrated sunlight can be used to heat a fluid within the solar receiver. The fluid heated within the solar receiver can be used to drive a turbine to generate power.

SUMMARY OF THE INVENTION

Inventive concentrated solar power systems using solar receivers, and related devices and methods, are generally described. In some embodiments, the concentrated solar power systems include a low pressure solar receiver. In addition, inventive heat recovery systems and methods for use in concentrated solar power generation systems using solar receivers are generally described.

Inventive solar receivers for use in concentrated solar power systems, and related systems, devices and methods, are also generally described. In some embodiments, low pressure solar receivers are provided that function to convert solar radiation energy to thermal energy of a working fluid, e.g., a working fluid of a power generation or thermal storage system. In some embodiments, the low pressure solar receivers have lower cost of production and significantly larger collection capacity than typical currently available solar receivers.

Inventive concentrators for use in concentrated solar power systems, and related systems, devices and methods, are also generally described. In some embodiments, the concentrators include integrated cooling systems to maintain components of the concentrator at predetermined and/or desired temperatures. In other embodiments, methods for producing concentrators having integrated cooling systems to maintain components parts at predetermined and/or desired temperatures are provided.

Inventive systems and methods related to solar power generation using modular components are also generally described.

Inventive concentrated solar power systems using pressurized solar receivers, and related devices and methods, are also generally described. In some embodiments, the concentrated solar power systems include a solar receiver comprising single crystal nickel.

The subject matter of the present invention involves, in some cases, interrelated products, alternative solutions to a particular problem, and/or a plurality of different uses of one or more systems and/or articles.

In some embodiments of invention, power generation systems are provided. In some embodiments, the power generation systems comprise a solar receiver constructed and arranged to heat a first gas at a pressure of less than or equal to 2 atmospheres; a heat exchanger (e.g., a high temperature heat exchanger) fluidically connected to the solar receiver, constructed and arranged to simultaneously contain the first gas and a second gas at a pressure of above 2 atmospheres and to transfer thermal energy from the first gas to a second gas; and a gas turbine fluidically connected to the solar receiver, constructed and arranged to generate power using the second gas.

In further embodiments of the invention, methods of generating power are provided. In some embodiments, the methods comprise heating a first gas at a pressure of less than or equal to 2 atmospheres in a solar receiver; transferring thermal energy from the first gas to a second gas at a pressure of above 2 atmospheres using a heat exchanger (e.g., a high temperature heat exchanger) fluidically connected to the solar receiver and configured to simultaneously contain the first gas and the second gas; and generating power from the second gas using a gas turbine fluidically connected to the solar receiver.

In some embodiments of the foregoing systems or methods, the heat exchanger (e.g., high temperature heat exchanger) is a ceramic heat exchanger. In some embodiments of the foregoing systems or methods, the heat exchanger is a metallic heat exchanger. In some embodiments of the foregoing systems or methods, an exhaust stream of the gas turbine is directly fluidically connected to the solar receiver. In some embodiments of the foregoing systems or methods, an exhaust stream of the solar receiver is directly fluidically connected to the heat exchanger.

In some embodiments of the foregoing power generation systems or methods of generating power, the pressure of the first gas is less than or equal to 2 atmospheres, less than about 1.5 atmospheres, less than about 1.25 atmospheres or is less than about 1.1 atmospheres, between about 0.9 and about 2 atmospheres, between about 0.9 and about 1.5 atmospheres, between about 0.9 and about 1.25 atmospheres, or between about 0.9 and about 1.1 atmospheres. In some embodiments of the foregoing systems and methods, the pressure of the second gas is above 2 atmospheres, at least about 2.1 atmospheres, at least about 2.25 atmospheres, at least about 2.5 atmospheres, at least about 3 atmospheres, at least about 4 atmospheres, at least about 5 atmospheres, at least about 10 atmospheres, at least about 15 atmospheres, and, in some embodiments, up to 25 atmospheres or up to 50 atmospheres.

In some embodiments of the foregoing power generation systems or methods of generating power, the second gas is transported to the gas turbine after being heated by the heat exchanger. In some embodiments of the foregoing systems or methods, a compressor fluidically connected to the heat exchanger is constructed and arranged to compress a gas to produce the second gas. In some embodiments of the foregoing systems or methods, an exhaust stream of the compressor is directly fluidically connected to the heat exchanger. In some embodiments of the foregoing systems or methods, the gas compressed by the compressor comprises ambient air.

In some embodiments, power generation systems are provided that comprise a solar receiver constructed and arranged to heat a first gas; a heat exchange system comprising first and second heat exchange units fluidically connected to the solar receiver, constructed and arranged to transfer thermal energy from the first gas to a second gas; and a gas turbine fluidically connected to the solar receiver, constructed and arranged to generate power using the second gas.

In some embodiments, methods of generating power are provided that comprise heating a first gas within a solar receiver; transferring thermal energy from the first gas to a second gas within a heat exchange system comprising first and second heat exchange units fluidically connected to the solar receiver; and generating power using the second gas using a gas turbine fluidically connected to the solar receiver.

In some embodiments of the foregoing power generation systems or methods of generating power, the heat exchange system comprises at least one rotary heat exchanger. In certain embodiments, the heat exchange system comprises at least one ceramic rotary heat exchanger. In certain embodiments, the heat exchange system comprises at least one metallic heat exchanger.

In some embodiments of the foregoing power generation systems or methods of generating power, the gas from the solar receiver is transported to a high temperature heat exchanger, and subsequently transported to a lower temperature heat exchanger. In some embodiments of the foregoing systems or methods, an exhaust stream of the gas turbine is directly fluidically connected to the solar receiver.

In some embodiments of the foregoing power generation systems or methods of generating power, the pressure of the first gas is less than or equal to 2 atmospheres, less than about 1.5 atmospheres less than about 1.25 atmospheres, or less than about 1.1 atmospheres between about 0.9 and about 2 atmospheres, between about 0.9 and about 1.5 atmospheres, between about 0.9 and about 1.25 atmospheres, or between about 0.9 and about 1.1 atmospheres. In some embodiments of the foregoing systems or methods, the pressure of the second gas is above 2 atmospheres, at least about 2.1 atmospheres, at least about 2.25 atmospheres, at least about 2.5 atmospheres, at least about 3 atmospheres, at least about 4 atmospheres, or at least about 5 atmospheres, at least about 10 atmospheres, at least about 15 atmospheres, and, in some embodiments, up to 25 atmospheres or up to 50 atmospheres.

In some embodiments of the foregoing power generation systems or methods of generating power, the second gas is transported to the gas turbine after being heated by the heat exchange system. In some embodiments of the foregoing systems or methods, a compressor fluidically connected to the heat exchange system is constructed and arranged to compress a gas to produce the second gas. In some embodiments of the foregoing systems or methods, an exhaust stream of the compressor is directly fluidically connected to the heat exchange system. In some embodiments of the foregoing systems or methods, the gas compressed by the compressor comprises ambient air.

In some aspects of the invention, systems are provided that comprise a solar receiver constructed and arranged to heat a gas at a pressure of less than or equal to 2 atmospheres; a thermal storage system fluidically connected to the solar receiver; and a heat exchange system fluidically connected to the solar receiver. In some embodiments, the heat exchange system is constructed and arranged to transfer thermal energy from the gas heated by the solar receiver to a second gas. In some embodiments, the system is constructed and arranged such that a first portion of the gas heated by the solar receiver can be transported to the low pressure thermal storage system and a second portion of the gas heated by the solar receiver can be transported to the heat exchange system. In some embodiments, the thermal storage system is constructed and arranged to be operated (e.g., heated with a fluid) at a pressure of less than or equal to 2 atmospheres.

In some aspects of the invention, methods are provided that comprise heating a gas at a pressure of less than or equal to 2 atmospheres within a solar receiver; transporting a first portion of the gas from the solar receiver to a thermal storage system fluidically connected to the solar receiver; and transporting a second portion of the gas from the solar receiver to a heat exchange system fluidically connected to the solar receiver. In some embodiments, the heat exchange system is constructed and arranged to transfer thermal energy from the gas heated by the solar receiver to a second gas. In some embodiments, the thermal storage system is constructed and arranged to be operated at a pressure of less than or equal to 2 atmospheres In some embodiments of the foregoing systems or methods, substantially all of the gas from the solar receiver is transported to the thermal storage system over a first period of time, and substantially all of the gas from the solar receiver is transported to the heat exchange system over a second period of time that does not overlap with the first period of time.

In some embodiments of the foregoing systems or methods, a first portion of the gas from the solar receiver is transported to the thermal storage system over a first period of time, and a second portion of the gas from the solar receiver is transported to the heat exchange system over the first period of time.

In some embodiments of the foregoing systems or methods, the thermal storage system is constructed and arranged to be operated at a pressure of less than or equal to 2 atmospheres, less than about 1.5 atmospheres, less than about 1.25 atmospheres, or less than about 1.1 atmospheres between about 0.9 and about 2 atmospheres, between about 0.9 and about 1.5 atmospheres, between about 0.9 and about 1.25 atmospheres, or between about 0.9 and about 1.1 atmospheres.

In some embodiments of the foregoing systems or methods, the thermal storage system comprises at least one thermal storage tank. In some embodiments of the foregoing systems or methods, the thermal storage system comprises fill media. In certain embodiments, the fill media comprises aluminum oxide, iron oxide, silicon oxide, and/or magnesium oxide, or other media. In certain embodiments, the fill media comprises pellets (e.g., spheres or other configurations described in more detail below). In some embodiments, at least about 50% of the pellets have maximum cross-sectional diameters of less than about 100 cm. In some embodiments, the thermal storage system is located within the tower structure of a power tower.

In some embodiments of the foregoing systems or methods, the pressure of the gas within the solar receiver is less than or equal to 2 atmospheres, less than about 1.5 atmospheres, less than about 1.25 atmospheres or less than about 1.1 atmospheres between about 0.9 and about 2 atmospheres, between about 0.9 and about 1.5 atmospheres, between about 0.9 and about 1.25 atmospheres, or between about 0.9 and about 1.1 atmospheres.

In some embodiments, the foregoing systems or methods further comprise a gas turbine constructed and arranged to produce power using the second gas, for example, as part of a Brayton cycle.

In some embodiments of the invention, power generation systems are provided that comprise a solar receiver constructed and arranged to heat a gas at a pressure of less than or equal to 2 atmospheres; a gas turbine fluidically connected to the solar receiver such that all or a portion of the gas heated by the solar receiver includes the exhaust of the gas turbine; and a blower fluidically connected to the solar receiver such that a portion of the gas heated by the solar receiver includes the exhaust of the blower.

In some embodiments of the invention, methods of generating power are provided that comprise producing power using a first gas at a pressure of greater than 2 atmospheres within a gas turbine; transporting at least a portion of the exhaust stream of the gas turbine to a solar receiver; transporting a second gas from a blower to the solar receiver; and heating the first and second gases within the solar receiver. In certain embodiments, the gas transported from the gas turbine to the solar receiver has a pressure of less than or equal to 2 atmospheres.

In some embodiments of the foregoing power generation systems or methods of generating power, the exhaust of the gas turbine is not substantially further compressed before being transported to the solar receiver.

In some embodiments of the foregoing power generation systems or methods of generating power, a controller is constructed and arranged to adjust the flow rate of the second gas transported from the blower to the solar receiver based at least in part on a condition of the gas transported from the gas turbine to the solar receiver. In some embodiments, the condition is the temperature of the gas transported from the gas turbine to the solar receiver. In some embodiments, the condition is the pressure of the gas transported from the gas turbine to the solar receiver. In some embodiments, the condition is the flow rate of the gas transported from the gas turbine to the solar receiver.

In some embodiments of the foregoing power generation systems or methods of generating power, the first gas is at a pressure of above 2 atmospheres, at least about 2.1 atmospheres, at least about 2.25 atmospheres, at least about 2.5 atmospheres, at least about 3 atmospheres, at least about 4 atmospheres, at least about 5 atmospheres, at least about 10 atmospheres, at least about 15 atmospheres, and, in some embodiments, up to 25 atmospheres or up to 50 atmospheres.

In some embodiments of the foregoing power generation systems or methods of generating power, the gas transported from the gas turbine to the solar receiver has a pressure of less than or equal to 2 atmospheres, less than about 1.5 atmospheres, less than about 1.25 atmospheres, or less than about 1.1 atmospheres, between about 0.9 and about 2 atmospheres, between about 0.9 and about 1.5 atmospheres, between about 0.9 and about 1.25 atmospheres, or between about 0.9 and about 1.1 atmospheres. In some embodiments, the gas turbine is directly fluidically connected to the solar receiver. In some embodiments, the blower is directly fluidically connected to the solar receiver.

In some embodiments of the invention, heat recovery systems are provided. In some embodiments, the systems comprise a solar receiver constructed and arranged to heat a first, relatively low pressure fluid; a first heat exchanger fluidically connected to the solar receiver, constructed and arranged to transfer energy from the first, relatively low pressure fluid to a second, relatively high pressure fluid; and a second heat exchanger fluidically connected to the first heat exchanger, constructed and arranged to transfer energy from the first, relatively low pressure fluid to a third fluid.

In some embodiments of the foregoing heat recovery systems, the first, relatively low pressure fluid is at a pressure of less than or equal to 2 atm, less than about 1.5 atm, or less than about 1.1 atm. In some embodiments of the foregoing systems, the second, relatively high pressure fluid is at a pressure above 2 atm, at least about 3 atm, or at least about 5 atm.

In some embodiments of the foregoing heat recovery systems, the third fluid is used as part of a Rankine cycle. In some embodiments of the foregoing systems, the third fluid is used to provide heat to an absorption chiller. In some embodiments of the foregoing systems, the third fluid is used to provide heat to a liquid. In some embodiments of the foregoing systems, the heated liquid is used for space heating purposes.

In some embodiments of the foregoing heat recovery systems, the first heat exchanger is fluidically connected to a turbine. In certain embodiments, the turbine is a gas turbine, which can be used, for example, as part of a Brayton cycle.

In some embodiments of the invention, solar receivers are provided. In some embodiments, the solar receivers comprise a low pressure fluid chamber comprising a fluid inlet, a fluid outlet, and an opening for receiving concentrated solar radiation; a solar absorber housed within the low pressure fluid chamber; and a transparent object that defines at least a portion of a wall of the low pressure fluid chamber, wherein concentrated solar radiation received through the opening passes through the transparent object into the low pressure fluid chamber and impinges upon the solar absorber.

In some embodiments of the foregoing solar receivers, the low pressure fluid chamber defines a fluid flow path from the fluid inlet to the fluid outlet. In certain embodiments, between the fluid inlet and the fluid outlet, the fluid flow path extends across at least a portion of the transparent object. In certain embodiments, the fluid flow path extends through one or more passages within the solar absorber.

In some embodiments of the foregoing solar receivers, the transparent object has a parabolic shape. In certain embodiments, the concave face of the parabolic shape is directed toward the opening. In certain embodiments, the transparent object has a radius of curvature of 1 foot to 50 feet. In certain embodiments, the transparent object has a radius of curvature of 1 foot to 10 feet. In certain embodiments, the transparent object has a radius of curvature of 5 feet to 20 feet. In certain embodiments, the transparent object has a radius of curvature of approximately 15 feet. In one embodiment, the transparent object has a radius of curvature of 1 foot of 5 feet. In certain embodiments, the transparent object has a planar disc shape. In some embodiments, the transparent object has a diameter in a range of 1 meter to 5 meters or 2 meters to 4 meters or 1 meter to 2 meters. In certain embodiments, the transparent object has a thickness in a range of 0.5 inch to 4 inches or 0.5 inch to 1 inch or 0.5 inch to 2 inch.

In some embodiments of the foregoing solar receivers, the maximum allowable working pressure of the low pressure fluid chamber is equal to or less than 2 atm, less than 2 atm, less than 1.5 atm, or less than 1.1 atm. In some embodiments of the foregoing solar receivers, the maximum allowable working pressure of the low pressure fluid chamber is up to 2×, up to 3×, up to 4×, up to 5×, up to 10× its operating pressure.

In some embodiments of the foregoing solar receivers, the low pressure fluid chamber defines a recess within which an outer rim of the transparent object expandably fits, the recess being adjacent to the opening. In some embodiments, the solar receivers further comprise a seal element positioned between the outer rim of the transparent object and an interface defined by the recess on the low pressure fluid chamber. In certain embodiments, the seal element is a room temperature vulcanizing (RTV) silicone or ceramic fiber rope.

In some embodiments of the foregoing solar receivers, the transparent object is quartz or silica glass. In some embodiments of the foregoing solar receivers, the solar absorber is a material selected from a group consisting of metals, stainless steels, ceramics, heat-resistant cast alloys, high-temperature metallic materials, refractory materials, thoria-dispersed alloys, graphite, and carbon-fiber-reinforced carbon-based materials.

In some embodiments of the foregoing solar receivers, the solar absorber is a ceramic. In certain embodiments, the ceramic is a glass ceramic. In certain embodiments, the ceramic is silicon carbide or silicon nitride. In one embodiment, the ceramic is silicon oxide.

In some embodiments of the foregoing solar receivers, the solar absorber is a wire mesh. In some embodiments of the foregoing solar receivers, the solar absorber has a honeycomb configuration. In some embodiments of the foregoing solar receivers, the solar absorber comprises a ceramic foam. In some embodiments of the foregoing solar receivers, the solar absorber comprises a black surface coating. In some embodiments, the solar absorber comprises a plurality of segments. In some embodiments, the solar absorber comprises a plurality of pie-shaped segments. In certain embodiments, each of the plurality of segments has a honeycomb configuration. In some certain embodiments, the solar receiver each of the plurality of segments comprises a ceramic foam. In some embodiments, the solar absorber has a concave face directed toward the opening. In some embodiments, the solar receiver absorber has a substantially planar shape.

In some embodiments, the foregoing solar receivers further comprise a secondary concentrator connected to the low pressure fluid chamber at the opening. In some embodiments, the secondary concentrator comprises a plurality of reflective panels arranged such that incident solar radiation impinging the reflective panels is reflected toward the transparent object. In certain embodiments, the plurality of reflective panels are arranged to form a parabolic shape. In certain embodiments, the plurality of reflective panels are arranged to form a plurality of conical rings that are arranged in a series such that each successive ring in the series has a larger diameter, the largest diameter conical ring being furthest from the opening. In certain embodiments, the plurality of reflective panels consists of forty-eight interconnected panels. In one embodiment, each conical ring consists of twelve reflective panels. In some embodiments, each reflective panel has a planar rectangular shape. In certain embodiments, the plurality of reflective panels consists of four interconnected reflective panels. In some embodiments, each reflective panel has a conical ring shape. In some embodiments, each reflective panel comprises an inner reflective surface, an outer surface and a cooling fluid passage. In certain embodiments, each reflective panel is bonded to a casing such that a cavity is formed between the casing and the outer surface, wherein the cavity is the cooling fluid passage. In some embodiments, the casing interfaces with a plurality of raised portions on the outer surface of the reflective panel. In certain embodiments, the casing is bonded to the reflective panel by a metal-to-metal bond. In certain embodiments, the metal-to-metal bond is a braze weld, a resistance weld or a compression weld. In certain embodiments, the raised portions are knurls or embossments.

In some embodiments of the foregoing solar receivers, the fluid inlet is fluidically connected with a gas turbine exhaust outlet. In some embodiments of the foregoing solar receivers, the fluid outlet is fluidically connected with a gas turbine compressor inlet or a thermal storage system. In some embodiments of the foregoing solar receivers, the fluid outlet is fluidically connected with a regenerator unit. In certain embodiments, the regenerator unit is a rotary regenerator unit.

In some aspects of the invention, concentrators for solar receivers are provided. In some embodiments, the concentrators comprise a support structure defining an inlet for receiving solar radiation and an outlet for discharging concentrated solar radiation; and a plurality of reflective panels, each reflective panel comprising one or more fluid passages, wherein the plurality of reflective panels are connected to the support structure and arranged such that incident solar radiation impinging the reflective panels is reflected toward the outlet.

In some embodiments of the concentrators, the plurality of reflective panels are arranged to form a parabolic, semi-circular, or semi-elliptical shape. In some embodiments of the concentrators, the plurality of reflective panels are arranged to form a plurality of conical rings arranged in a series. In some embodiments of the concentrators, the plurality of reflective panels consists of 2 to 72 reflective panels. In some embodiments of the concentrators, the plurality of reflective panels consists of 48 reflective panels. In some embodiments of the concentrators, each conical ring comprises 1 to 24 reflective panels. In one embodiment, each conical ring comprises 12 reflective panels.

In one embodiment of the concentrators, each reflective panel has a planar shape. In certain embodiments, each reflective panel has a polyhedron shape or disc shape. In some embodiments, the plurality of reflective panels consists of four reflective panels, wherein each reflective panel has a conical ring shape.

In some embodiments of the concentrators, each reflective panel is bonded to a casing such that a cavity is formed between the casing and an outer surface of the reflective panel, wherein the cavity is a cooling fluid passage. In certain embodiments, the casing interfaces with a one or more raised portions on the outer surface of the reflective panel. In certain embodiments, the casing is bonded to the reflective panel by a metal-to-metal bond. In some embodiments, the metal-to-metal bond is a braze weld, a resistance weld or a compression weld. In certain embodiments, the raised portions are knurls or embossments. In some embodiments, the casing is aluminum. In some embodiments, the reflective panel comprises a metal, a polymer, a glass, or a combination thereof. In some embodiments, the reflective panel comprises aluminum, silver, or a combination thereof.

In some aspects of the invention, methods for producing a solar receiver are provided. In some embodiments, the methods comprise obtaining a solar receiver comprising an opening for receiving solar radiation and a solar absorber for absorbing incident solar radiation and transferring thermal energy to a working fluid; and mounting any of the foregoing concentrators on the solar receiver such that the outlet of the concentrator is operably positioned within, or adjacent to, the opening of the solar receiver.

In some aspects of the invention, systems are provided for cooling a concentrator for a solar receiver. In some embodiments, the systems comprise a reservoir comprising a working fluid; any appropriate concentrator disclosed herein; one or more conduits fluidically connecting the reservoir with one or more cooling passages of each reflective panel of the concentrator; and a pump configured for circulating a working fluid from the reservoir through the one or more conduits.

In some embodiments, the systems further comprise a heat exchanger downstream of the concentrator configured for removing heat from the working fluid. In certain embodiments, the heat exchanger is a cooling tower. In certain embodiments, the heat exchanger is a shell-and-tube heat exchanger or a plate-type heat exchanger. In some embodiments, the working fluid circulates back to the reservoir after leaving the heat exchanger. In certain embodiments, the working fluid is an antifreeze solution. In certain embodiments, the working fluid is a mixture of water and glycol. In some embodiments, the working fluid is a 50:50 mixture of water and glycol. In certain embodiments, the glycol is ethylene glycol or propylene glycol.

In further aspects of the invention, methods are provided for modifying a reflective panel for a concentrator. In some embodiments, the methods comprise obtaining a reflective panel having a inner reflective surface and an outer surface; creating one or more raised portions on the outer surface of the reflective panel; overlaying a casing on the outer surface of the reflective panel such that the casing contacts the one or more raised portions; and bonding the casing to the reflective panel to create a cavity between the casing and the outer surface of the reflective panel.

In further aspects of the invention, methods are provided for producing a concentrator. In some embodiments, the methods comprise obtaining a plurality of reflective panels, each reflective panel having a inner reflective surface and an outer surface; obtaining a support structure defining an inlet for receiving solar radiation and an outlet for discharging concentrated solar radiation; and assembling the plurality of reflective panels such that each reflective panel is connected to the support structure and arranged such that incident solar radiation impinging the reflective panels is reflected toward the outlet. In some embodiments, the methods further comprise creating one or more raised portions on the outer surface of each reflective panel; overlaying a casing on the outer surface of each reflective panel such that the casing contacts the one or more raised portions; and bonding the casing to the reflective panel to create a cavity between the casing and the outer surface of the reflective panel. In some embodiments, the methods further comprise fluidically connecting one or more conduits to the cavity of each reflective panel. In some embodiments, the raised portions are knurls or embossments. In some embodiments, the casing is a metal sheet. In some embodiments, the casing is an aluminum sheet. In some embodiments, bonding comprises creating a metal-to-metal bond between the casing and the reflective panel. In some embodiments, the metal-to-metal bond is a laser weld, a braze weld, a resistance weld or a compression weld.

Inventive concentrated solar power systems using solar receivers, and related devices and methods, are also generally described. In some embodiments, the concentrated solar power system or method includes one or more modularized components. For example, in one embodiment, turbines, concentrators, recuperators, receivers and/or other components may be integrated into a single unit. The single unit may be assembled at a factory or other location away from the operation site and then shipped to the operation site, e.g., by truck over an interstate highway system. Once at the operation site, the single unit may be incorporated into a power generation system, e.g., by placement of the unit on a tower. Since many components of the system may be manufactured and assembled together in a factory or other similar setting away from the operation site, and then shipped to the operation site after testing, assembly costs and complexity may be reduced.

In another aspect of the invention, a receiver, concentrator, energy storage tank(s), recuperator(s) and/or turbine(s) for a solar power generation system may be elevated from ground level, e.g., installed at the top of a tower. Such an arrangement may allow the recuperator(s) and/or turbine(s) to be located more closely to the receiver, reducing heat loss and/or other costs resulting from having the recuperators and turbines located a further distance away from the receiver. As is known, the receiver in heliostat-based solar power generation systems is typically mounted on a tower or otherwise elevated above the ground on which the heliostats are arranged so that the heliostats can operate more efficiently in directing sunlight to the receiver. In prior solar generation systems, recuperators and turbines that receive heated fluid from the receiver are located at ground level, usually because the receiver, recuperator and turbine assemblies are relatively heavy—too heavy to be safely or efficiently mounted together on a tower. For example, prior receiver arrangements operate at relatively high pressure, e.g., 4-14 atmospheres and more, and thus must be made of thick and heavy material to withstand the pressures. As a result, the receiver itself typically requires a relatively large and robust tower structure. To include the recuperator, turbine and other components on the tower would require that the tower be made so strong and large as to offset any gain that might be realized in locating the components more closely together. With the recuperator and/or turbine assemblies located on the ground, heated fluid from the receiver must be directed from the receiver at the top of a tower to the ground where the recuperators and turbines are located. Transporting fluid up and down the tower increases the size and weight of the system further, e.g., tubes conducting high temperature/high pressure fluid up and down the tower must be made sufficiently thick or otherwise arranged to operate safely and reduce heat loss.

As is described below, aspects of the invention allow for relatively low pressure operation of the solar power generator (at least at the receiver), which may help to reduce the size and/or weight of system components. That is, the reduced pressures may require less material to safely contain fluid pressure (e.g., allow for thinner tube, housing and tank wall thicknesses), reducing the weight of various system components, and particularly the weight of the receiver. This reduced weight may permit the inclusion of other system components on a tower in addition to the receiver, e.g., turbines, recuperators, energy storage tanks and other components may be mounted together on a tower. This may not only reduce the footprint of the system on the ground, but also help to reduce system construction and assembly costs. For example, the smaller size and weight components may be assembled together into one or more units that can be shipped from a factory (e.g., by truck or railroad car) and then assembled on the tower at the operation site. In one embodiment, all of the receiver, concentrator, energy storage tank(s), recuperator(s) and turbine(s) for a solar power generation system may be mounted to a tower. Thus, the power generation system, aside from heliostats, power transmission components and associated control systems, may be completely contained on a tower in some embodiments. In other embodiments, a receiver, concentrator, recuperator(s) and turbine(s) may be mounted on a tower, with one or more energy storage tanks located at ground level, or inside of the tower base.

In another embodiment, the receiver and concentrator may be made as a single modular unit, and the turbines may be made as a separate, single modular unit. The receiver/concentrator and turbine units may be assembled and mounted together on a tower. Constructing portions of the power generation system as discrete modular units may also permit each of the modules to be fully tested for satisfactory operation prior to shipping the modular units from a factory to a work site. This may reduce the number or extent of system testing at the work site since the operation of each of the modular units may be ensured prior to assembly at the operation site.

In some aspects of the invention solar power systems are provided. In some embodiments, the systems comprise a first solar receiver constructed and arranged to heat a gas at a pressure of less than or equal to 2 atm, the first solar receiver fluidically connected to a thermal storage system; and a second solar receiver constructed and arranged to heat a gas at a pressure of above 2 atm, the second solar receiver fluidically connected to the thermal storage system.

In some aspects of the invention, methods are provided that comprise heating a first gas at a pressure of less than or equal to 2 atm within a first solar receiver fluidically connected to a thermal storage system; and heating a second gas at a pressure of above 2 atm within a second solar receiver fluidically connected to the thermal storage system.

In some embodiments of the systems or methods, the first solar receiver is directly fluidically connected to the thermal storage system. In some embodiments of the systems or methods, the second solar receiver is directly fluidically connected to the thermal storage system. In some embodiments of the systems or methods, a first portion of the thermal storage system is constructed and arranged to be operated at a pressure of above 2 atm, and a second portion of the thermal storage system is constructed and arranged to be operated at a pressure of less than or equal to 2 atm. In some embodiments of the systems or methods, the thermal storage system is fluidically connected to a gas turbine.

In further aspects of the invention, solar receivers are provided. In some embodiments, the solar receivers comprise an insulating casing comprising an opening for receiving concentrated solar radiation; and a high pressure solar absorber housed within the insulating casing. In some embodiments, the high pressure solar absorber comprises a fluid inlet, a fluid outlet, and a heat exchanger fluidically connected with the fluid inlet and the fluid outlet. In some embodiments, the high pressure solar absorber has a maximum allowable working pressure in excess of 2 atmospheres. In some embodiments, the high pressure solar absorber is designed and configured to operate at a temperature of 800° C. to 1500° C. or 800° C. to 2500° C. In some embodiments, the high pressure solar absorber is designed and configured to operate at a temperature of equal to or above 800° C.

In some embodiments, the solar receivers further comprise a transparent object positioned adjacent to the opening. In some embodiments, the transparent object reflects light in the infrared range. In some embodiments, the transparent object comprises an anti-radiation reflection coating on an inside surface that limits the effects of re-radiation on thermal efficiency of the receiver.

In some embodiments of the solar receivers, the high pressure solar absorber comprises, at least in part, a single crystal super alloy. In some embodiments, the single crystal super alloy is nickel-based. In some embodiments, the high pressure solar absorber comprises a surface coating. In some embodiments, the surface coating is applied using chemical vapor deposition. In some embodiments, the surface coating is a black surface coating.

In some embodiments of the solar receivers, the heat exchanger comprises a tubular coil or a shell-and-tube arrangement. In certain embodiments, the heat exchanger comprises one or more tubes having a diameter in a range of 0.5 inch to 5 inches. In certain embodiments, the heat exchanger comprises one or more tubes having a diameter of 2 inches. In certain embodiments, the heat exchanger comprises one or more tubes having a wall-thickness in a range of 0.1 inch to 0.5 inch. In certain embodiments, the heat exchanger is a plate-type heat exchanger. In certain embodiments, the heat exchanger is, at least in part, produced by a precision investment casting method. In certain embodiments, the heat exchanger comprises one or more metal-to-metal bonds formed by a vacuum brazing process. In certain embodiments, the vacuum brazing process is activated diffusion bonding (ADB) or transient liquid phase (TLP).

In some embodiments, the solar receivers further comprise a secondary concentrator connected to the insulated casing at the opening. In some embodiments, the secondary concentrator comprises a plurality of interconnected reflective panels arranged such that incident solar radiation impinging the reflective panels is reflected toward the transparent object. In some embodiments, the plurality of interconnected reflective panels are arranged to form a parabolic shape. In certain embodiments, each reflective panel comprising a cooling fluid passage.

In some embodiments, power generation systems are provided comprising a solar receiver constructed and arranged to heat a first gas at a pressure of less than or equal to 2 atmospheres; a rotary heat exchanger fluidically connected to the solar receiver, constructed and arranged to transfer thermal energy from the first gas to a second gas at a pressure of above 2 atmospheres; and a gas turbine fluidically connected to the solar receiver, constructed and arranged to generate power using the second gas.

In some embodiments, methods of generating power are provided comprising heating a first gas at a pressure of less than or equal to 2 atmospheres in a solar receiver; transferring thermal energy from the first gas to a second gas at a pressure of above 2 atmospheres using a rotary heat exchanger fluidically connected to the solar receiver; and generating power from the second gas using a gas turbine fluidically connected to the solar receiver.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 2A-2C include, according to some embodiments, exemplary schematic diagrams of heat recovery configurations that can be used with a concentrated solar power generation system;

FIGS. 9A-9C include exemplary schematic illustrations of high-pressure solar receivers.

DETAILED DESCRIPTION

Figure 1:
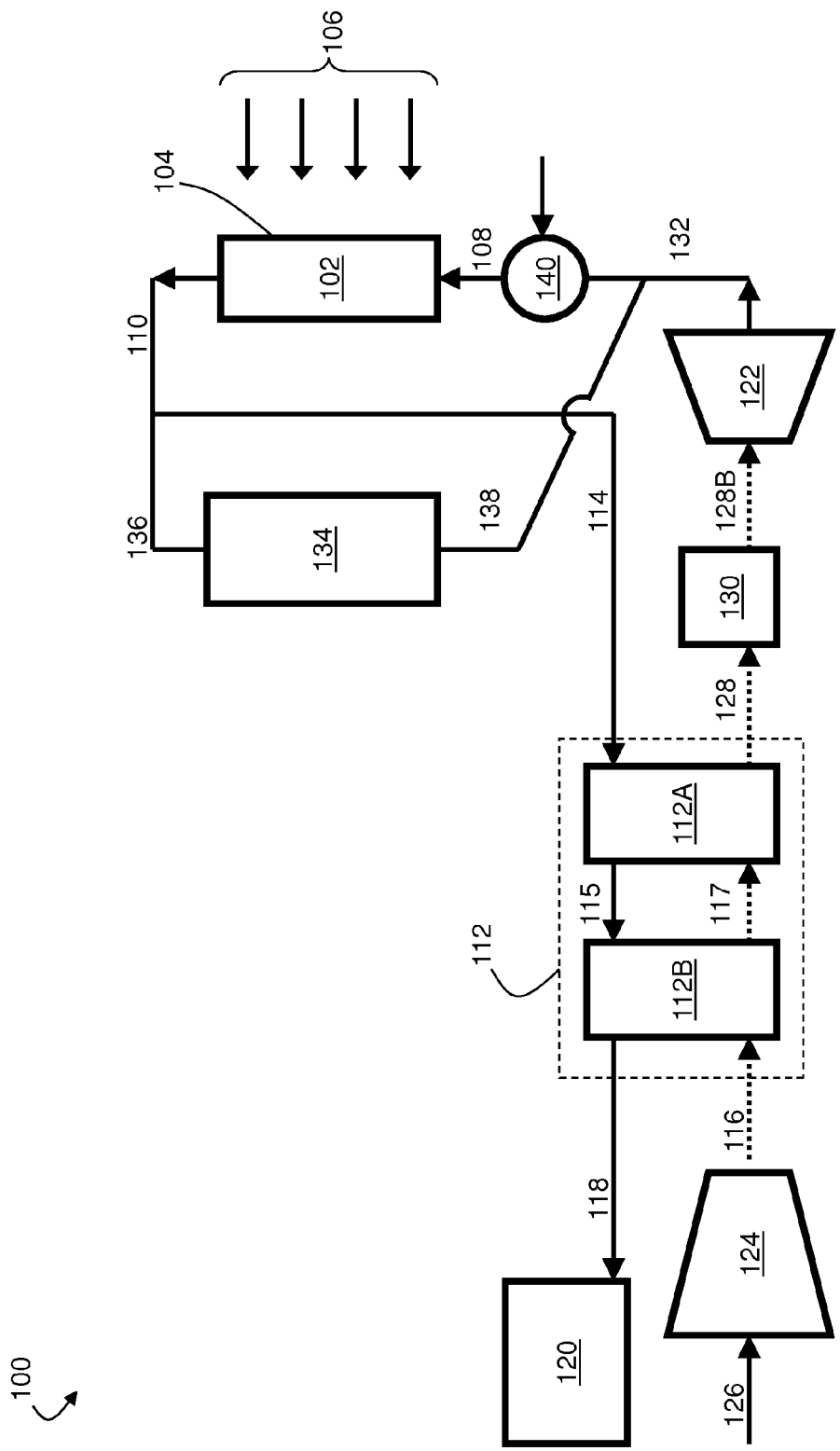
FIG. 1 includes a schematic diagram of a concentrated solar power generation system including a low pressure solar receiver, according to one set of embodiments.

Inventive concentrated solar power systems using solar receivers, and related devices and methods, are generally described. In some embodiments, the concentrated solar power systems include a solar receiver used to heat a fluid at a relatively low pressure. Heat from the low-pressure fluid heated by the solar receiver can be transferred to a relatively high-pressure fluid, which can be used to power a gas turbine as part of, for example, a Brayton cycle. The heat exchange between the low- and high-pressure fluids can be accomplished via the use of a heat exchange system.

In some embodiments, the exhaust of the gas turbine can be transported to the solar receiver and used as the low-pressure heated fluid. Optionally, a blower can be used to provide additional ambient air to the low-pressure solar receiver, which can be useful, for example, for regulating the flow of fluid through the system. In some embodiments, a controller can be used to regulate the flow rate of the gas from the blower. The controller can be constructed and arranged to adjust the flow rate of the gas transported from the blower to the solar receiver based at least in part on a condition of the gas transported from the gas turbine to the solar receiver. For example, the controller can be constructed and arranged such that the flow rate of the gas transported from the blower to the solar receiver depends on one or more of the temperature, pressure, and/or flow rate of the gas transported from the gas turbine to the solar receiver.

The low-pressure fluid from the solar receiver, in addition to providing heat to the high-pressure working fluid within the Brayton cycle, can be used to provide heat to a thermal storage system, which can operate, for example, by storing sensible heat from the low-pressure fluid. The thermal storage system can be useful for operating the power cycle during periods of low sunlight, for example, by providing heat to the low-pressure fluid in addition to or in place of the heat provided by the solar receiver. In some embodiments, the thermal storage system can be operated at the high pressure of the turbine, for example, by transporting a pressurized fluid through the thermal storage unit to heat the pressurized fluid prior to, for example, transporting the pressurized fluid to a turbine. In some embodiments, the airflow from the solar receiver can be switched between the thermal storage system and the heat exchange system used to transfer heat from the low-pressure fluid to the high-pressure Brayton cycle fluid. In some embodiments, a blower can be connected to transport heated air from the thermal storage system into the solar receiver.

The overall efficiency of the system can be improved, in some cases, by recovering heat from the low-pressure fluid exiting the heat exchange system used to transfer heat to the high-pressure fluid. For example, in some cases, the low-pressure fluid exiting the heat exchange system can be used to generate steam to power a steam turbine in a Rankine cycle. In some instances, the low-pressure fluid exiting the heat exchange system can be used to provide heat to an absorption chiller, which can be used, for example, to produce chilled water for an air conditioner. The low-pressure fluid from the heat exchange system can also be used to provide heat for general space heating purposes (e.g., via an air to liquid heat exchanger).

Some embodiments of the invention can be used in coordination with solar power tower systems (also known as central tower solar power plants or heliostat solar power plants). Such systems include a plurality of heliostats arranged to redirect sunlight toward the top of a collector tower, sometimes called a central tower, on which one or more solar receivers are mounted. In some such embodiments, the gas turbine and/or the compressor can be mounted, along with the solar receiver, at the top of the solar tower. Other components, such as a thermal storage system can also be mounted at the top of, or within other parts of, the tower.

In some embodiments, low pressure solar receivers are provided that may be used in conjunction with the power generation systems disclosed herein. The solar receivers function, at least in part, to convert solar radiation energy to thermal energy of a working fluid, e.g., a working fluid of a power generation or thermal storage system. The solar receivers typically comprise a low pressure fluid chamber that is designed and constructed, at least in part, to provide an insulated casing that acts to reduce or eliminate thermal losses from the solar receiver, to contain a low pressure working fluid and/or to provide a support structure for a solar absorber. The low pressure solar receivers also typically comprise a transparent object (e.g., window) positioned adjacent to an opening in the receiver for receiving solar radiation. The transparent object functions, at least in part, to contain the low pressure working fluid, to permit solar radiation to pass into the solar receiver (where the radiation impinges the solar absorber) and to eliminate or reduce thermal losses associated with re-radiation from the solar absorber.

Because the low pressure receiver operates at low pressure (e.g., below 2 atmospheres) the chamber can be typically constructed using less material and fewer design constraints than is needed for chambers that are subjected to higher pressures. Moreover, the low pressure design enables the use of relatively large (e.g., 1 meter to 5 meters in diameter) transparent objects that enable a high solar collection capacity. Thus, according to some aspects, the low pressure solar receivers have lower cost of production and significantly larger collection capacity than currently available solar receivers.

In further embodiments, high pressure receivers are provided that may be used in conjunction with the power generation systems disclosed herein. The high pressure solar receivers function, at least in part, to convert solar radiation energy to thermal energy of a working fluid, e.g., a working fluid of a power generation system or thermal storage system. In some embodiments, the high pressure receivers include an insulated casing housing a high pressure solar absorber that acquires thermal energy by absorbing incident solar radiation. The high pressure fluid (e.g., fluid at a pressure of above 2 atmospheres to 50 atmospheres) entering the receiver passes through one or more fluid passages within the high pressure solar absorber and acquires thermal energy therein, in part, through contact with the passage wall(s). The high pressure solar absorber often has a black surface coating to promote absorption of incident solar radiation and is typically constructed from a single crystal super alloy, e.g., a nickel-based single crystal super alloy.

Current high-pressure receivers typically use metals that are often limited with respect to maximum temperatures at which they can function. For example, certain high-pressure receivers employ stainless steel or other alloys for the pressurized receiver components and these materials typically limit the receiver exit temperatures to levels that are insufficient to enable (at least at high efficiencies) certain downstream uses, such as use within a Brayton power cycle. The high-pressure solar receivers provided herein employ significantly higher temperature materials, e.g., high temperature single crystal super alloys, for the heat-exchanger elements and therefore can be operated at significantly higher temperatures. In some embodiments, high-pressure absorbers are produced from nickel-based high-temperature super alloy (e.g., using precision investment casting), and enable relatively high maximum exit temperatures (e.g., temperatures of up to ~1150° C.) from the receiver. Thus, in some embodiments, the receivers may be used within a Brayton cycle system to achieve high power output & high overall electrical efficiency.

In certain embodiments, additional heat transfer features are provided into the internals of the heat-exchanger elements (e.g., improved cross sectional shape) to facilitate heat transfer efficiency. In some embodiments, the cast single crystal tubes are attached to headers & manifolds of similar materials via a unique vacuum brazing process known as (ADB) activated diffusion bonding or (TLP) transient liquid phase. This joining technique enables, in some embodiments, a joint to retain full strength & temperature capability. In some embodiments, the high-pressure receivers also incorporate a transparent object (e.g., a Quartz glass front window). In some embodiments, the transparent object has an anti-radiation reflection coating on the inside to limit the effects of re-radiation on thermal efficiency. Moreover, in some embodiments, high resistance insulation is applied to the receivers to improve thermal efficiency.

In some embodiments, secondary concentrators are provided. The secondary concentrator provides, at least in part, a mechanism for collecting concentrated solar radiation from a primary concentrator, e.g., a heliostat field, or other source, and directing that solar radiation into the opening of a solar receiver. The secondary concentrator typically improves the solar collection efficiency of the solar receiver. In some embodiments, the second concentrator is constructed with a plurality of reflective panels, each reflective panel typically having a reflective surface and a predetermined shape. The plurality of reflective panels are typically arranged in a configuration that facilitates reflection of incident solar radiation toward the receiver opening. In certain embodiments the secondary concentrator includes cooling pipes that function in part to deliver cooling fluid to and from a cooling passage within each reflective panel.

Certain embodiments of the inventive systems and methods described herein can provide certain advantage(s) over traditional concentrated solar power techniques in certain applications. For example, low-pressure components (e.g., solar receivers, storage containers, etc.) can be relatively inexpensive to manufacture and relatively safe to operate. In addition, low-operating pressures allow for the use of relatively large windows within the solar receiver, compared to pressurized systems in which large windows can rupture at high pressures. The Brayton cycle systems described herein have a higher thermal efficiency relative to systems that employ, for example, Rankine cycles. The ability to switch the flow of low-pressure fluid between heat exchange for power generation and low-pressure storage can allow for operation at night and other low-sunlight conditions. The heat integration methods described herein can also improve overall system performance.

FIG. 1 shows a schematic illustration of a system 100 in which concentrated solar energy is used to generate power. The fluid streams in the set of embodiments illustrated in FIG. 1 can be generally divided into streams comprising relatively high-pressure fluid (illustrated as dotted lines in FIG. 1) and streams comprising relatively low-pressure fluid (illustrated as solid lines in FIG. 1). It should be noted that these conventions are used for illustration purposes only, and are not meant to indicate that the pressures in all relatively low-pressure streams are the same and/or that the pressures in all relatively high-pressure streams are the same.

System 100 includes a solar receiver 102 constructed and arranged such that at least a portion of the receiver, such as face 104 in FIG. 1, is exposed to incident solar radiation 106. The energy from the incident solar radiation can be used to heat a fluid within the solar receiver. In some embodiments, the solar receiver can be constructed and arranged to operate at relatively low pressures. For example, the pressure of the fluid within the solar receiver can be up to and including about 2 atmospheres, less than about 1.5 atmospheres, less than about 1.25 atmospheres, less than about 1.1 atmospheres, between about 0.9 and about 2 atmospheres, between about 0.9 and about 1.5 atmospheres, between about 0.9 and about 1.25 atmospheres, or between about 0.9 and about 1.1 atmospheres. In some cases, the solar receiver can be constructed and arranged such that the fluid within the receiver is not substantially compressed, with the exception of incidental compression that might occur due to the heating and/or transport of the fluid, before being transported to the receiver. For example, the fluid transported to the solar receiver can be substantially equal to the pressure of the surrounding environment, in some cases. The reduced pressures at the receiver may allow a "window" of the receiver (e.g., a transparent portion of the receiver through which sunlight passes to heat the fluid in the receiver) to be made significantly larger than in other relatively high pressure receivers. For example, prior receivers may be limited to a window size of about 60 cm diameter, whereas a receiver in some embodiments of the invention may have a size up to about 150 cm or more. In some embodiments, the receivers have a window size of 4 meters or more.

Fluid can be transported to the solar receiver via an inlet, such as inlet line 108 in FIG. 1. Generally, fluid is transported through the solar receiver when the sun is available to provide energy to heat the fluid. In some cases, the relatively-low pressure fluid transported to the solar receiver can comprise the outlet stream of a turbine used to generate power within the system. However, the relatively low-pressure fluid can also originate from other sources, in addition to or in place of the exhaust stream of a turbine. For example, in some cases, relatively low-pressure fluid transported to the solar receiver can originate from the ambient environment (e.g., atmospheric air). Additional details related to the design and operation of the solar receiver are described in more detail below.

Once the relatively low-pressure fluid has been heated within the solar receiver, it can be transported out of the receiver, for example, via stream 110 in FIG. 1. At least a portion of the fluid within stream 110 can be transported to heat exchange (or recuperator) system 112 via stream 114. Heat exchange system 112 can be used to transfer heat from the relatively low-pressure fluid stream (e.g., from a solar receiver and/or from a thermal storage system) to a relatively high-pressure fluid stream 116, which can be used to drive a gas turbine, as described in more detail below.

After the heat from the relatively low-pressure stream has been transported to the relatively-high pressure stream, the relatively low-pressure fluid can be transported out of heat exchange system 112 via stream 118. In some embodiments, stream 118 can contain residual heat, which can be recovered within heat recovery system 120 to increase system efficiency. Systems and methods for recovering the residual heat from the exhaust stream of the primary heat exchange system are described in more detail below.

In the set of embodiments illustrated in system 100, power is primarily generated using a Brayton cycle. The Brayton cycle illustrated in FIG. 1 includes gas turbine 122. While a single turbine is illustrated in FIG. 1, it should be understood that the invention is not so limited, and that, in some embodiments, multiple turbines can be employed. For example, in some embodiments, the power generation system includes at least 2, at least 3, at least 4, at least 5, or more turbines. A single gas turbine and/or the combination of multiple gas turbines can be capable of producing any suitable amount of power (e.g., at least about 100 kW, at least about 500 kW, at least about 1 MW, at least about 4 MW). One of ordinary skill in the art would be capable of selecting an appropriate gas turbine and/or combination of gas turbines to use, given a desired power output requirement.

In order to increase system efficiency, the gas supplied to gas turbine 122 should be relatively hot and relatively highly-pressurized. To accomplish this, compressor 124 can be used to compress a relatively low-pressure gas (e.g., ambient air) in stream 126 to produce relatively high-pressure stream 116. As mentioned above, relatively high-pressure stream 116 can be heated by transferring the heat from heated, low-pressure stream 114 (e.g., from solar receiver 102 and/or from thermal storage system 134) to stream 116 via heat exchange system 112 to produce relatively high-pressure, relatively high-temperature stream 128. In some embodiments, the compressor can be used to produce a fluid stream (e.g., a gas stream) with a pressure above 2, at least about 3, at least about 4, at least about 5, at least about 10, or at least about 15 atmospheres.

As illustrated in FIG. 1, primary heat exchange system 112 includes two heat exchangers (or recuperators), 112A and 112B. It should be understood that, while the figures illustrate the use of two heat exchangers, the invention is not limited to the use of heat exchange systems including two heat exchangers, and, in some embodiments, a single heat exchanger or more than two heat exchangers (e.g., 3, 4, 5, or more heat exchangers) can be used in the heat exchange system. In FIG. 1, the first heat exchanger 112A can be used to exchange heat at relatively high temperatures, for example, removing heat from high-temperature stream 114 to produce intermediate-temperature stream 115 while transferring heat to intermediate-temperature stream 117 to produce high-temperature stream 128. The second heat exchanger 112B can be used to exchange heat at relatively low temperatures, for example, removing heat from intermediate-temperature stream 115 to produce low-temperature stream 118, while transferring heat to low-temperature stream 116 to produce intermediate-temperature stream 117. High temperature heat exchange (e.g., at temperatures between about 800° C. and about 1250° C.) can involve the use of very expensive materials, such as specially engineered ceramics and/or high temperature super alloys. The use of multiple heat exchangers (e.g., one relatively small inexpensive heat exchanger and one relatively small expensive heat exchanger) instead of a single large, relatively expensive heat exchanger can allow one to achieve efficient heat exchange while reducing cost. While heat exchange system 112 in FIG. 1 is illustrated as including two heat exchangers, it should be understood that, in some embodiments, a single heat exchanger can be employed. In addition, in some cases, more than two heat exchangers can be employed in heat exchange system 112.

At least one of the heat exchangers in the heat exchanger system can be configured, in some embodiments, such that the heat exchanger simultaneously contains the first, low pressure fluid (e.g., gas) and the second, high pressure fluid (e.g., gas), which may, in certain embodiments involve simultaneous flow of the first and second fluids through the heat exchanger. For example, in some embodiments, at least one heat exchanger in the heat exchanger system comprises a first inlet through which gas at a relatively low pressure (e.g., a pressure of less than or equal to 2 atmospheres) is transported into the heat exchanger and a second inlet through which gas at a relatively high pressure (e.g., above 2 atmospheres) is transported into the heat exchanger while the first gas is transported into the heat exchanger. By configuring one or more heat exchangers in this manner, the amount of heat transferred from the high temperature fluid to the low temperature fluid can be enhanced, relative to situations in which the first and second fluids are transported subsequently through the heat exchanger (e.g., due to heat dissipation from the heat exchanger during the period between fluid flow). Heat exchangers configured in this manner can be configured to operate in countercurrent or cocurrent mode (with flow in the same or opposite directions).

In some embodiments, one or more of the heat exchangers used to transfer heat from the relatively low-pressure fluid to the relatively high-pressure fluid (e.g., heat exchangers 112A and/or 112B in FIG. 1) can be a rotary heat exchanger (e.g., a ceramic rotary heat exchanger). Suitable rotary heat exchangers (e.g., rotary regenerators) for use in the systems described herein include those described, for example, in U.S. Pat. No. RE37134, issued on Apr. 17, 2001, filed Mar. 25, 1995, entitled "Heat Exchanger Containing a Component Capable of Discontinuous Movement"; U.S. Publication No. 2007/0089283, published on Apr. 26, 2007, filed Oct. 17, 2006, entitled "Intermittent Sealing Device and Method"; U.S. Publication No. 2008/0251234, published on Oct. 16, 2008, filed Apr. 16, 2007, entitled "Regenerator Wheel Apparatus"; U.S. Publication No. 2009/0000761, published on Jan. 1, 2009, filed Jun. 29, 2007. entitled "Regenerative Heat Exchanger with Energy-Storing Drive System"; U.S. Publication No. 2009/0000762, published on Jan. 1, 2009, filed Jun. 29, 2007, entitled "Brush-Seal and Matrix for Regenerative Heat Exchanger and Method of Adjusting Same"; and U.S. Publication No. 2006/0054301, published on Mar. 16, 2006, filed Dec. 16, 2004, entitled "Variable Area Mass or Area and Mass Species Transfer Device and Method." Ceramic rotary heat exchangers can be capable of operating at relatively high temperatures (e.g., up to about 2100° F. (1200° C.), which can allow one to supply higher temperature gas to the gas turbine, thereby increasing system efficiency. Of course, the invention is not limited to the use of rotary heat exchangers, and, in some embodiments, one or more of the heat exchangers (e.g., the heat exchangers used to transfer heat from the relatively low-pressure fluid to the relatively high-pressure fluid such as heat exchangers 112A and/or 112B in FIG. 1) can be any of a wide variety of suitable heat exchanger configurations, including, but not limited to, a plate heat exchanger, a tube heat exchanger (e.g., a shell and tube heat exchanger), etc.

In some embodiments, at least one of the heat exchangers can be a metallic heat exchanger. The first and second heat exchangers can be of different types. For example, in some embodiments, one of the heat exchangers within the heat exchange system can be a ceramic heat exchanger (e.g., a ceramic rotary heat exchanger, a ceramic plate heat exchanger, a ceramic tube heat exchanger, etc.) while a second of the heat exchangers can be a metallic heat exchanger. For example, gas from the solar receiver can be transported to a ceramic heat exchanger (where a relatively high maximum temperature might be observed), and subsequently transported to a metallic heat exchanger (where the maximum temperature might be lower than that observed in the ceramic heat exchanger).

In some embodiments, the system can include a heat exchanger that is configured to be operated at a relatively high temperature. For example, in some embodiments, the system can include one or more heat exchangers (e.g., heat exchangers 112A and/or 112B in FIG. 1) that can be operated above temperatures of 1500° F. and in some embodiments at temperatures of up to 1800° F. In some embodiments, the system can include one or more heat exchangers that can be operated at temperatures of up to 2100° F. or even to 2500° F. High temperature heat exchangers can comprise one or more materials configured to withstand high temperature operation including, for example, one or more ceramics (e.g., aluminum oxides, iron oxides, silicon oxides, magnesium oxides, etc.). In some embodiments, the heat exchanger can comprise one or more metals (e.g., a super alloy such as those comprising nickel, chromium, titanium, tungsten, molybdenum, tantalum, columbium, and the like, including any of the super alloys described elsewhere herein. As specific examples, all or part of a high temperature heat exchanger can be formed of Alloy 230®, Alloy 214®, and/or Alloy 556® from Haynes International.

In some embodiments, the fluid within high-pressure, high-temperature stream 128 can be transported directly to gas turbine 122, where it can be used to produce power. The gas turbine can be constructed and arranged to operate using incoming gas streams with relatively high pressures. In some embodiments, the gas stream fed to the gas turbine has a pressure of above 2, at least about 3, at least about 4, at least about 5, at least about 10, or at least about 15 atmospheres. In some instances, for example during startup or during periods when the temperature of the fluid in stream 114 is relatively low (e.g., during periods of low sunlight and/or when storage container 112 (described below) is not sufficiently heated to supply high-temperature fluid), an optional supplemental heater 130 can be employed to supply additional heat to the fluid in stream 128, producing stream 128B which can be transported to gas turbine 122. Supplemental heater 130 can comprise, for example, an auxiliary combustor, sometimes called a boost combustor, that burns fuel to supply additional heat. One of ordinary skill in the art would be capable of selecting an appropriate device to provide the required amount of supplemental heat, given the power demands and operating conditions of a given system. For example, heater 130 might comprise an induced flow combustor.

Once the gas in stream 128 (or 128B) has been expanded, a relatively low-pressure, low-temperature turbine exhaust stream 132 can be produced. As mentioned above, in some embodiments, the turbine exhaust stream 132 can be fed to the solar receiver 102, where it can be reheated and used to supply heat to heat exchange system 112. Routing the turbine exhaust in this way can be beneficial, as the turbine exhaust may contain residual heat that would otherwise be lost if the exhaust were vented directly to the atmosphere.

In some embodiments, system 100 can include optional thermal storage system 134. In some embodiments, the thermal storage system can include a single thermal storage unit, while in other embodiments, the thermal storage system can include a plurality of thermal storage units. The thermal storage system can be used to store heat (e.g., sensible heat) for use during periods of relatively low sunlight and/or during startup of the system. During periods of relatively high sunlight, at least a portion of the fluid exiting the solar receiver (e.g., via stream 110) can be transported to the thermal storage system 134 (e.g., via stream 136), where the heat can be retained for later use. During periods of low sunlight, a relatively low-temperature fluid can be transported into the thermal storage system via stream 138. The heat stored within thermal storage system 134 can be used to heat the relatively low-temperature fluid to produce high-temperature fluid, which can be transported to heat exchange system 112, e.g., via streams 136 and 114. In some embodiments, the fluid supplied to stream 138 can comprise the exhaust stream 132 of turbine 122. For example, in some cases during periods of low sunlight, little or no fluid might be supplied to solar receiver 102 via stream 108, and low-pressure fluid from the exhaust stream 132 of turbine 122 (and, optionally, some fluid from the ambient atmosphere) can be re-directed to thermal storage system 134 via conduit 138. In some embodiments, a controller and valves can be used to regulate the distribution of low-pressure fluid through solar receiver 102 and thermal storage system 134.

In some embodiments, optional blower 140 can be incorporated into the system. Any suitable type of blower can be included in the system; the blower can comprise, for example, an electric driven induction flow fan. The blower can be used, for example, to transport the gas turbine exit stream (e.g., stream 132 in FIG. 1) through the solar receiver during periods of relatively high sunlight. In addition, blower 140 can be used to provide the power to circulate hot air through the thermal storage system during periods of high sunlight. In some embodiments, blower 140 can be used to transport heated air from thermal storage system 134 to the solar receiver 102 (e.g., via pathway 138) to provide pre-heated air to the solar receiver (e.g., during periods of relatively low sunlight). In some embodiments, blower 140 can be shut down during periods of relatively low sunlight when the thermal storage system can provide heat for the system.

The blower can be arranged, in some cases, to accept ambient air or fluid from another source in addition to the exhaust gas from the gas turbine. In this way, the blower can be used to control the overall flow rate of the fluid within the relatively low-pressure section (i.e., from the exhaust of the gas turbine, through heat exchange system 112, and through optional heat recovery system 120). For example, when higher flow rates through the low-pressure section are desirable, the blower can take in a relatively large amount of fluid from the ambient or another, non-turbine exhaust source. When lower flow rates through the low-pressure section are desirable, the blower can take in a relatively small amount of (or no) fluid from the ambient or another, non-turbine exhaust source.

Figure 2A:
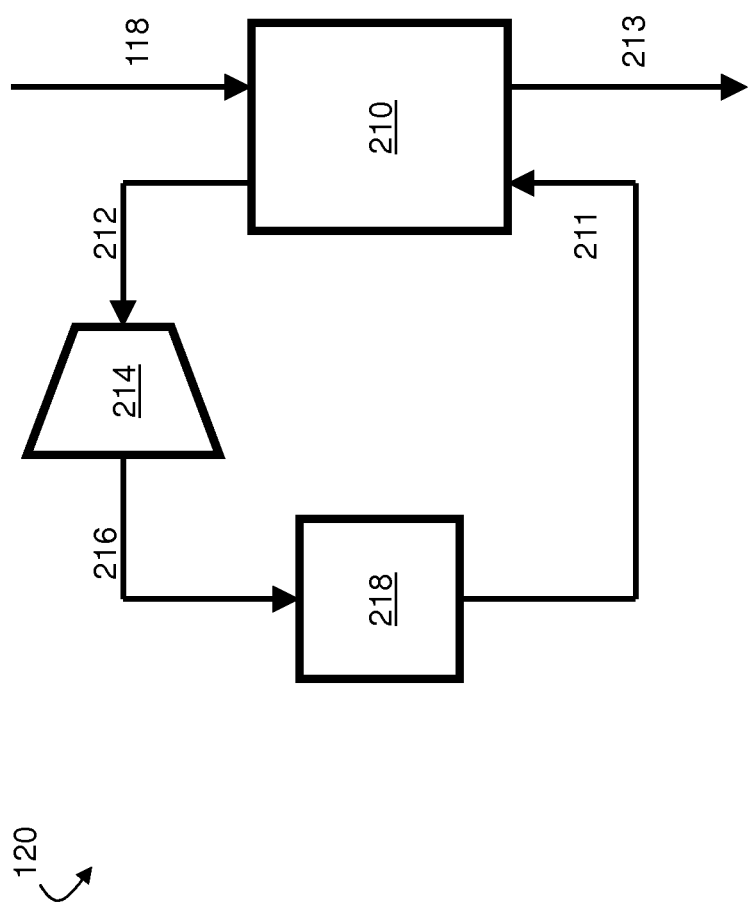

As noted above, residual heat within stream 118 from heat exchange system 112 can be exchanged within optional heat recovery system 120. Heat recovery system 120 can include a variety of configurations. For example, in some cases, a Rankine bottoming cycle can be employed to recover residual heat. FIG. 2A includes a schematic diagram illustrating the recovery of energy from stream 118 using a Rankine cycle. In FIG. 2A, stream 118, originating from heat exchange system 112, is fed to a heat exchange boiler 210. The heat within stream 118 can transferred to another fluid stream containing water (e.g., stream 211 in FIG. 2A), which can result in the production of steam or hot water. The steam produced during this exchange of heat can exit via stream 212. Boiler 210 can also produce effluent stream 213, which can include cooled fluid from stream 118. Stream 212 can be fed to steam turbine 214, where it can be used to produce energy and exhaust stream 216. Exhaust stream 216 can be condensed to water in optional condenser 218, to produce heat (which can be used in other areas of the process) a condensed stream. As shown in FIG. 2A, the condensed stream from the condenser is illustrated as being used as heat exchange boiler inlet stream 211, which can be re-heated to generate steam. Optionally, steam turbine exhaust stream 216 can be used as heat exchange boiler inlet stream 211.

In some instances, an absorption chiller can be used to recover residual heat from stream 118. FIG. 2B includes a schematic illustration of one such set of embodiments. In FIG. 2B, stream 118 is transported to absorption chiller 220, where the heat from stream 118 is used to provide energy to the absorption chiller necessary to cool a relatively warm fluid in stream 222 (e.g., ambient air) to produce a cooled fluid stream 224. In addition to producing cooled fluid stream 224, the absorption chiller can produce exhaust stream 226, which contains fluid from stream 118 that has been cooled. Cooled stream 224 can be used, for example, as part of an air conditioning system. As another example, cooled stream 224 might be used to cool system components (e.g., the gas turbine), for example, during operation in very hot climates (e.g., temperatures of 100° F. or above). One of ordinary skill in the art would be capable of selecting a suitable absorption chiller based upon the required cooling load, temperature and flow rate of incoming fluid stream 118, and other design parameters.

Figure 2C:
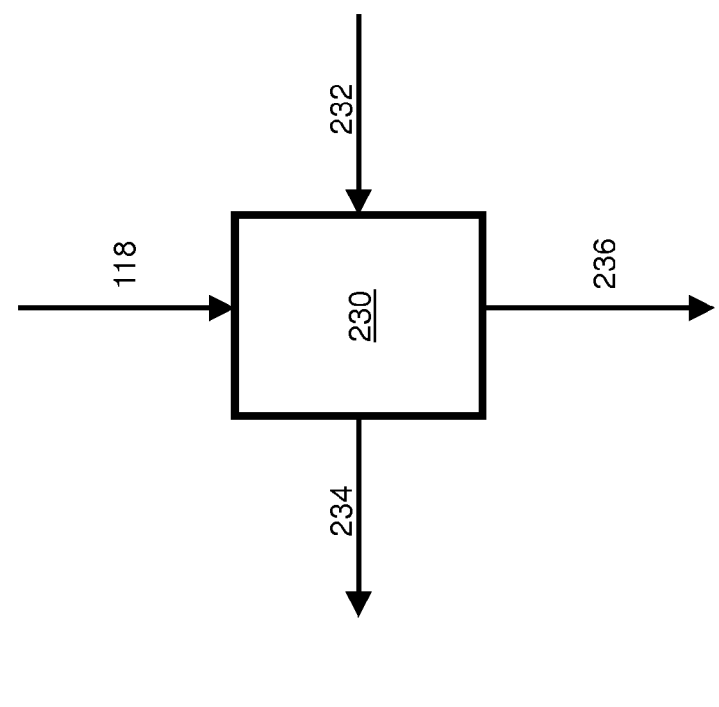

In still other cases, the residual heat within stream 118 can be used to provide heat (e.g., within other areas of the process and/or to areas outside the power generation process). FIG. 2C includes an exemplary schematic illustration of one such set of embodiments. In FIG. 2C, stream 118 is transported to heat exchanger 230, where it is used to heat relatively cool fluid in stream 232 (e.g., ambient air) to produce a heated fluid stream 234. In addition, exhaust stream 236, which contains fluid from stream 118 that has been cooled, can be produced. Heated stream 234 can be used, for example, to produce hot water or other liquids for use in a running water system, a space heating system (e.g., to provide heat one or more rooms within a building or other suitable structure), or any other suitable system in which heated fluids are required. One or ordinary skill in the art would be capable of selecting a suitable heat exchanger based upon the required heating load, temperature and flow rate of incoming fluid stream 118, and other design parameters.

The inclusion of heat recovery system 120 can lead to relatively large increases in overall system efficiency. Generally, overall system efficiency is calculated as the power produced by the system (in the form of electricity and/or in the form of a heated or cooled stream that can be used in another system, such as streams 224 and 234 in FIGS. 2B and 2C) divided by the power of the solar energy incident on the solar receiver and multiplied by 100%. In embodiments employing the Rankine bottoming cycle illustrated in FIG. 2A, the overall efficiency can approach about 50% (e.g., between about 40% and about 50%). For systems that include an absorption chiller such as the system illustrated in FIG. 2B, overall system efficiency can approach about 60% (e.g., between about 40% and about 60%). The overall efficiency of power generation systems that employ a heat exchanger to provide heat to other parts of the power generation system and/or external systems can approach about 80% (e.g., between about 40% and about 80%).

As noted above, the thermal storage system 134 in system 100 can include one or more thermal storage units. The thermal storage unit(s) can enable a practical and cost effective method to achieve thermal storage of CSP energy for use in generating electricity during hours with no or low sunlight. In some embodiments, a thermal storage unit can comprise a tank in which solid media with passages through which the fluid flows is located to store the thermal energy at relatively high temperatures (e.g., at least about 1800° F., at least about 2000° F., or higher).

Figure 3A:
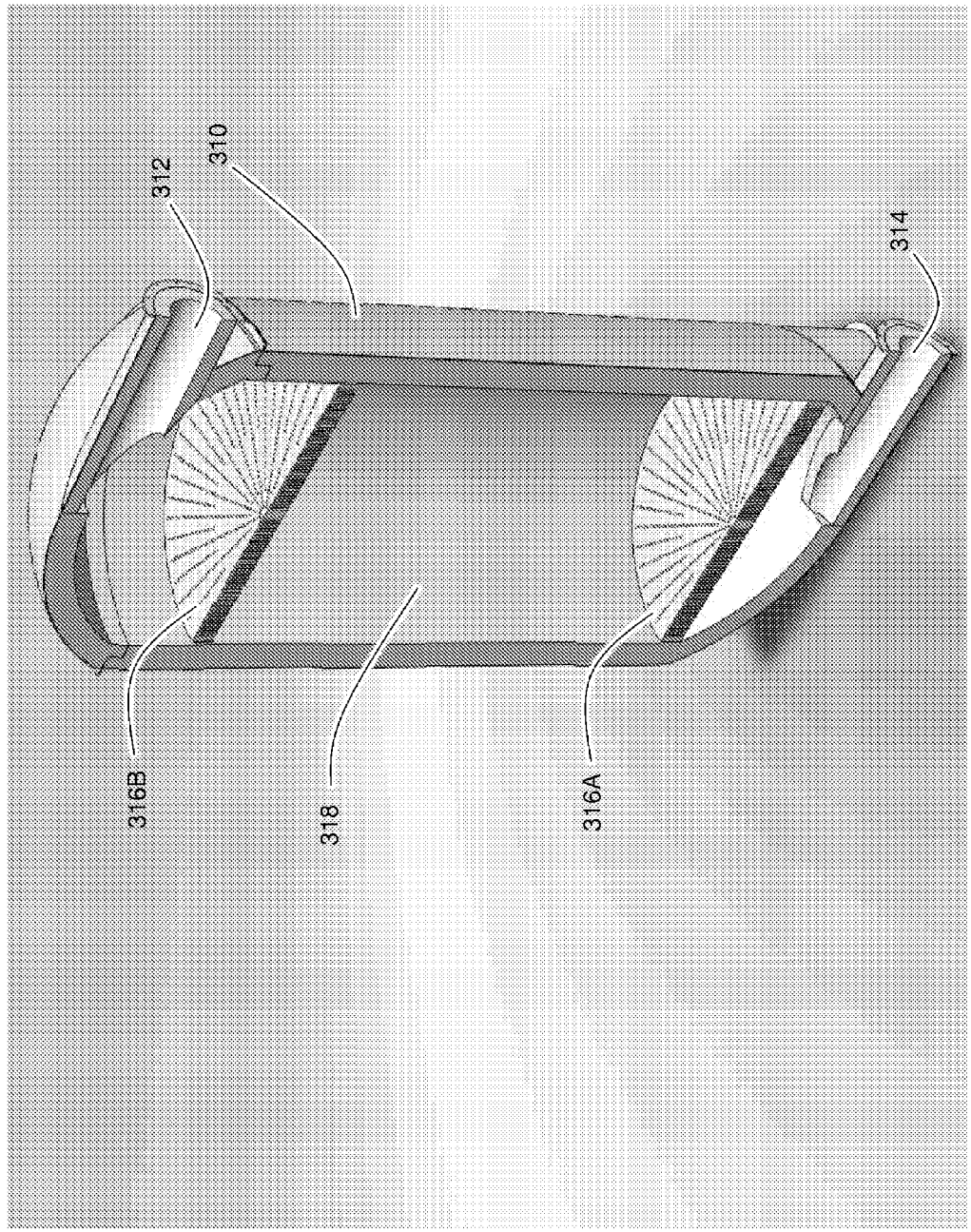
FIGS. 3A-3C include exemplary schematic illustrations of thermal storage units that can be used in a thermal storage system.
Figure 3B:
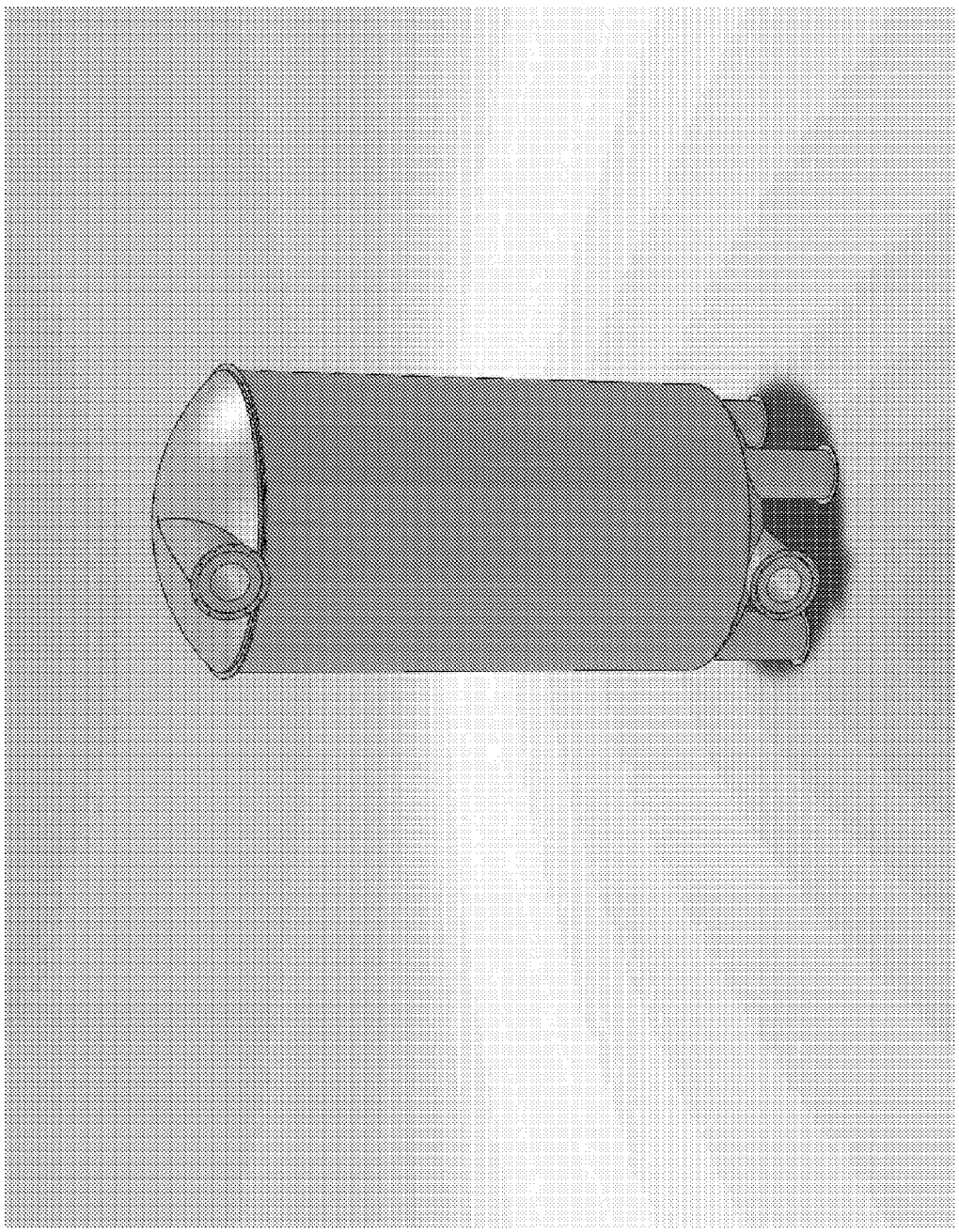
Figure 3C:
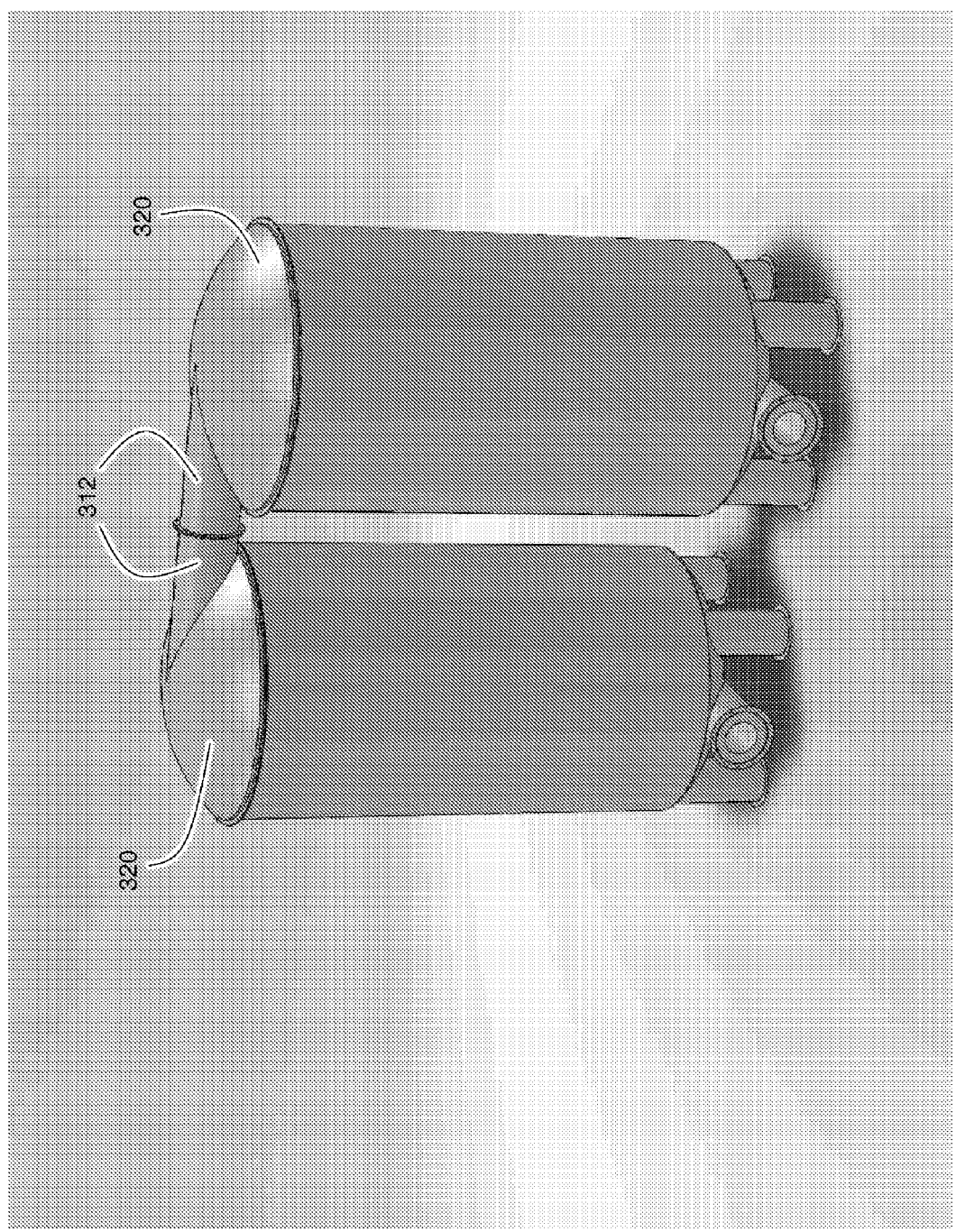

Exemplary illustrations of suitable thermal storage units are shown in FIGS. 3A-3C. FIG. 3A includes a cross-sectional view of a storage unit 310, including lines 312 and 314, each of which can function as an inlet or an outlet. Unit 310 also includes plate 316A that includes a plurality of passageways. Plate 316A is designed in this manner so fluid can be transported through the plate while the plate supports thermal storage media within volume 318, preventing the thermal storage media from entering line 314. In addition, unit 310 can include plate 316B, which can also comprise a plurality of passageways. By designing plate 316B in this manner, fluid can be transported from volume 318 and through plate 316B without entraining thermal storage media as the fluid exits line 312. By avoiding the transport of thermal storage media out of the thermal storage unit 310, one can reduce damage (e.g., erosion damage) to the turbine, blower, solar receiver, or other system components that may occur when the media contact these components.

Thermal storage unit 310 can be fabricated using a variety of materials including, for example, metals (e.g., stainless steel). In some embodiments, thermal storage unit 310 is configured such that it is a certified pressure vessel (e.g., ASME-certified, EN13445 certified, or a pressure vessel meeting a similar set of certification standards). In addition, plates 316A and 316B can be fabricated from any suitable material, including metals (e.g., stainless steel, refractory metals such as tungsten, and the like), ceramics, and/or combinations of these materials.

Thermal storage unit 310 can be fabricated in sections, such that two or more of the sections may be bolted together to assemble a storage unit having a desired volumetric capacity. Fabrication of the storage unit in sections facilitates factory construction, transport and onsite assembly of storage units having relatively large volumetric capacity. In some configurations sections of the storage unit may be in the range of 8 feet to 16 feet in length and 8 feet to 16 feet in diameter. In some configurations sections of the storage unit may be approximately 12 feet in length and 10 feet to 12 feet in diameter.

The passageways within plate 316A and/or 316B can be configured to impart a desired flow profile within volume 318. For example, the sizes (e.g., diameters, lengths), cross-sectional shapes, and/or flow angles of the pathways within plates 316A and/or 316B can be selected to achieve a desired flow profile. The openings of the fluid passageways one or both sides of plates 316A and/or 316B can be arranged in any suitable pattern including, for example, a honeycomb pattern.

As noted above, lines 312 and 314 can each function as an inlet or an outlet. For example, in some instances in which the thermal storage media within unit 310 is being heated by an incoming fluid (e.g., at a temperature of between 1800° F. and 1900° F.), line 312 can function as an inlet and line 314 can function as an outlet. In such cases, plate 316A can prevent thermal storage media from being entrained in the heating fluid and being transported through outlet 314. In some instances in which the thermal storage media within unit 310 is being used to heat an incoming fluid (e.g., at an incoming temperature of between 100° F. and 1200° F.), line 314 can function as an inlet and line 312 can function as an outlet. In such cases, plate 316B can prevent thermal storage media from being entrained in the heated fluid and being transported through outlet 312. The direction of fluid flow within unit 310 can be freely changed, depending on the mode of operation of the power generation system.

In some cases, a first portion of the gas heated by the solar receiver can be transported to the thermal storage system and a second portion of the gas heated by the solar receiver can be transported to the heat exchange system (i.e., the airflow from the solar receiver can be switched between the thermal storage system and the heat exchange system used to transfer heat from the low-pressure fluid to the high-pressure Brayton cycle fluid). In some cases, substantially all of the gas from the solar receiver is transported to the thermal storage system over a first period of time, and substantially all of the gas from the solar receiver is transported to the heat exchange system over a second period of time that does not overlap with the first period of time. For example, substantially all of the exhaust stream from the solar receiver might be transported to the thermal storage system over a first period of time, and at a later time, the flow from the solar receiver can be switched such that substantially all of the solar receiver exhaust is transported to the heat exchange system. In other cases, a first portion of the gas from the solar receiver is transported to the thermal storage system over a first period of time, and a second portion of the gas from the solar receiver is transported to the heat exchange system over the first period of time. Stated another way, the exhaust stream from the solar receiver can be split such that, simultaneously, a first portion of the solar receiver exhaust is transported to the thermal storage system and a second portion of the solar receiver exhaust is transported to the heat exchange system.

In some embodiments, the thermal storage system (including any thermal storage unit(s) within the thermal storage system) can be constructed and arranged to operate at relatively low pressures during at least a portion of the period of time over which system 100 is operated. For example, the pressure of the fluid within the thermal storage system (including any thermal storage unit(s) within the thermal storage system), for example, during heating of the thermal storage system and/or during heating of a fluid being transported through the thermal storage system, can be up to and including 2 atmospheres, less than about 1.5 atmospheres, less than about 1.25 atmospheres, less than about 1.1 atmospheres, between about 0.9 and about 2 atmospheres, between about 0.9 and about 1.5 atmospheres, between about 0.9 and about 1.25 atmospheres, or between about 0.9 and about 1.1 atmospheres. In some cases, the thermal storage system can be constructed and arranged such that the fluid within the thermal storage system is not substantially compressed, with the exception of incidental compression that might occur due to the heating and/or transport of the fluid, before being transported to the thermal storage system. For example, the fluid within the thermal storage system can be substantially equal to the pressure of the surrounding environment, in some cases. In some embodiments, the thermal storage system 134 is operated at relatively low pressures when being heated by a low-pressure fluid (e.g., low pressure fluid in stream 136 from solar receiver 102). In some embodiments, thermal storage system 134 is operated at relatively low pressures when being used to pre-heat a fluid that is to be transported to turbine 122.

It should be understood that the invention is not limited to the use of low-pressure fluid within thermal storage system 134, and that, in some embodiments, high-pressure fluid can be transported through thermal storage system 134 during operation of system 100. For example, in some embodiments, a relatively high-pressure fluid (e.g., at a pressure of above 2 atmospheres, at least about 2.1 atmospheres, at least about 2.25 atmospheres, at least about 2.5 atmospheres, at least about 3 atmospheres, at least about 4 atmospheres, at least about 5 atmospheres, at least about 10 atmospheres, or at least about 15 atmospheres, and, in some embodiments, up to 50 atmospheres) can be transported through and heated by thermal storage system 134 (e.g., after thermal storage system 134 has been heated by a fluid, such as a low-pressure fluid from solar receiver 102). After the high-pressure fluid is heated by thermal storage system 134, it can be transported to turbine 122 to generate power, in some embodiments.

In many previous thermal storage systems, high pressures are employed, which can increase the expense required to construct the systems. Other previous thermal storage systems have used a variety of salts or other materials that undergo a phase change, many of which materials were also very expensive. By being unpressurized and fully factory produced along with low-cost fill (thermal storage) media this approach dramatically reduces CSP thermal storage system cost. Using the CSP thermal storage tanks in modular form as part of the CSP tower could further improve the capital costs associated with the system.

The thermal storage units within the thermal storage system can be modular, in some cases, which can allow one to easily scale a system in order to allow a CSP system to operate to produce a given power for a given time without low or no sunlight. For example, FIG. 3B includes a system in which a single unit is used to store thermal energy. In FIG. 3C, two thermal storage units are connected (e.g., by rotating caps 320 such that lines 312 face each other) to double the thermal storage capacity. Of course, the amount of energy delivered by the thermal storage unit(s) can be altered in other ways by, for example, only partially filling one or more units with media and/or limiting the degree to which one or more sections of a single unit are heated (which might include establishing a thermal gradient along the longitudinal axis of one or more storage units).

In some embodiments, the tanks can be sized to achieve relatively easy transport. For example, each thermal storage unit could be between about 2 and about 12 feet in diameter, and up to 40 feet long to enable easy shipment. The thermal storage units can be filled on site or prior to delivery to the site, which can allow for cost effective production and reduce on site construction cost and/or schedule delays.

A variety of fill media can be used in the thermal storage unit(s) in the thermal storage system. The fill media can comprise a variety of materials with high heat capacities that are able to retain their structures at high temperatures, such as ceramics and other refractory materials. Exemplary materials include, but are not limited to, materials comprising aluminum oxides, iron oxides, silicon oxides, and/or magnesium oxides such as fire brick, mullite, magnetite, PYRO GRAN 35/38, PYRO KOR 60NR, PYRO KOR 95NK, and/or PYROFER 70. In some embodiments, the thermal storage media has a heat capacity of at least about 600 J/kg K, at least about 800 J/kg K, or at least about 900 J/kg K. It can be advantageous, in some embodiments, to use materials with relatively low densities (e.g., less than about 5 g/cm$^3$, less than about 3 g/cm$^3$, or less than about 2 g/cm$^3$).

The thermal storage media within the thermal storage unit(s) can be of any suitable form factor and size. For example, pellets (e.g., substantially spherical pellets or pellets with any of the shapes described below) with maximum cross-sectional diameters in mm, cm, or larger length scales can be used as the thermal storage media, in some instance.

In some embodiments, the thermal storage media can comprise pellets, and at least about 50%, at least about 75%, at least about 90%, at least about 95%, or at least about 99% of the pellets have maximum cross-sectional diameters of less than about 100 cm, less than about 10 cm, less than about 1 cm, between about 1 mm and about 100 cm, or between about 1 cm and about 100 cm. Suitable pellet shapes include, but are not limited to, shapes that are substantially rectangular prisms (e.g., bricks, substantially cubic shapes), substantially triangular prisms, substantially spheres, bow ties, honeycombs, saddles, and the like. In one set of embodiments, the thermal storage media can comprise elongated tubes through which heated fluid is transported.

In some embodiments, the interior of the thermal storage unit(s) can be lined with a thermally insulating material and/or the outside of the thermal storage unit(s) can be covered with a thermally insulating material to reduce heat loss to the atmosphere. For example, when the tank is manufactured out of metal, the tank can be lined with and/or covered with a refractory material (e.g., ceramics such as alumina, silica, magnesia, and the like). In some embodiments, the refractory material can be cast in place and/or can comprise a multi-layered structure in which the density and/or heat capacity can vary from layer to layer. In some embodiments, the thickness of the thermally insulating lining within the unit(s) can be between about 5 inches and about 15 inches (e.g., for a tank with a diameter up to 12 feet and a length of up to 40 feet). In some embodiments, the thickness of the thermally insulating material on the exterior of the thermal storage unit(s) can be up to 1 foot or up to 2 feet in thickness.

Figure 4A:
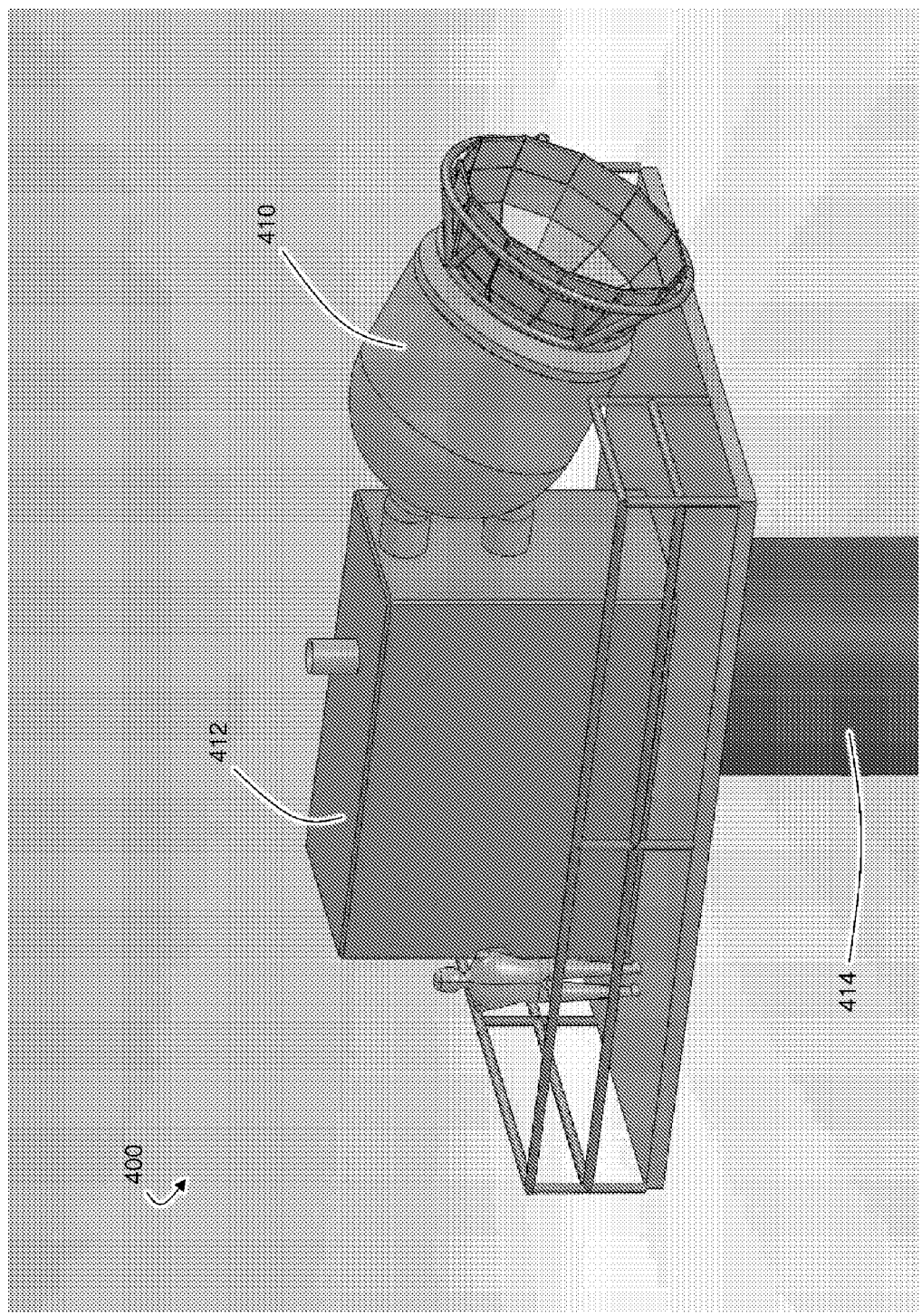
FIGS. 4A-4B include, according to one set of embodiments, schematic illustrations of power tower systems.

As noted above, the components of the CSP system can be positioned in various parts of a solar power tower. FIG. 4A includes a schematic illustration of one set of power tower embodiments. The system 400 in FIG. 4A includes solar receiver 410 fluidically connected to turbine package 412, which can include a gas turbine and a compressor. In this embodiment, the turbine package 412 is made as a single modular unit that can be completely assembled at a factory, shipped to an operation site (e.g., by truck or railroad car), and placed (e.g., by crane) onto a tower structure 414. The turbine package 412 may include not only a compressor and gas turbine, but also a heat exchanger, or recuperator, unit, an electric generator and related power electronics, a supplemental heater and/or control valves and other components to control the operation of one or more portions of the power generation system. The turbine package 412 may be made and shipped as a single unit with the receiver 410 (which in this embodiment also includes the secondary collector), or the package 412 and receiver 410 may be made as separate modular units and assembled together on the tower structure 414 at the operation site. By making turbine and receiver sections in a modular arrangement, manufacturing of the modular units may be made more efficient. That is, the turbine package 412 and receiver 410 may be made in a factory setting, with skilled technicians building and testing the package 412 and receiver 410 before being sent to an operation site. The package 412 and receiver 410 may be tested in real conditions, e.g., on a tower or other structure that received sunlight from a heliostat field, or in more artificial conditions. For example, the turbine package 412 may be tested by supplying heated air or other fluid to the package 412 that is heated by fuel combustor or other suitable arrangement. Similarly, the receiver 410 may be tested by illuminating the receiver 410 with artificial light or other radiation that does not originate from a heliostat field. In this way, the package 412 and receiver 410 may be tested individually, or as a functioning whole, under different conditions (such as low light levels, high light levels, high and/or low ambient temperature conditions, high and low power output conditions, etc.) As a result, steps may be taken to help ensure that fully functioning turbine package 412 and/or receiver 410 units are shipped to an operation site.

In some embodiments, one or more thermal storage units can be incorporated as part of a tower structure 414 which can, for example, allow for relatively easy assembly and further reduce the overall cost of the CSP system. For example, thermal storage media can be stored within tower structure 414, which can serve as the thermal storage unit. For example, in the set of embodiments illustrated in FIG. 4A, tower structure 414 can be filled with thermal storage medium and provide thermal storage capability for system 400. In another embodiment, the tower structure 414 may be arranged to house one or more thermal storage tanks like that shown in FIGS. 3A-3C. If two or more tanks are provided, the tanks may be stacked within the tower structure 414. Arranging the tanks within the tower structure 414 may provide different features such as reducing the overall footprint of the power generating unit, providing additional thermal cover for the tanks, and/or enhancing the strength of the tower structure 414. For example, the tanks may be incorporated into the tower structure 414 so as to not only provide thermal storage, but also provide structural support for the tower structure 414. Like the receiver 410 and turbine package 412, the energy storage tanks and/or tower structure 414 may be made in one or more modular units that are shipped to an operation site and assembled together.

Figure 4B:
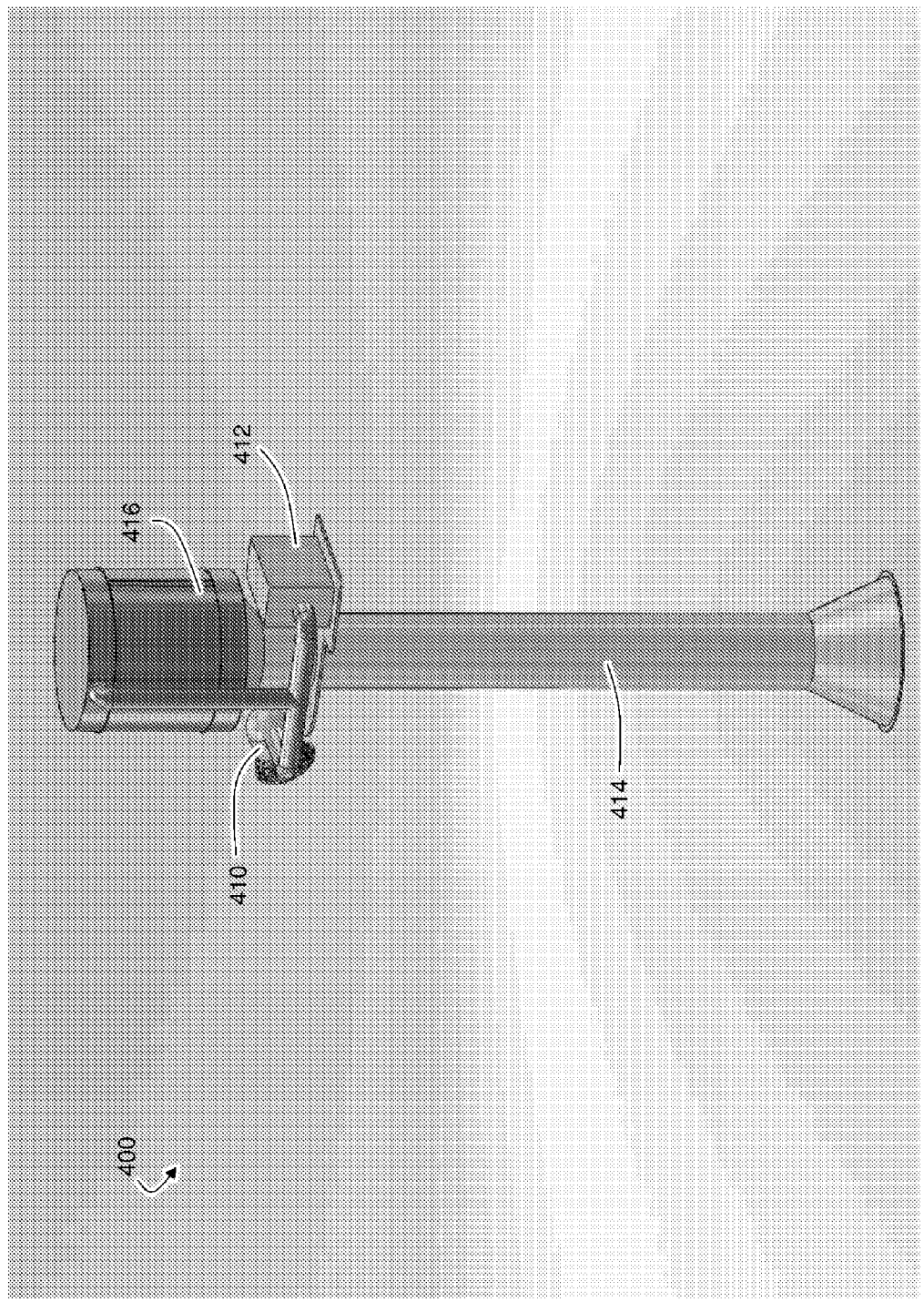

FIG. 4B illustrates another set of embodiments that includes thermal storage unit 416, independent of tower structure 414. That is, in this embodiment, a thermal storage tank 416 is mounted to the top of the tower structure 414 with the receiver 410 and turbine package 412. The receiver 401, turbine package 412 and tank 416 may be made as a single modular unit that may be manufactured at a factory and shipped (e.g., by truck or railcar) to an operation site and placed on top of a tower structure 414, or the receiver 410, turbine package 412 and/or tank 416 may be made as separate modular units. A modular structure may significantly reduce assembly costs at the operation site, e.g., because the receiver 410, turbine package 412 and tank 416 may be placed by crane on the tower structure 414 and be ready for operation with only relatively minimal assembly at the operation site. For example, if made as a single unit, placement of the receiver 410, turbine package 412 and tank 416 may require only electrical power hookups and connection to the tower 414 for the system to be ready for energy generation.

One advantage provided by aspects of the invention relates to the decreased overall weight of the power generation system, e.g., including the receiver 410 and turbine package 412 of FIG. 4A. In one set of embodiments, the total weight of the receiver 410 and turbine package 412 may be approximately 50 tons per MWe power output. For example, a 1 MWe system may have the receiver 410 and turbine package 412 weigh approximately 100,000 pounds (or 50 tons). Of course, the weight of the components may vary depending on a variety of factors, and thus the weight per MWe power output may vary from about 25 to 100 tons/MWe or more. (It is envisioned that tower-based solar power generation system according to aspects of the invention may be constructed for power output ranging from about 100 kWe to 5 MWe. Of course, smaller and larger output systems are possible, but may not be economically feasible (e.g., small output systems may not be economically justify installation costs) or technically feasible (e.g., large output systems may have receiver and turbine package weights that are too large for sensible tower deployment.)

Although the embodiments shown in FIGS. 4A and 4B show the receiver 410, turbine package 412 and/or tank 316 arranged in a modular format, the various components of the power generation system need not be arranged in modular units. Instead, in some embodiments, the individual pieces of the system (such as a gas turbine, compressor, recuperators, receiver, collector, etc.) may be assembled in place on the tower. Thus, aspects of the invention are not necessarily limited to modular arrangements of components that are attached to a tower structure 414.

As mentioned above, in some embodiments, the power generation system can include a solar receiver operating at a relatively high pressure (e.g., above 2 atmospheres, at least about 3 atmospheres, at least about 4 atmospheres, at least about 5, at least about 10, or at least about 15 atmospheres) in place of or in addition to the solar receiver operating at a relatively low pressure.

Figure 5:
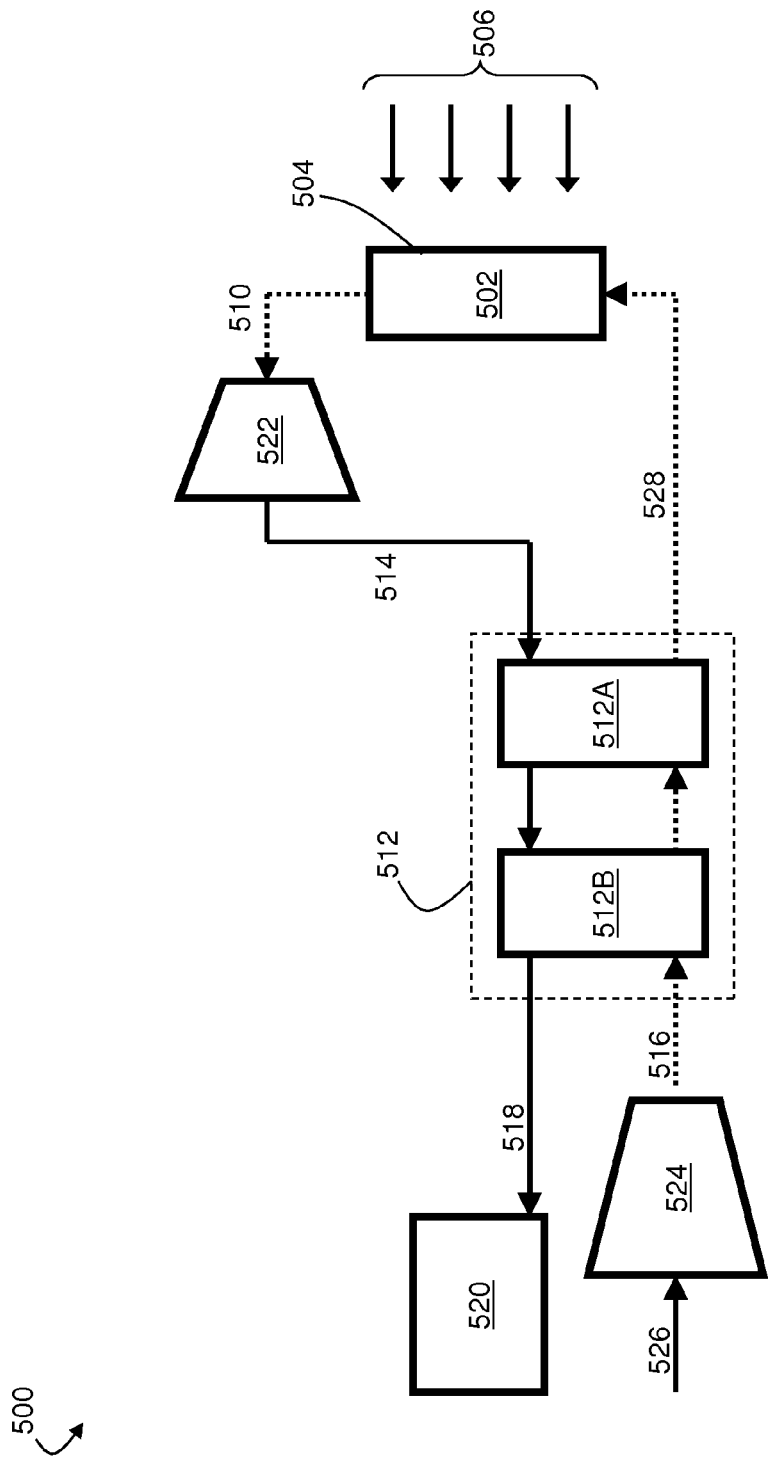
FIG. 5 includes an exemplary schematic diagram of a concentrated solar power generation system including a high pressure solar receiver.

FIG. 5 includes an exemplary schematic diagram of a concentrated solar power generation system 500 including a high pressure solar receiver. In FIG. 5, fluid stream 526 (e.g., comprising ambient air) is fed to compressor 524, where it is compressed to a relatively high pressure. High pressure stream 516 from compressor 524 is then fed to heat exchange system 512, which can comprise one or more heat exchangers. In the set of embodiments illustrated in FIG. 5, two heat exchangers (512A and 512B) are shown, although in other embodiments a single heat exchanger or more than two heat exchangers may be used. For example, in some cases, a single rotary heat exchanger (e.g., a ceramic rotary heat exchanger, a metal rotary heat exchanger) can be used in heat exchange system 512. In other cases, two or more rotary heat exchangers (e.g., ceramic rotary heat exchangers, metallic rotary heat exchangers, or combinations of the two) can be used in heat exchange system 512.

In the set of embodiments illustrated in FIG. 5, heated high pressure stream 528 from heat exchange system 512 is transported to high pressure solar receiver 502, where it is further heated via incident solar radiation 506 passed through surface 504. High pressure, high temperature stream 510 is then transported to turbine 522 (e.g., a gas turbine, which can be part of a Brayton cycle), where the stream is used to produce power. Exhaust stream 514 from gas turbine 522 can be transported to heat exchange system 512, where the residual heat in the stream can be used to pre-heat the compressor exhaust stream 516. Exhaust stream 518 can, in some cases, be used to provide energy to a heat recovery system 520, which can comprise any of the components described above in relation to heat recovery system 120. The high pressure receiver system outlined in FIG. 5 can be useful, for example, in embodiments in which a single crystal nickel receiver is employed.

Figure 6:
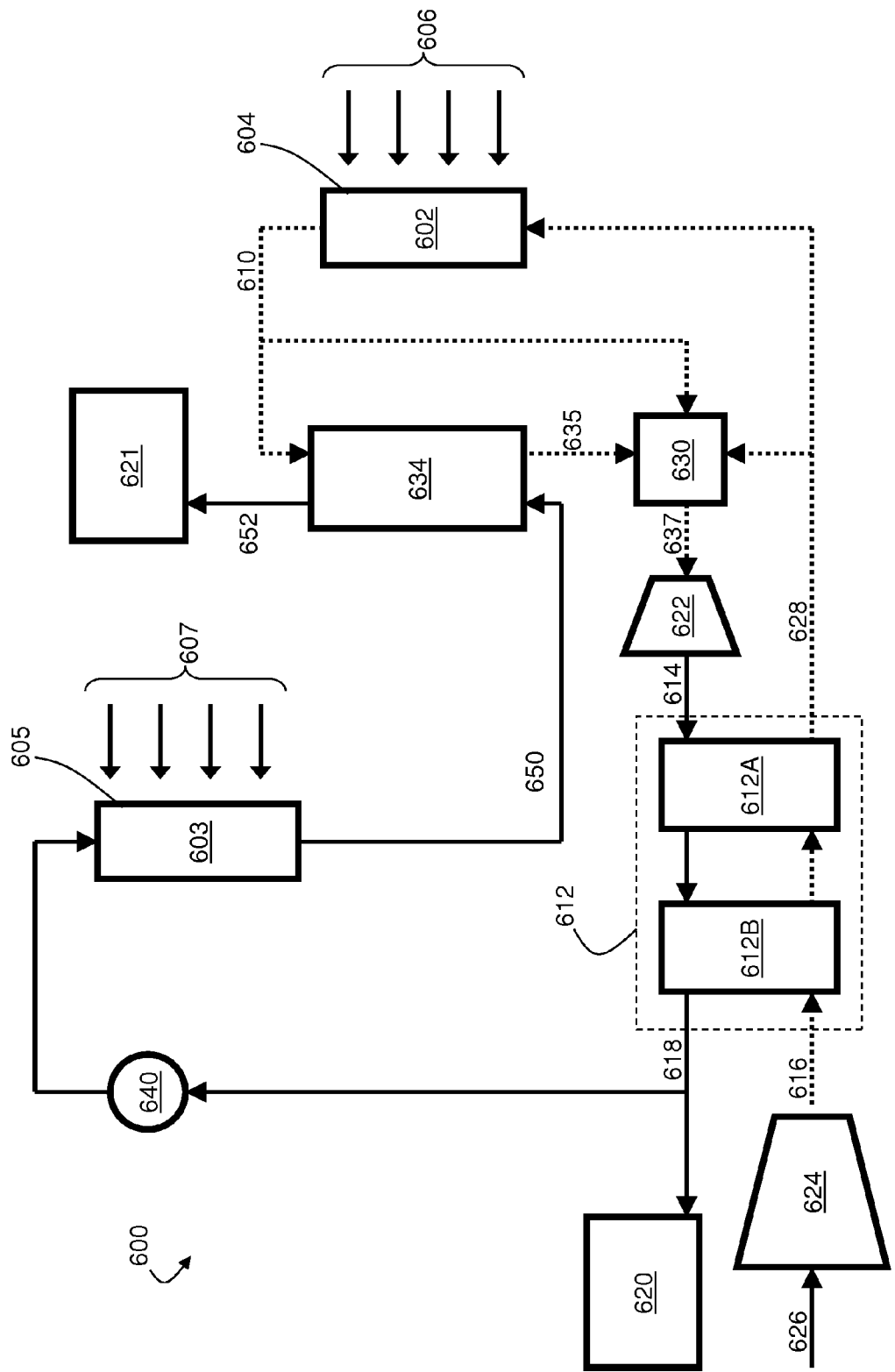
FIG. 6 includes a schematic diagram of a concentrated solar power generation system including multiple solar receivers, according to some embodiments.

FIG. 6 includes an exemplary schematic illustration of a power generation system 600 in which two solar receivers are employed. In the set of embodiments illustrated in FIG. 6, fluid stream 626 (e.g., comprising ambient air) is fed to compressor 624, where it is compressed to a relatively high pressure. High pressure stream 616 from compressor 624 is then fed to heat exchange system 612, which can comprise one or more heat exchangers. In the set of embodiments illustrated in FIG. 6, two heat exchangers (612A and 612B) are shown, although in other embodiments a single heat exchanger or more than two heat exchangers may be used. For example, in some cases, a single heat exchanger (e.g., a rotary heat exchanger such as a ceramic rotary heat exchanger or a metal heat exchanger, or any other type of high temperature heat exchanger) can be used in heat exchange system 612. In other cases, two or more heat exchangers (e.g., two or more rotary heat exchangers such as ceramic rotary heat exchangers or metallic heat exchangers, or combinations of the two, or two or more of another type of high temperature heat exchanger) can be used in heat exchange system 612.

In FIG. 6, a portion of heated high pressure stream 628 from heat exchange system 612 is transported to high pressure solar receiver 602, where it is further heated via incident solar radiation 606 passed through surface 604. In some cases, a portion of high pressure stream 628 can be transported to combustor 630, where it can be further heated. A portion of high pressure, high temperature stream 610 exiting the high pressure solar receiver 602 can be transported to combustor 630, where it can be further heated, if necessary.

In some cases, at least a portion of high pressure, high temperature stream 610 exiting the high pressure solar receiver 602 can be transported to a thermal storage system 634. Stream 610 can be used to deliver energy to the thermal storage system, in some embodiments. In some cases, thermal storage system 634 can absorb heat from a low pressure stream exiting low pressure solar receiver 603, described in more detail below. In some such cases, a high pressure, high temperature stream 635 exiting thermal storage system 634 can be transported to combustor 630, where it can be optionally further heated. The fluid streams transported to combustor 630 can be subsequently transported to gas turbine 622 via stream 637, where they can be used to generate power.

The turbine exhaust stream 614 can be transported to heat exchange system 612, where the residual heat can be used to pre-heat compressor exhaust stream 616 before it is transported to high pressure solar receiver 602. In some cases, a portion (or all) of the exhaust stream 618 from heat exchange system 612 can be transported to a second, low pressure solar receiver 603 (in some cases, via optional blower 640). The fluid within the low pressure solar receiver 603 can be heated via incident solar radiation 607 transmitted through surface 605. The low pressure receiver exhaust stream 650 can be transported to thermal storage system 634, where it can be used to supply heat (which can be used, for example, to heat all or part of high pressure solar receiver exhaust stream 610). The low pressure stream 652 exiting thermal storage system 634 can be used, in some embodiments, within thermal recovery region 621, which can include any of the components described above in relation to heat recovery system 120.

In some cases, the thermal storage system can include a first portion constructed and arranged to be operated at a relatively high pressure (e.g., at least about 3, at least about 4, at least about 5, at least about 10, or at least about 15 atmospheres), and a second portion constructed and arranged to be operated at a relatively low pressure (e.g., equal to or less than about 2, less than about 1.5, less than about 1.25, or less than about 1.1 atmospheres, between about 0.9 and about 2 atmospheres, between about 0.9 and about 1.5 atmospheres, between about 0.9 and about 1.25 atmospheres, or between about 0.9 and about 1.1 atmospheres). For example, in the set of embodiments illustrated in FIG. 6, thermal storage system 634 includes a first portion constructed and arranged to handle the flow of low-pressure stream 650 and a second portion constructed and arranged to handle the flow of high-pressure stream 610.

In some embodiments, a portion of exhaust stream 618 from heat exchange system 612 can be transported to thermal recovery region 620, which can include any of the components described above in relation to heat recovery system 120.

Many of the components illustrated in the figures are fluidically connected. As a specific example, receiver 102 and heat exchange system 112 in FIG. 1 are illustrated as being directly fluidically connected. In addition, in FIG. 1, heat recovery system 120 and gas turbine 122 are illustrated as being fluidically connect (although not directly fluidically connected). Two components are said to be "fluidically connected" when they are constructed and arranged such that a fluid can flow between them. In some cases, two components can be "directly fluidically connected," which is used to refer to a situation in which the two components are constructed and arranged such that a fluid can flow between without being transferred through a unit operation constructed and arranged to substantially change the temperature and/or pressure of the fluid. One of ordinary skill in the art would be able to differentiate between unit operations that are constructed and arranged to substantially change the temperature and/or pressure of a fluid (e.g., a compressor, a condenser, a heat exchanger, etc.) and components are not so constructed and arranged (e.g., a transport pipe through which incidental heat transfer and/or pressure accumulation may occur). It should be understood that, while two components might be illustrated as being directly fluidically connected in the figures, other embodiments can include arrangements in which they are fluidically connected but not directly fluidically connected.

In some embodiments, solar receivers, such as those shown in FIGS. 7A-D, are designed and constructed to be used in conjunction with the power generation systems provided herein. The exemplary solar receivers in FIGS. 7A and 7B comprise a low pressure fluid chamber 700 that is designed and constructed to provide an insulated casing 700, which acts to reduce or eliminate thermal losses from the solar receiver and to contain a low pressure working fluid. The low pressure solar receivers comprises a transparent object 703 positioned at the front of the low pressure fluid chamber 700 adjacent to the opening 708 for receiving solar radiation.

Figure 7A:
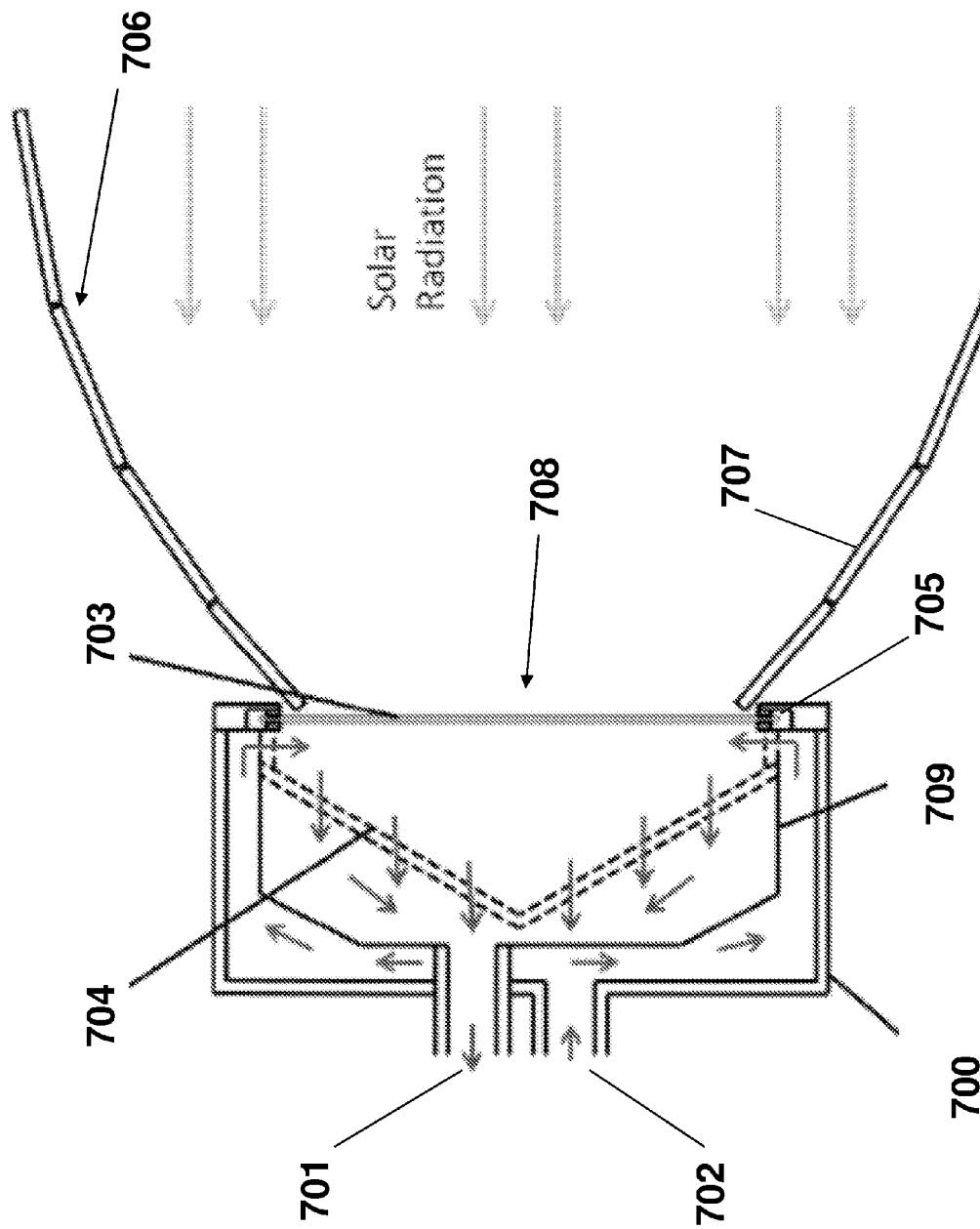
FIGS. 7A-7E include exemplary schematic illustrations of low-pressure solar receivers.
Figure 7B:
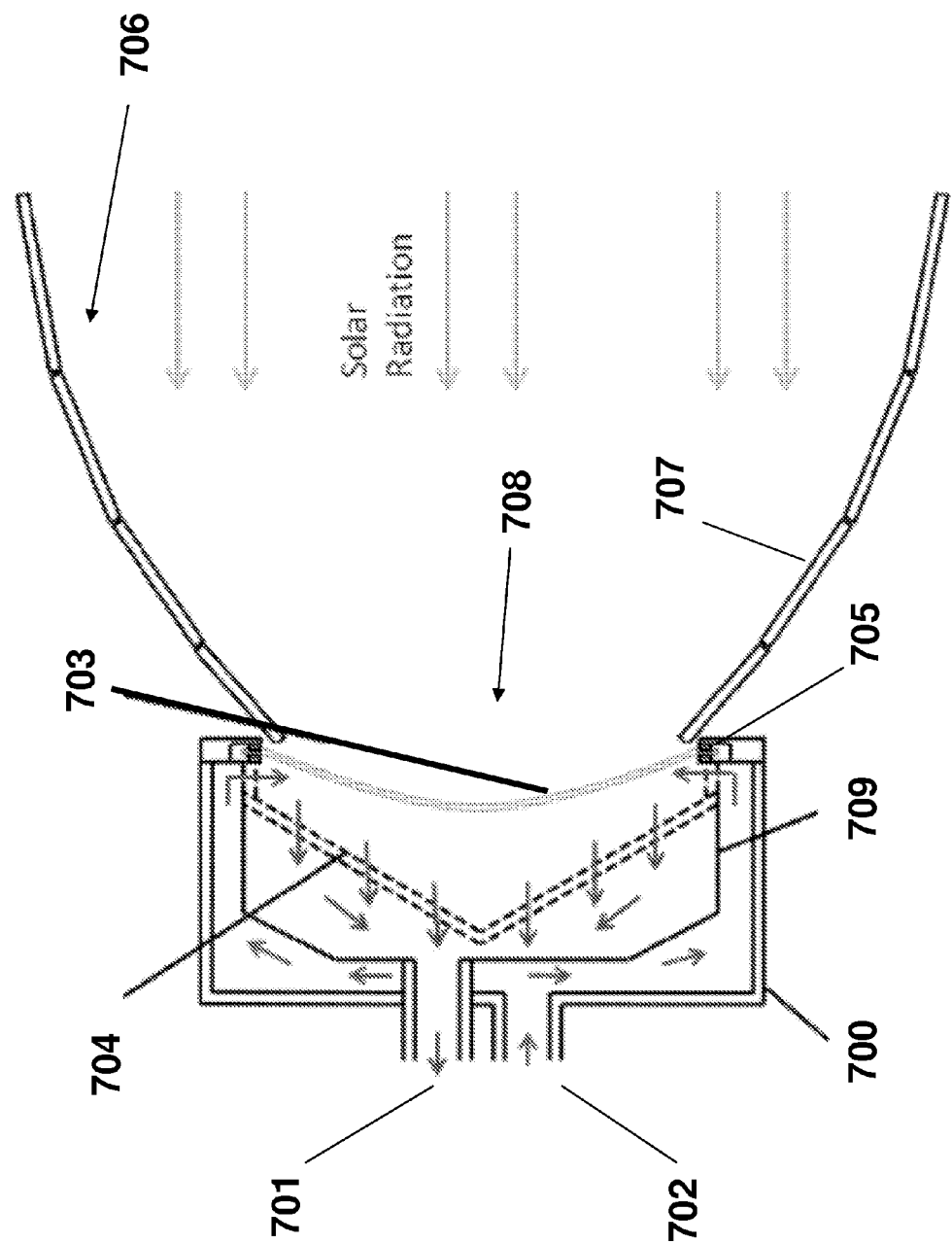

In the embodiments depicted in FIGS. 7A and 7B, a fluid path is defined within the low pressure fluid chamber 700, such that a relatively low temperature working fluid (e.g., a fluid having a temperature in a range of 300° C. to 800° C.) entering the fluid inlet 702 at the rear of the receiver, passes through the receiver around the periphery of a liner 709 into a front region of the fluid chamber 700 and across the transparent object 703 (e.g., a window). By passing across the transparent object 703, the relatively low temperature working fluid acts, in part, to cool the transparent object 703, which is heating, in part, by incident solar radiation and thermal radiation from a solar absorber 704. The relatively low temperature working fluid passes through the solar absorber 704 wherein it is further heated by the solar absorber 704. Within the solar absorber the relatively low temperature working fluid is converted to a relatively high temperature working fluid (e.g., a fluid having a temperature in a range of above 800° C. to 1200° C.). The relatively high temperature working fluid exits the low pressure fluid chamber 700 through a fluid outlet 701. After leaving the solar receiver, in some embodiments, the relatively high temperature working fluid is directed to a gas turbine system, a thermal storage system (e.g., a sensible heat storage system), or other thermal energy system, as is exemplified elsewhere herein.

Typically, a solar absorber, such as that depicted in FIG. 7A, is constructed of a material that can withstand relatively high temperatures (e.g., temperatures in excess of 1000° C.) and that has sufficient thermal properties (e.g., thermal conductivity, emissivity) to absorb thermal energy from incident solar radiation and transfer thermal energy to a working fluid passing within the solar receiver. In some cases, the solar absorber is constructed of a material such as a metal, (e.g., high-temperature alloy, heat resistant cast alloy), a refractory material (e.g., a ceramic) or a carbon-based material. The solar absorber is often constructed of a ceramic material such as a glass ceramic, silicon carbide, silicon nitride, or silicon oxide.

The solar absorber 704 of a low pressure receiver, such as that depicted in FIG. 7A, typically has a high surface area to facilitate the transfer of thermal energy to a working fluid passing within the solar receiver. The solar absorber 704, in some embodiments, is designed and constructed to have a network (e.g., a honeycomb network, a shell and tube network, a foam network, etc.) of fluid passages through which the working fluid passes. The solar absorber 704 is immobilized within the low pressure chamber such that a relatively low temperature working fluid traveling within the fluid flow path of the low pressure chamber 700 is directed to enter the solar absorber 704, passing through the network of fluid passages of the solar absorber 704, wherein the working fluid acquires heat from the solar absorber 704.

While the solar absorber 704 depicted in FIGS. 7A and 7B has an angular shape, the solar absorbers are not so limited and other suitable shapes may be constructed and used with the solar receivers disclosed herein. For example, a solar absorber may have a planar shape, an elliptical shape, a parabolic shape, a disc shape, a polyhedron shape or other suitable shape.

The transparent object 703 of the solar receiver depicted in FIG. 7A is positioned at the front of the low pressure fluid chamber 700 adjacent to the opening 708 for receiving solar radiation. The outer rim of the transparent object 703 is fitted within a recess 705 of the low pressure fluid chamber 700. The transparent object 703 and the low pressure chamber 700 are typically constructed of materials having different coefficients of thermal expansion. For example, the transparent object 703 is typically constructed of a glass material (e.g., silica, quartz, etc.), whereas the low pressure chamber 700 is typically constructed of a metal (e.g., stainless steel, aluminum). When the transparent object 703 and low pressure chamber 700 are subjected to thermal fluctuations, such as those which occur between activity and lack of activity of the solar receiver, there is often differential thermal expansion and contraction of the two components. Thus, the connection between the transparent object 703 and the low pressure fluid chamber 700 must typically be designed and constructed to accommodate differential movement between the two components.

In some embodiments, a flexible seal is provided between an interface on the low pressure fluid chamber 700 and the transparent object 703. The interface may be within a recess 705 within which the transparent object 703 is positioned and/or secured. The recess 705 may have an internal diameter that exceeds the outside diameter of the transparent object 703, thereby allowing expansion of the transparent object 703 within the recess 705. The seal is often subjected to relatively high temperatures (e.g., temperatures in excess of 500° C.), and thus, is typically produced from a material that can withstand relatively high temperatures. The seal may be produced, in some embodiments, from a metal, a carbon-based material, or a silicone-based material. In some embodiments, the seal is produced from a room-temperature vulcanizing (RTV) silicone elastomer. In some embodiments, the seal is a metallic gasket. Other appropriate seal materials will be apparent to the skilled artisan.

The low pressure fluid chamber 700, in certain embodiments, is designed and constructed to have a maximum allowable working pressure of up to and including 2 atmospheres. As used herein, the term "maximum allowable working pressure" refers to the maximum pressure a pressure vessel can maintain, e.g., the maximum pressure that the weakest component of an assembled solar receiver can maintain. Often the maximum allowable working pressure is determined by conducting a hydrostatic pressure test. Methods for conducting a hydrostatic pressure test are well known in the art and will be apparent to the skilled artisan. In one embodiment, the maximum allowable working pressure of a solar receiver is determined by essentially completely assembling the solar receiver, capping off the fluid inlet(s) and the fluid outlet(s), and pressurizing the low pressure chamber of the solar receiver with an inert gas, e.g., air. The low pressure chamber is pressurized, in this embodiment, with the inert gas at a relatively slow rate, e.g., at a rate in a range of 1 psi/second to 5 psi/second, until the low pressure chamber can no longer maintain pressure. The highest pressure maintained during the test is the maximum allowable working pressure of the solar receiver. In certain embodiments, the weakest component of the solar receiver, such as the solar receiver depicted in FIG. 7A, is the seal between the transparent object and the low pressure chamber.

As illustrated by FIGS. 7A and 7B, the transparent object 703 may have a variety of shapes. For example, the transparent object 703 may have a planar shape (as depicted in FIG. 7A) such as a planar disc or a planar object having a polygonal cross-section such as a rectangular or square cross-section. The transparent object may have a relatively slight curvature inward (as depicted in FIG. 7B) toward the solar absorber. The transparent object may have a semi-circular shape, a parabolic shape, an elliptical shape, etc. In some embodiments, a curvature inward toward the solar absorber serves to minimize tensile stress due to thermal expansion in the transparent object. Thus, in certain embodiments, the transparent object has a certain radius of curvature. The transparent object may, for example, have a radius of curvature of 1 foot to 50 feet, 1 foot to 10 feet, 1 foot to 5 feet or 1 foot to 2 feet. The transparent object may have a radius of curvature of up to 1 foot, 2 feet, 3 feet, 4 feet, 5 feet, 10 feet, 25 feet, 50 feet, or more.

Figure 7C:
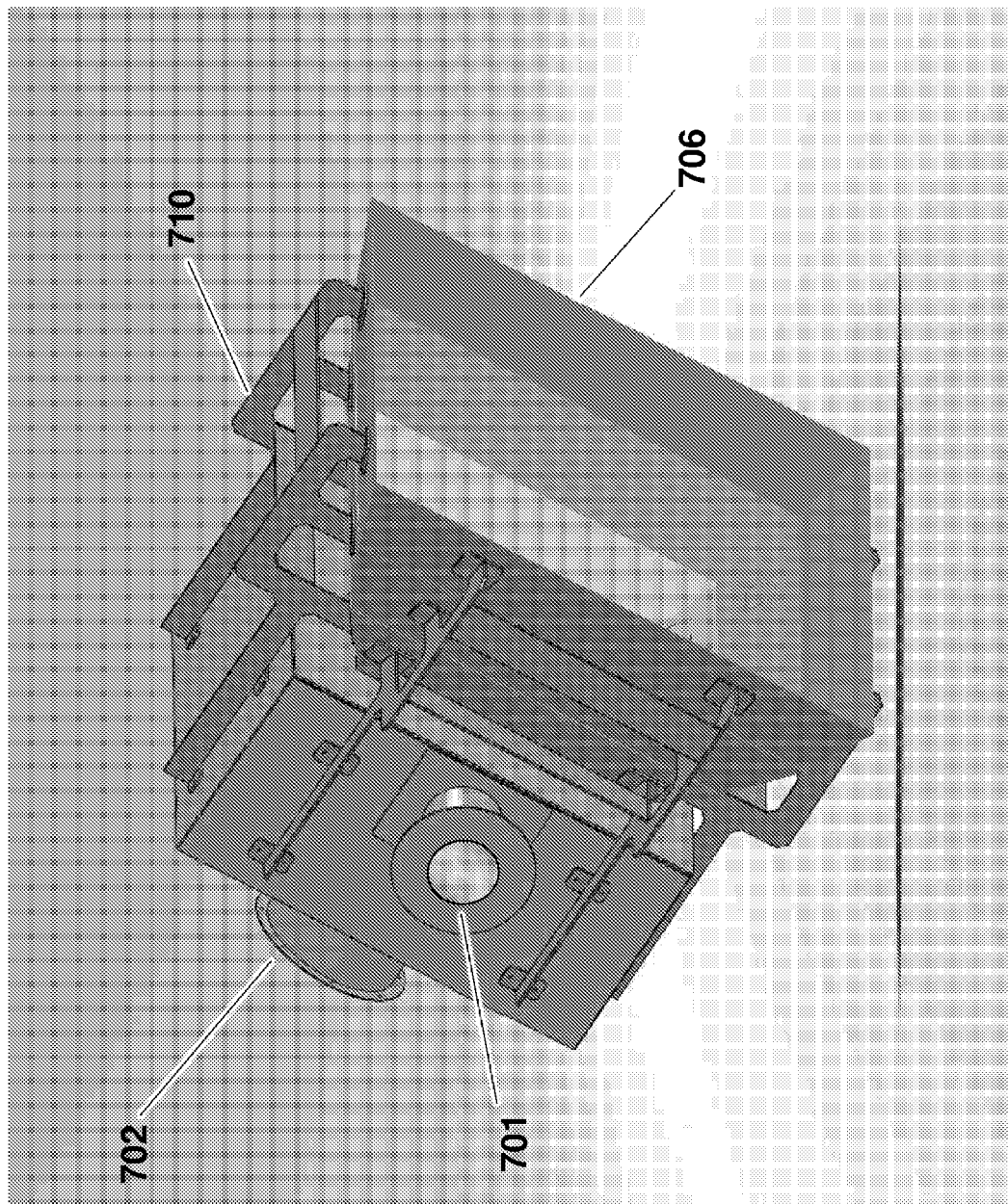

The solar receivers depicted in FIGS. 7A-7C operate at low pressure (e.g., up to and including 2 atmospheres). Because the transparent object 703 is subjected to relatively small hydrostatic stresses under normal operation, it may be constructed to have a relatively large diameter and relatively small thickness. In some embodiments, the transparent object has a diameter in a range 0.5 meter to 5 meters, 2 meters to 4 meters or 0.5 meter to 2 meters. In some embodiments, the transparent object has a diameter of 0.5 meter, 1 meter, 1.2 meters, 1.4 meters, 1.6 meters, 1.8 meters, 2 meters, 3 meters, 4 meters, 5 meters or more. In some embodiments, the diameter of a transparent object (e.g., a transparent object that has a certain radius of curvature) is the diameter of the rim of the transparent object (e.g., the edge of the transparent object 703 that fits with a recess 705 of the low pressure chamber 700).

The thickness of the transparent object 703 may influence the extent to which the transparent object 703 absorbs solar radiation, with relatively thick transparent objects typically absorbing more solar radiation than relatively thin transparent objects. Consequently, the thickness of the transparent object influences the extent to which the transparent object is subjected to thermal stress during operation of the solar receiver. It is therefore often desirable for the transparent object to have a relatively small thickness, in order to minimize thermal stress. In some embodiments, the thickness of the transparent object is in a range of 0.25 inch to 4 inches, 0.5 inch to 2 inches, or 0.5 inch to 1 inch. In some embodiments, the thickness of the transparent object is 0.25 inch, 0.5 inch, 1 inch, 1.5 inch, 2 inches, 3 inches, 4 inches or more. However, the invention is not limited to transparent objects having these thicknesses. Other thicknesses may be suitable in some cases.

The solar absorber is typically constructed of a material that can withstand relatively high temperatures, that can absorb incident radiation and that can readily transfer thermal energy to a working fluid that is in contact with the absorber. For example, solar absorbers may be constructed of a metals, stainless steels, ceramics, heat-resistant cast alloys, high temperature metallic materials, refractory materials, thoria-dispersed alloys, graphite, or carbon-fiber-reinforced carbon-based materials. Appropriate ceramics for solar absorbers include, for example, glass ceramics, silicon carbide, silicon nitride, and silicon oxide. The solar absorber may have any of a variety of forms. Typically, the solar absorber is designed and constructed to have a relatively high surface area for contact with a working fluid. The solar absorber typically comprises a plurality of channels or passages through which a working fluid may pass. In passing through the fluid channels or passages of the solar absorber, the working fluid acquires thermal energy through contact with the absorber. The absorber may have a wire mesh, honeycomb or foam configuration, for example. Often, the solar absorber comprises a black surface coating, covering at least a portion of the absorber surface, to facilitate absorption of incident solar radiation.

The low pressure solar receivers depicted in FIGS. 7A-7B are fitted with a secondary concentrator 706. The secondary concentrator 706 serves to collect concentrated solar radiation from a primary concentrator, e.g., a heliostat field, or other source, and direct that solar radiation into the opening 708 of the solar receiver. The secondary concentrator 706, in some embodiments, improves the solar collection efficiency of the solar receiver. The second concentrator 706 is often constructed with a plurality of reflective panels 707, each reflective panel typically having a reflective surface and a predetermined shape. The plurality of reflective panels 707 are typically arranged in a configuration that facilitates reflection of incident solar radiation toward the receiver opening 708. In some embodiments, the plurality of reflective panels are arranged such that the secondary concentrator has an overall parabolic shape, although other shapes may be suitable. For example, the secondary concentrator may have a elliptical shape, a semi-circular shape, a hyperbolic shape, etc.

A cross-section of the secondary concentrator that is parallel with the opening of the receiver may also have a variety of shapes. For example, the cross-section of the secondary concentrator that is parallel with the opening of the receiver may have a circular shape, an elliptical shape, a polygonal shape, a rectangular shape, etc.

The size and shape of the secondary concentrator 706 (e.g., the diameter of the outer most portion of the secondary concentrator, the depth of the secondary concentrator, etc.) may vary depending on a variety of factors, including, for example, the desired collection efficiency, the size and arrangement of the primary concentrator(s), the size of the opening of the receiver, the thermal properties of the solar absorber, etc. In some embodiments, the ratio of the depth of the secondary concentrator to the diameter of the opening of the receiver is 1, 1.25, 1.5, 2, 2.5, 3, 4, 5, or more. In some embodiments, the ratio of the depth of the secondary concentrator to the diameter of the opening of the receiver is in a range of 1 to 1.5, 1 to 2.5, 1 to 3, 1 to 4, or 1 to 5. In some embodiments, the ratio of the outer most diameter of the secondary concentrator to the diameter of the opening of the receiver is 1.5, 2, 2.5, 3, 3.5, 4, 4.5, 5.5, 6 or more. In some embodiments, the ratio of the depth of the secondary concentrator to the diameter of the opening of the receiver is in a range of 1.5 to 2, 1.5 to 3, 1.5 to 4, 1.5 to 5, or 1.5 to 6.

FIG. 7C depicts an exemplary solar receiver having a fluid inlet 702 and fluid outlet 701 that enter and exit, respectively, the solar receiver on different sides of a low pressure fluid chamber. In this embodiment, the solar receiver is connected to a secondary concentrator 706 that has a rectangularly shaped opening.

Figure 7D:
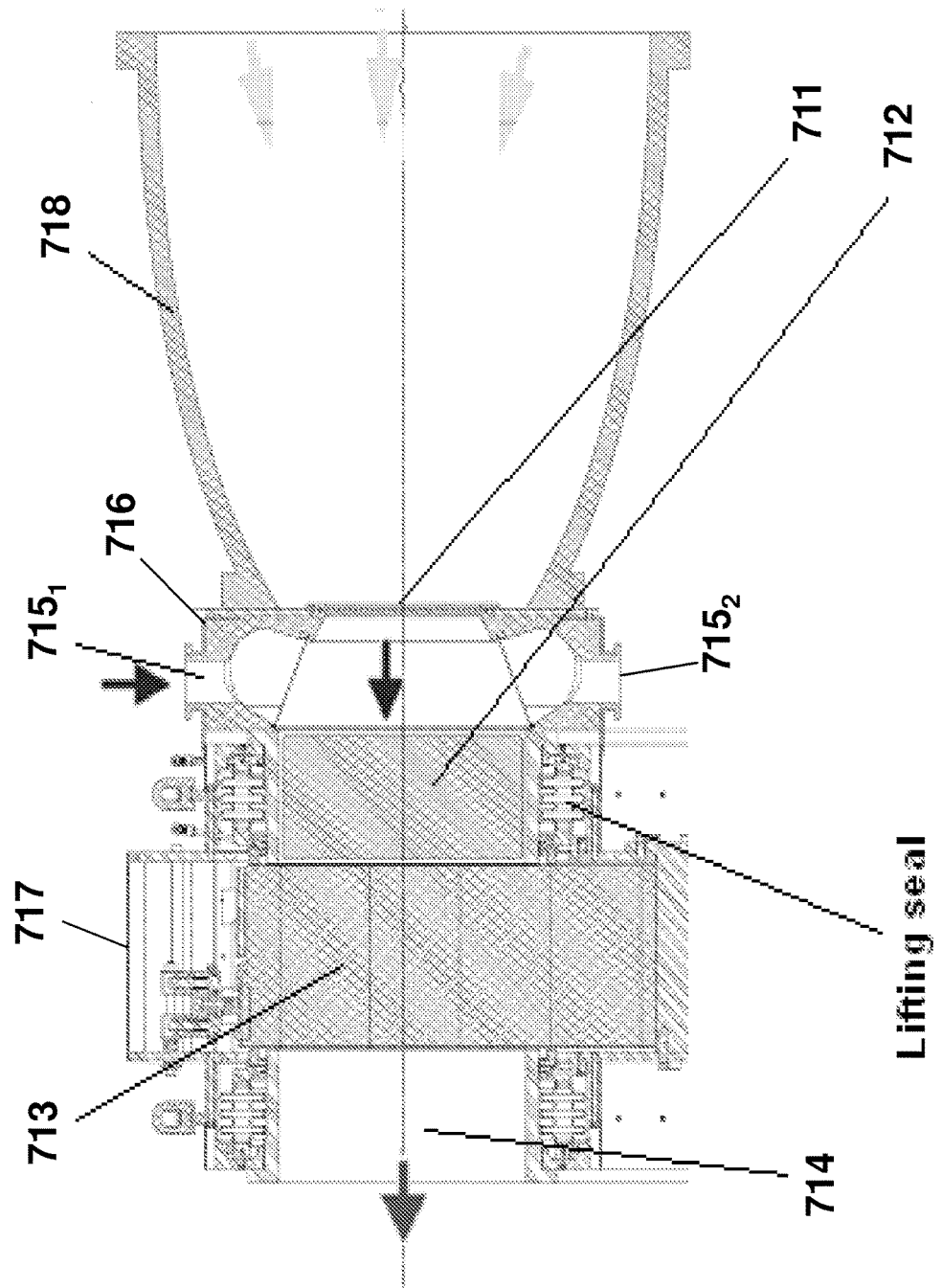

FIG. 7D depicts an exemplary solar receiver having a low pressure fluid chamber 716 comprising one or more fluid inlets $715_{1-2}$ and a fluid outlet 714, a solar absorber 712, and a regenerator structure 717 housing a rotary regenerator matrix 713. In this embodiment, thermal energy from concentrated solar radiation is directed and concentrated, at least in part, by a secondary concentrator 718 into the low pressure fluid chamber 716 through a transparent object 711 and impinges a solar absorber 712 thereby heating the solar absorber 712. The solar absorber 712 transfers thermal energy to a relatively low temperature working fluid passing within the low pressure fluid chamber 716, thereby creating a relatively high temperature working fluid. The relatively high temperature fluid leaving the low pressure fluid chamber passes through a rotary regenerator matrix 713 and transfers thermal energy to the rotary regenerator matrix 713.

The rotary regenerator matrix 713, in FIG. 7D, rotates between two fluidically isolated conduits. The first conduit being a flow path for fluid exiting the low pressure fluid chamber 716 of the solar receiver, and the second conduit being a flow path of a second fluid system. For example, the rotary regenerator matrix 713 may transfer thermal energy from the relatively high temperature fluid leaving the low pressure fluid chamber 716 to a second fluid passing through a conduit adjacent to the receiver that is in fluid communication with the rotary regenerator matrix. The second fluid may be, for example, a fluid, e.g., ambient air, entering the compressor of a gas turbine, or a fluid used to heat a secondary thermal storage material.

Figure 7E:
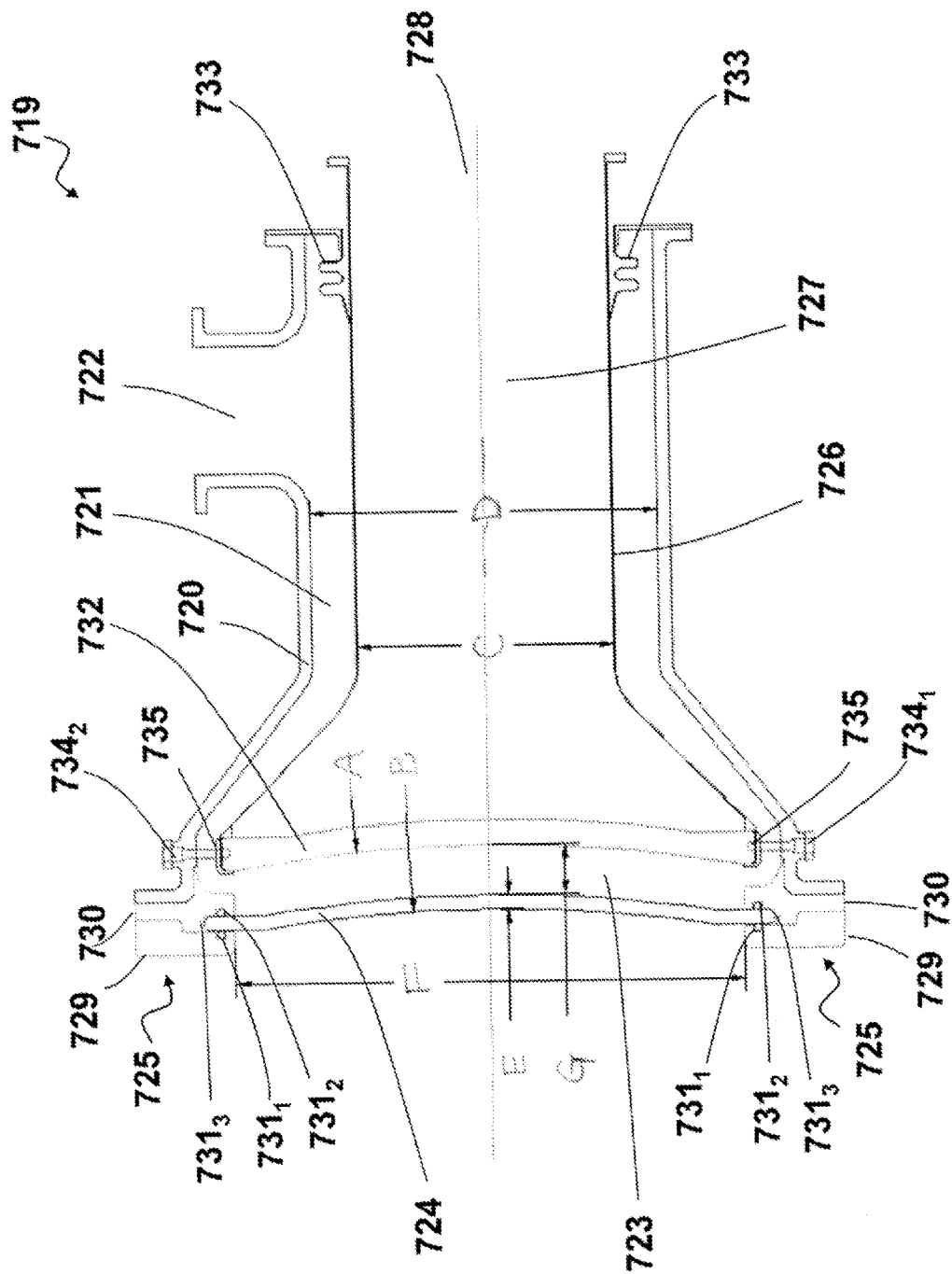

FIG. 7E depicts a cross-sectional view of an exemplary solar receiver 719 that transfers thermal energy from concentrated solar radiation to a low pressure working fluid. The solar receiver 719 includes an outer housing 720 defining a first fluid conduit 721 and a fluid inlet 722. The outer housing 720 further defines an aperture 723 for receiving solar radiation at the front end of the solar receiver 719. A transparent object 724 is connected to the outer housing 720 through a flange assembly 725 at the aperture 723. The solar receiver 719 also includes an inner housing 726 that defines a second fluid conduit 727 and a fluid outlet 728. As described further below, the second fluid conduit 727 is co-axial with the first fluid conduit 721. In addition, a solar absorber 732 is connected to the inner housing 726 at a position in proximity to the aperture 723. While inlet conduits and outlet conduits may be co-axial, it should be appreciated that, in some embodiments, the inlet conduit and outlet conduit are not co-axial.

In an exemplary implementation, concentrated solar radiation is directed to the aperture 723, passes through the transparent object 724 and, after passing through the transparent object 724, and impinges the solar absorber 732, thereby heating the solar absorber 732. The solar receiver 719 defines a fluid path beginning from the fluid inlet 722, traversing forward through the first fluid conduit 721 toward the aperture 723. The fluid traverses across the inner side of the transparent object 724, passes through a plurality of passages in the solar absorber 732, passes through the second fluid conduit 727, and exits the solar receiver 719 through the fluid outlet 728.

In certain embodiments, a fluid inlet 722 is at a position in relative proximity to the transparent object 724 such that fluid enters the receiver in relative proximity to the transparent object 724. When fluid enters the receiver in this manner it can more readily pass through the solar absorber in some configurations, such as, for example, when the receiver has a relatively large diameter.

The fluid inlet 722 may be fluidically connected with a gas turbine exhaust outlet or other working fluid supply conduit, such that a relatively low temperature (e.g., approximately 1100° F.) fluid enters the solar receiver 719. The solar absorber 732 transfers thermal energy to the relatively low temperature fluid as it travels through the plurality of passages in the solar absorber 732, thereby heating the fluid to a relatively high temperature (e.g., approximately 1800° F.). The fluid outlet 728 may be fluidically connected with a gas turbine compressor inlet, a heat storage unit, or other downstream component that uses the relatively high temperature fluid.

The solar receiver 719 includes a flange assembly 725 for connecting the transparent object 724 at the aperture 723. The flange assembly 725 includes an outer flange 729 that is connected to an inner flange 730. The flange assembly 725 is generally composed of materials that are tolerant to operation at relatively high temperatures (e.g., capable of operating at temperatures in the range of 1700 to 2000° F.). Use of a high temperature tolerant materials ensures that the flange assembly 725 will not fail (e.g., melt or degrade) if concentrated solar radiation (e.g., radiation directed to the receiver from a heliostat field) is improperly directed such that excess solar radiation impinges on the flange assembly 725. Moreover, in certain embodiments the flange assembly 725 is composed of materials having thermal properties similar to that of the transparent object 724 to minimize the risk of damage to the flange assembly 725 or transparent object 724 due to differential thermal expansion of the components. For example, if the transparent object 724 is composed of quartz, then it may be advantageous to select materials for the flange assembly 725 that have a similar coefficient of thermal expansion as quartz. Exemplary materials for the flange assembly 725 include, for example, ceramics and other high temperature tolerant materials disclosed herein or otherwise known in the art. The outer flange 729 and inner flange 730 are connected, in the illustrated embodiment, by a plurality of bolts positioned around the flange assembly 725. Flange assembly 725 is also bolted to the outer housing 720. In some configurations, bolts connecting the outer flange 729 and inner flange 730 serve to join the entire flange assembly 725 to the outer housing 720. In other configurations, separate bolts join the flange assembly 725 to the outer housing 720. The holes for bolts joining the flange assembly 725 to the outer housing 720 may be shaped as radial slots to permit differential thermal expansion of the flange assembly 725 and outer housing 720, and to allow for bolt movement within the slots.

The transparent object 724 is connected to the aperture 723 by way of a flange assembly 725. Flexible seals $731_{1\text{-}3}$ are positioned in seal cavities within the flange assembly 725 and provide contact between the flange assembly 725 and transparent object 724 at front, rear and circumferential surfaces of the transparent object 724. The flexible seals $731_{1\text{-}3}$ allow for differential thermal expansion (thermal growth) between the flange assembly 725 and the transparent object 724 in the axial direction (forward and rearward expansion) and radial direction (circumferential expansion). The flexible seals $731_{1\text{-}3}$ prevent direct contact (hard points) between the transparent object 724 and the flange assembly 725 by providing sealing surfaces with relatively low contact stress. The flexible seals $731_{1\text{-}3}$ provide support for the transparent object 724 during operation and shipping, and spread the sealing contact load to enhance component life. The flexible seals $731_{1\text{-}3}$ may be made from ceramic fiber rope or an equivalent sealing material suitable for high temperature operation and for conforming to the dimensions of the seal cavity in the flange assembly 725.

The solar receiver 719 includes a transparent object 724 (which may be referred to as a window) that is composed quartz silica glass. The transparent object 724 may have a curved shaped to contain and distribute internal pressure, and to tolerate thermal stresses from differential temperature exposure. The curved shape of the transparent object 724 also limits the formation of destructively high tensile stresses. The transparent object 724 may be designed to accommodate implementations that give rise to relatively high temperatures at its center portion and relatively cooler temperatures at portions in proximity to the flange. Thus, the transparent object 724 may function in some implementations as a thermal hinge to accommodate thermal growth without developing destructively high tensile stresses. The curved (or bowl shape) of the transparent object 724 in the illustrated embodiment also facilitates, and to an extent directs, flow of a relatively low temperature fluid toward and through the solar absorber 732. The relatively low temperature fluid may also function to cool the transparent object 724 as it passes over the internal surfaces of the transparent object 724.

In some embodiments the transparent object is constructed of one piece, e.g., a single solid quartz silica glass window. However, in other embodiments, the transparent object is constructed of several segments that are fitted together, joined together or butted together. In some embodiments, a transparent object having a diameter in a range of 2 meters to 4 meters, or more, is constructed of multiple segments (e.g., 2, 3, 4 or more segments).

The solar receiver 719 is configured and arranged with coaxial (co-annular) first and second fluid conduits, with the first fluid conduit 721 providing a passage for a relatively low temperature fluid and the second fluid conduit 727 providing a passage for a relatively high temperature fluid that has acquired thermal energy from the solar absorber 732. The solar receiver 719 accommodates a relatively low temperature fluid (e.g., approximately 1100° F.) passing through the first fluid conduit 721 and relatively high temperature fluid (e.g., approximately 1800° F.) passing through the second fluid conduit 727 with minimal insulation, and minimal thermal losses, in certain embodiments. For example, thermal losses from the second fluid conduit 727 are transferred into the first fluid conduit 721 and thus not lost in the overall thermal cycle.

Moreover, the low pressure operation (e.g., operation at up to 1.1 atm) of the solar receiver 719 can allow for the housings that define the first and second fluid conduits 721, 727 to be constructed of light weight and low cost materials, and enable factory fabrication and easy on-site installation. In certain configuration, the outer housing 720 is constructed of materials suitable for operation at temperatures in a range of 1000° F. to 1200° F. (e.g., approximately 1100° F.). For example, the outer housing 720 may be constructed of stainless steel or other similar material. The outer housing 720 may have an external insulation to conserve thermal energy and provide a safe work environment. The inner housing 726 in a typical configuration is constructed of materials suitable for operation at temperatures in a range of 1700° F. to 2000° F. (e.g., approximately 1800° F.). For example, the inner housing 726 may be constructed of nickel-based super alloy or other similar material. The inner housing 726 may have insulation to minimize the extent to which thermal energy is transferred back to the low temperature fluid in the first fluid conduit 721. Because of the low pressure operation conditions of the receiver, in some embodiments, the outer housing 720 and/or inner housing 726 has a thickness in a range of 0.001 to 0.1 inch (e.g., approximately 0.05 inch).

A bellows 733 is connected between the outer housing 720 and inner housing 726 and allows for differential thermal expansion between the two housings. The bellows 733 is typically constructed of a high temperature tolerant material such as for example a nickel-based super alloy or other suitable material. The bellows 733 may be connected to the outer and inner housings 720, 726 by brazing or welding or other suitable method. It should be appreciated, that the solar receiver 719 may be configured with any suitable component to control the axial and radial centering of the two housings and to allow for differential thermal expansion between the two housings. Vertical support and slip joints may be included between the housings, for example.

The solar absorber 732 may be constructed of a porous material that defines a plurality of passages traversing through the absorber. The solar absorber 732 may for example have a honey comb or foam structure. The solar absorber 732 in certain embodiments is constructed of a silicon carbide material. In other embodiments, the solar absorber 732 may be constructed of other suitable materials, including any of the materials disclosed herein for solar absorbers. The solar absorber 732 is positioned in a recess 735 defined by the inner housing 726. The inner housing 726 is fixed to the outer housing 720 at the position of the recess 735 by bolts $734_{1-2}$, which comprise set pins at their ends that enter into holes in the solar absorber 732 to position the solar absorber 732.

The overall shape of the solar absorber 732 may be curved. For example, the solar absorber 732 may have radius of curvature that is similar to that of the transparent object 724. The overall shape of the solar absorber 732 may alternatively be substantially planar. The solar absorber 732 may be single solid object or may be arranged as a set of segmented components. The solar absorber 732 may be arranged, for example, as a set of pie-shaped segments in a bowl configuration that fits within the solar receiver 719. The segmented design allows for differential thermal expansion of the different segments and thus accommodates uneven temperature distributions across the solar absorber. In some configurations temperature distributions across the solar absorber 732 may be controlled, at least to an extent, by including an orifice plate (e.g., a ceramic orifice plate) at the front end of the solar absorber. The orifice plate may include a series of orifices configured and arranged to facilitate a substantially even distribution of fluid passing into the solar absorber 732 across the entire absorber fluid inlet 722 face. The orifice plate may be retained in the receiver around its outer rim to control axial and radial movement.

It should be appreciated that the solar receiver 719 may operate at pressures of up to 1.1 atm, up to 1.2 atm, up to 1.3 atm, up to 1.4 atm, up to 1.5 atm, or up to 2 atm. In particular embodiments, the receiver is configured and arranged for operating at pressures in the range of above 1 atm to 1.5 atm. In other embodiments, the receiver is configured and arranged for operating at pressures in the range of above 1 atm to 1.2 atm. Moreover, in some embodiments, the solar absorber 732 has a radius of curvature (A) in a range of 50 to 250 inches. In some embodiments, the solar absorber 732 has a radius of curvature (A) in a range of 150 to 200 inches. In some embodiments, the solar absorber 732 has a radius of curvature (A) of 170 to 190 inches. Alternatively, the solar absorber may be substantially planar. In some embodiments, the transparent object 724 has a radius of curvature (B) in a range of 50 to 250 inches. In some embodiments, the transparent object 724 has a radius of curvature (B) in a range of 150 to 200 inches. In some embodiments, the transparent object 724 has a radius of curvature (B) of 170 to 190 inches. In some embodiments, at least a portion of the inner housing 726 has an internal diameter (C) in a range of 10 to 50 inches. In some embodiments, at least a portion of the inner housing 726 has an internal diameter (C) in a range of 20 to 40 inches. In some embodiments, at least a portion of the inner housing 726 has an internal diameter (C) in a range of 30 to 35 inches. In some embodiments, at least a portion of the outer housing 720 has an internal diameter (D) in a range of 25 to 65 inches. In some embodiments, at least a portion of the outer housing 720 has an internal diameter (D) in a range of 35 to 55 inches. In some embodiments, at least a portion of the outer housing 720 has an internal diameter (D) in a range of 40 to 50 inches. In some embodiments, the thickness (E) of the transparent object is in a range of about 0.5 inch to about 3 inches. In some embodiments, the thickness (E) of the transparent object is in a range of about 1 inch to about 2.5 inches. In some embodiments, the thickness (E) of the transparent object is in a range of about 1.5 inches to about 2 inches. In some embodiments, the flange assembly defines an opening having a diameter (F) in a range of 46 inches to 86 inches. In some embodiments, the flange assembly defines an opening having a diameter (F) in a range of 56 inches to 76 inches. In some embodiments, the flange assembly defines an opening having a diameter (F) in a range of 60 inches to 70 inches. In some embodiments, the distance (G) between the inner face of the transparent object 724 and the outer face of the solar absorber 732 is in a range of 2 to 12 inches. In some embodiments, the distance (G) between the inner face of the transparent object 724 and the outer face of the solar absorber 732 is in a range of 5 to 8 inches. However, other sizes may be suitable in some configurations.

Figure 8A:
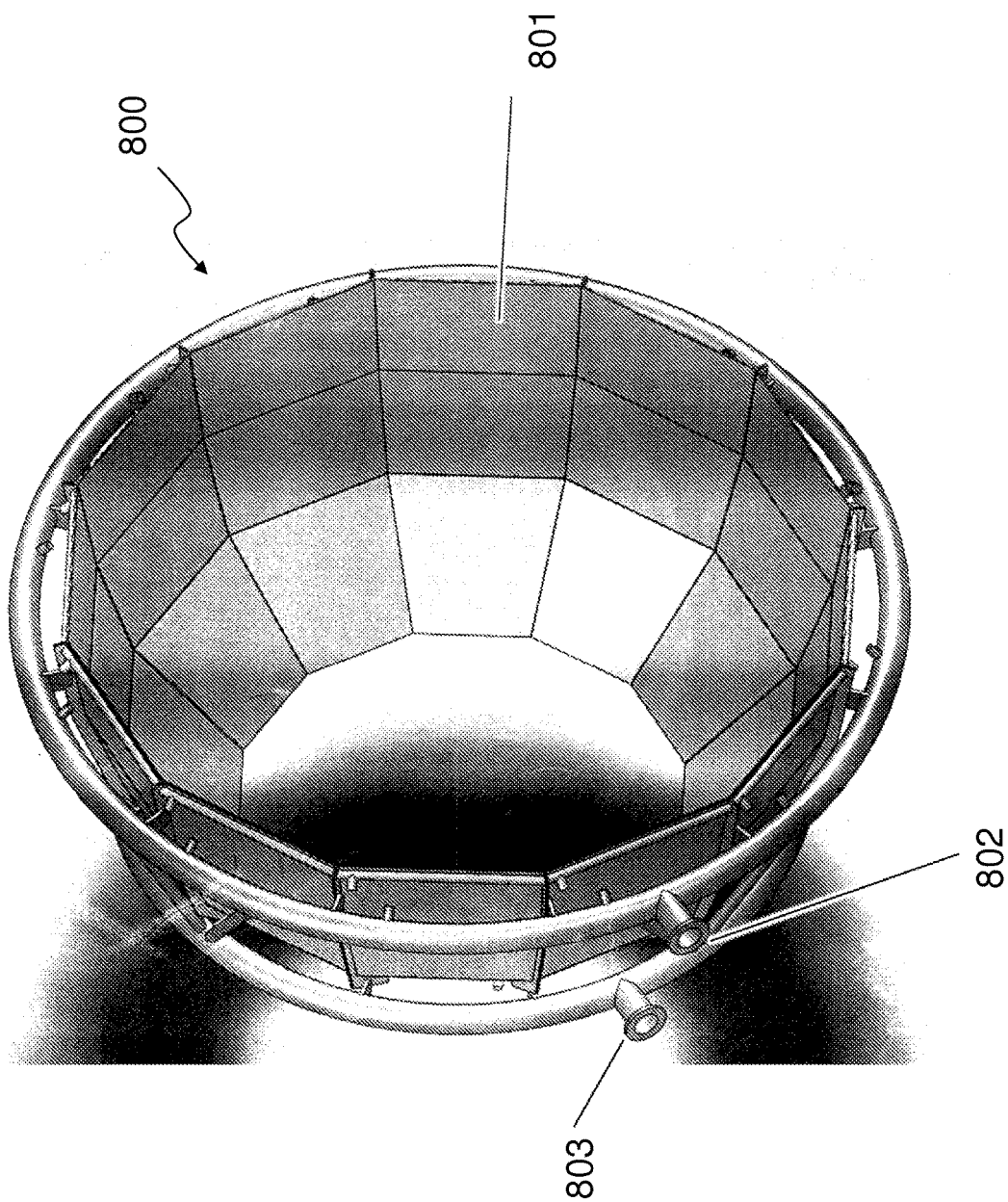
FIGS. 8A-8C include exemplary schematic illustrations of a secondary concentrator.
Figure 8B:
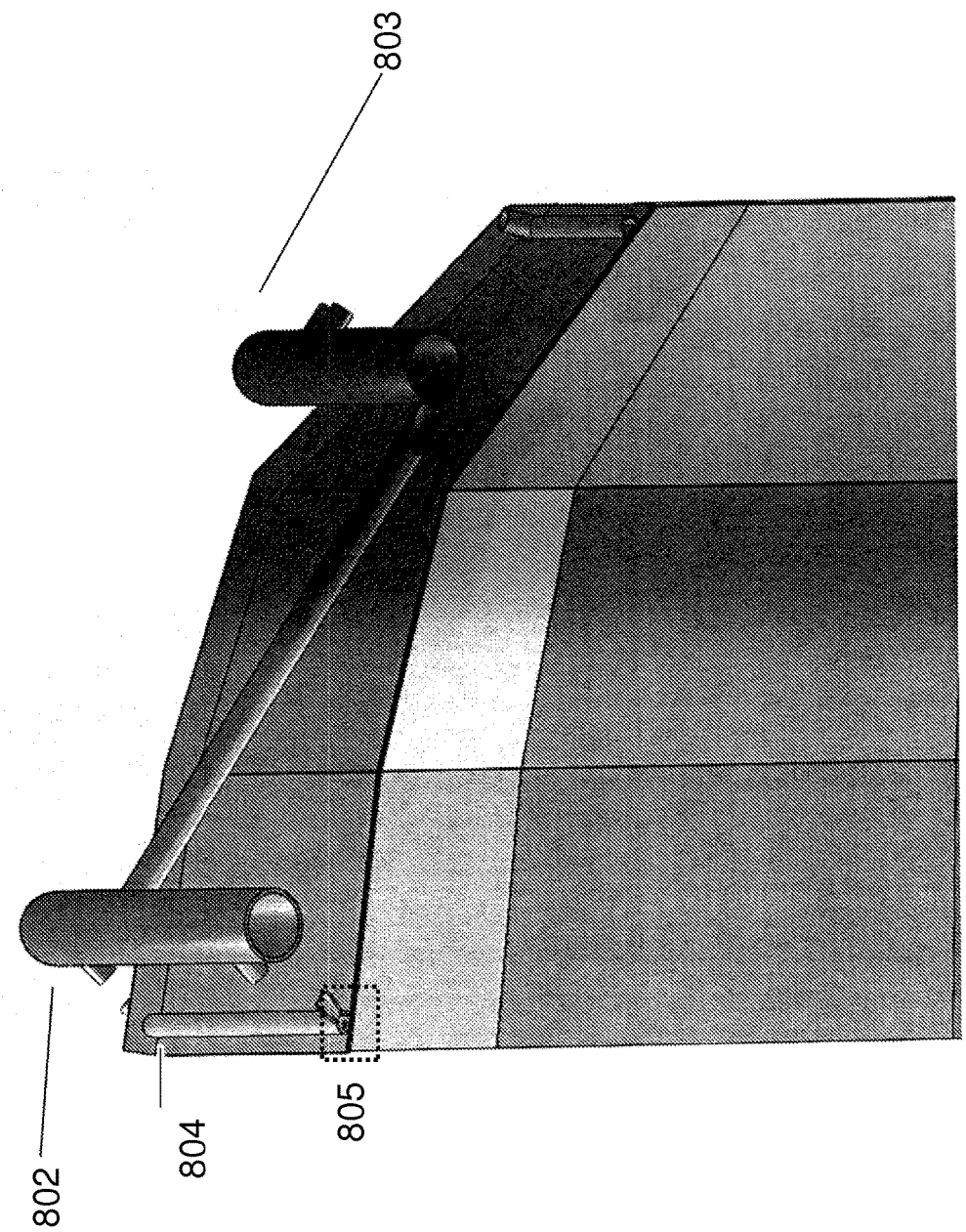
Figure 8C:
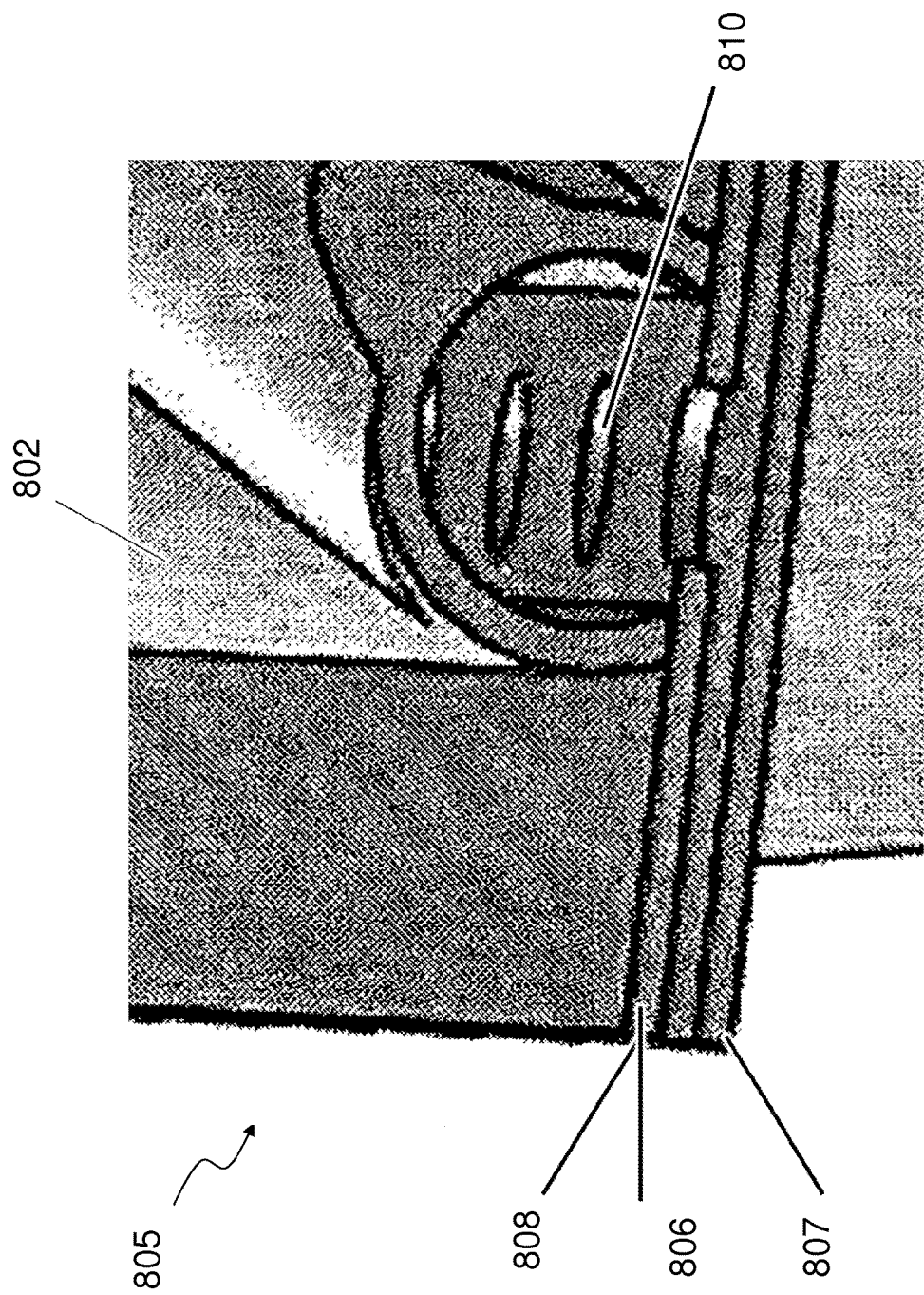

FIGS. 8A-8C illustrate a secondary concentrator 800 having an integrated fluid cooling system. The secondary concentrator 800 depicted in FIG. 8A includes a plurality of connected reflective panels 801. Each of the plurality of reflective panels 801 has a planar shape having a polygonal cross-section. Each reflective panel has an inner reflective surface that is positioned to face the inner side of the secondary concentrator 800 and an outer surface. The reflective panels 801 are arranged such that the secondary concentrator 800 deflects concentrated solar radiation to the opening of the receiver to which the secondary concentrator 800 is connected. In some embodiments, the reflective panel, e.g., as depicted in FIG. 8A, has a thickness in a range of 0.1 inch to 1 inch or 0.1 inch to 0.5 inch.

In the secondary concentrator 800 depicted in FIG. 8A, the reflective panels are arranged to form three conical rings. The arrangement of conical rings is such that the conical ring having the smallest diameter is positioned to the rear of the secondary concentrator 800 and the conical ring having the largest diameter is positioned to the front of the secondary concentrator 800. In FIG. 8A the secondary concentrator 800 includes two relatively large diameter cooling pipes 802, 803 that function in part to deliver cooling fluid to and from a cooling passage within each reflective panel and also to provide a support for arranging and immobilizing the reflective panels 801 into the predetermined shape that facilitates concentration of incoming solar radiation and reflection of the incoming concentrated solar radiation to the opening of a low pressure receiver.

FIG. 8B depicts an alternative view of the secondary concentrator 800 showing the supply conduit 802, an outlet pipe 803, a smaller diameter pipe 804 in fluid communication with the supply conduit 802 and a cooling passage 806 of a reflective panel. The inset at 805 depicts an inlet to a cooling passage 806 of a reflective panel.

FIG. 8C provides an expanded view of the inset 805 in FIG. 8B. As shown, the supply conduit 802 is in fluid communication with cooling passage 806 of the reflective panel 801. A series of open slots 810 define passages through which cooling fluid flows from the supply conduit 802 to the cooling passage 806 within the reflective panel 801. The casing 808 of the reflective panel 806 and the inner reflective surface 807 are also shown. In some embodiments, the casing 808 is a metal sheet having a thickness in a range of 0.01 inch to 0.5 inch or 0.1 inch to 0.5 inch.

Any appropriate cooling fluid may be used to cool a reflective panel having a cooling system such as is depicted in FIGS. 8A-8C. In some embodiments, the cooling fluid is a mixture of water and a refrigerant, e.g., ethylene glycol. In some embodiments, the cooling fluid is a 50:50 mixture of water and a refrigerant, e.g., ethylene glycol.

Reflective panels of a secondary concentrator may comprise any of a variety of materials. Typically metals, polymers, glass, or combinations thereof are used. Reflective panels may comprise a metal, such as aluminum, silver, or a combination thereof. Reflective panels may comprise a non-reflective material having a reflective coating, e.g., a reflective silver or reflective aluminum coating. Reflective panels may comprise a glass substrate, a reflective layer for reflecting solar energy, and optionally an interference layer (e.g., a layer between the glass and reflective layer comprised of, for example, titanium dioxide). Typically, the reflective panel has at least one surface for reflecting solar radiation.

FIGS. 9A-9C depict exemplary high pressure receivers that may be used in conjunction with the power generation systems disclosed herein. In these embodiments, the high pressure receivers include an insulated casing 900 having, a working fluid inlet 901, a working fluid outlet 902, and an opening 904 connected to the rear portion of a secondary concentrator 906. In some embodiments, such as is depicted in FIGS. 9B-9C, the high pressure receiver includes a transparent object 905, e.g., a window, adjacent to the opening 904 for receiving solar radiation. As in the low pressure receiver context, the secondary concentrator 906 serves to collect concentrated solar radiation from a primary concentrator, e.g., a heliostat field, or other source, and direct that solar radiation into the opening 904 of the solar receiver.

The high pressure fluid (e.g., fluid at a pressure of above 2 atmospheres to 50 atmospheres) passing through the receiver is retained within the high pressure solar absorber 903. The high pressure absorber 903, as exemplified in FIGS. 9A-9C, typically comprises a network of passages (e.g., a tubular network) for containing a high pressure fluid and directing flow of the high-pressure fluid into and out of the high-pressure solar absorber 903.

The high-pressure working fluid enters into the high pressure solar absorber 903, passes through the network of passages and acquires thermal energy therein, in part, through contact with the passage walls. The high pressure solar absorber 903 often has a black surface coating to promote absorption of incident solar radiation. The surface coating may be applied using methods well known in the art including, for example, by chemical vapor deposition (e.g., a pack cementation process, a gas phase coating process, etc.). Moreover, the high pressure absorber is typically constructed from a material that can withstand extremely high temperatures, including, for example, temperatures in excess of 1000° C.

The high pressure solar absorber 903 can be designed and constructed in any of a variety of forms. As exemplified in FIGS. 9A and 9B, the tubular network may be a network of tubular coils. As exemplified in FIG. 9C, the tubular network may have a shell and tube-type form. Still other configurations, such as, for example, a plate type heat exchanger, are envisioned. In some embodiments, the high pressure solar absorber comprises a tubular network, wherein tubes of the network have a diameter in a range of 0.5 inch to 5 inches in diameter and, in some embodiments, a wall-thickness in a range of 0.1 inch to 1 inch. In some embodiments, the high pressure solar absorber comprises a tubular network, wherein tubes of the network have a diameter in a range of 1 inch to 3 inches in diameter and, in some embodiments, a wall-thickness in a range of 0.1 inch to 0.5 inch.

In some embodiments, the high-pressure solar absorber is constructed from a single crystal super alloy. Often the super alloy contains a nickel base, chromium at a level sufficient for oxidation resistance (e.g., at a level of about 10%), aluminum and/or titanium (e.g., at levels of about 2.5% to 5%) for the formation of the strengthening gamma prime phase and refractory metals such as tungsten, molybdenum, tantalum and columbium (e.g., at a level of about 2.5% to 5%) as solid solution strengtheners. Typically, nickel base super alloys also contain cobalt (e.g., at a level of about 10%) and carbon (e.g., at a level of about 0.1%) which acts as a grain boundary strengthener and forms carbides which strengthen the alloy. Boron and zirconium are also often added in small amounts as grain boundary strengtheners.

Exemplary single crystal super alloys that may be used in the construction of high-pressure solar absorber are disclosed in the following United State patents, the contents of which, relating to single crystal super alloys, are incorporated herein by reference in their entireties: U.S. Pat. No. 4,371,404, U.S. Pat. No. 4,222,794; U.S. Pat. No. 4,514,360; U.S. Pat. No. 4,643,782; U.S. Pat. No. 4,765,850; U.S. Pat. No. 4,923,525; U.S. Pat. No. 5,047,091; U.S. Pat. No. 5,077,004; U.S. Pat. No. 5,100,484; U.S. Pat. No. 5,154,884; U.S. Pat. No. 5,366,695; U.S. Pat. No. 5,399,313; U.S. Pat. No. 5,540,790; and U.S. Pat. No. 6,074,602.

Components (e.g., tubes, plate walls, etc.) of the high-pressure solar absorber may be manufactured by any appropriate techniques, e.g., extruded or cast. Furthermore, components of the high-pressure solar absorber may be bonded together using any one of a variety of methods known in the art, including, for example, laser welding, electron beam welding, activated diffusion bonding, etc.

The transparent object 905 provides a barrier for reducing re-radiation losses, whereby the transparent object 905 allows transmission of concentrated solar radiation in the non-infrared range (e.g., in the visible range) into the solar receiver but does not allow transmission of radiation in the infrared range. Thus, thermal re-radiation, which emits in primarily the infrared range from the heated high pressure solar absorber, is reflected back into in the receiver by the transparent object 905.

The casing 900 of the receiver is designed and constructed to insulate and provide structural support for the high pressure absorber 903 and to mount the secondary concentrator 906. In the exemplary high-pressure receivers depicted in FIGS. 9A-9C, the casing 900 operates essentially at ambient pressures. As a result, the transparent object, in these embodiments, is not subjected to substantial hydrostatic pressure induced stress. Thus, the transparent object can be designed and constructed to relatively large sizes (e.g., sizes in excess of 5 meters, e.g., 5 meters to 10 meters) without concern for hydrostatic pressure induced stress. In some embodiments, the transparent object is constructed as a combination of multiple transparent objects (e.g., a combination of overlapping transparent objects) to obtain a transparent window that functions to prevent re-radiation losses.

Unless otherwise indicated, all pressures described herein refer to absolute pressures.

The following patents and patent applications are incorporated herein by reference in their entirety for all purposes: U.S. Patent Publication No. 2002/0124991, published on Sep. 12, 2002, filed Feb. 1, 2002, entitled "Low Cost High Efficiency Automotive Turbines"; U.S. Pat. No. 6,681,557, issued on Jan. 27, 2004, filed Feb. 1, 2002, entitled "Low Cost High Efficiency Automotive Turbines"; U.S. Pat. No. 5,259,444, issued on Nov. 9, 1993, filed Nov. 5, 1990, entitled "Heat Exchanger Containing a Component Capable of Discontinuous Movement"; U.S. Pat. No. RE37134, issued on Apr. 17, 2001, filed Mar. 25, 1995, entitled "Heat Exchanger Containing a Component Capable of Discontinuous Movement"; U.S. Publication No. 2007/0089283, published on Apr. 26, 2007, filed Oct. 17, 2006, entitled "Intermittent Sealing Device and Method"; U.S. Publication No. 2008/0251234, published on Oct. 16, 2008, filed Apr. 16, 2007, entitled "Regenerator Wheel Apparatus"; U.S. Publication No. 2009/0000761, published on Jan. 1, 2009, filed Jun. 29, 2007. entitled "Regenerative Heat Exchanger with Energy-Storing Drive System"; U.S. Publication No. 2009/0000762, published on Jan. 1, 2009, filed Jun. 29, 2007, entitled "Brush-Seal and Matrix for Regenerative Heat Exchanger and Method of Adjusting Same"; and U.S. Publication No. 2006/0054301, published on Mar. 16, 2006, filed Dec. 16, 2004, entitled "Variable Area Mass or Area and Mass Species Transfer Device and Method."

The following examples are intended to illustrate certain embodiments of the present invention, but do not exemplify the full scope of the invention.

Example 1

Figure 10A:
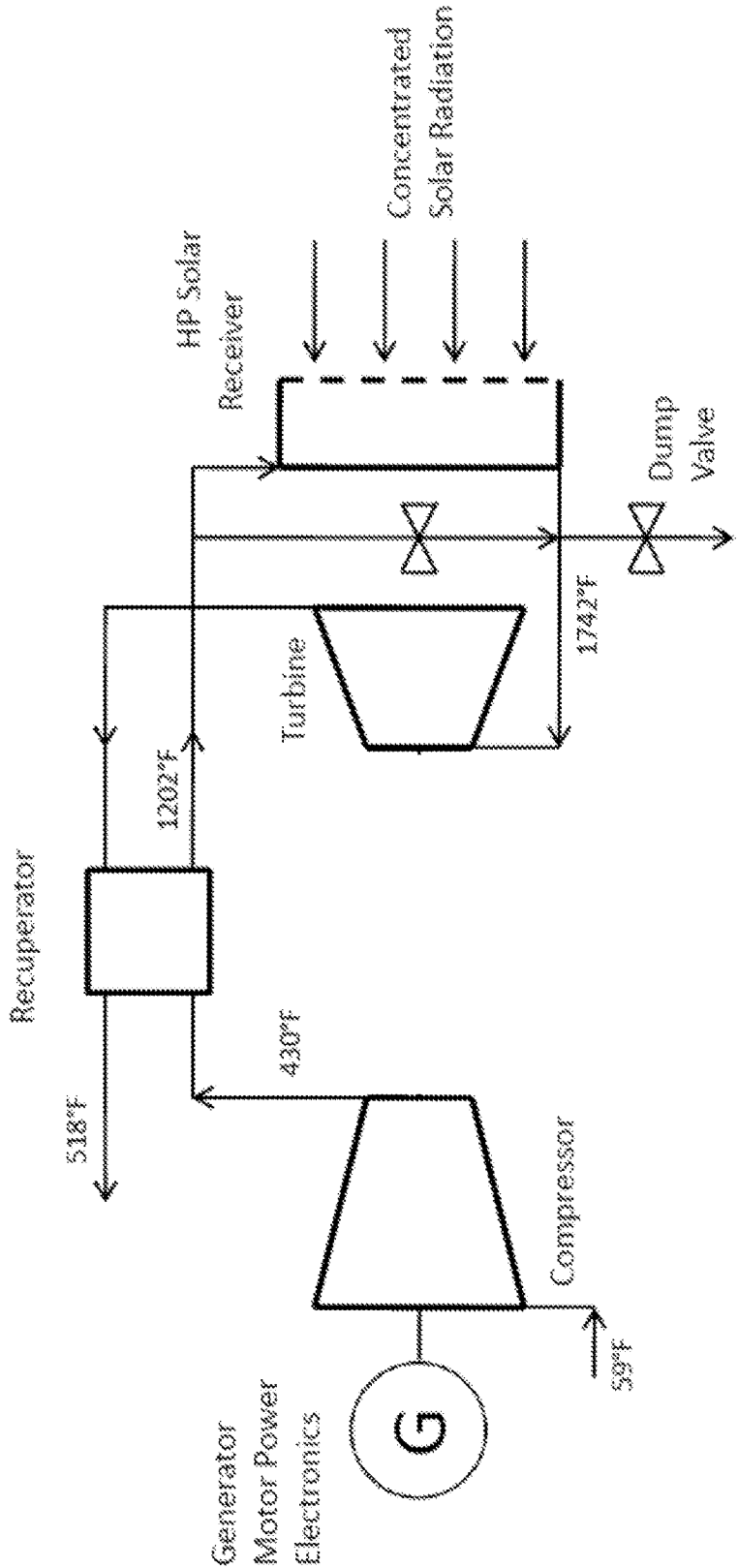
FIGS. 10A-10F include exemplary schematic illustrations of concentrated solar power generation systems.

This example describes a concentrated solar power generation system in which a pressurized solar receiver is used. FIG. 10A includes a schematic diagram of such a system. In this example, compressed air from the compressor is fed to the solar receiver and heated while pressurized. The heated effluent from the solar receiver is then expanded through the gas turbine to produce power. The exhaust from the gas turbine is used to pre-heat the pressurized gas from the compressor before it is transported to the solar receiver.

Example 2

Figure 10B:
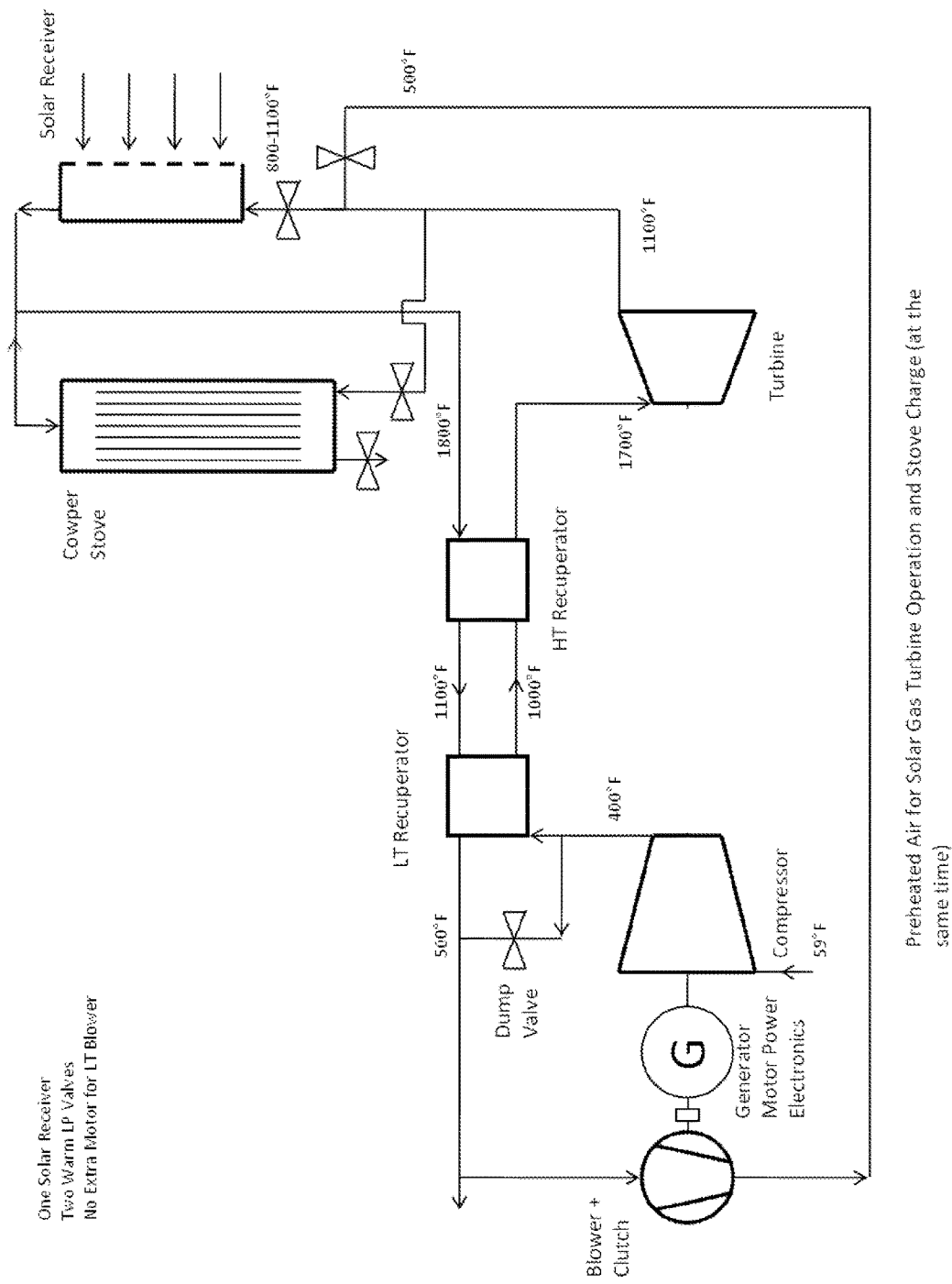

This example describes a concentrated solar power generation system in which a thermal storage system is incorporated. FIG. 10B includes a schematic diagram of the exemplary system. Air is used as the fluid in this system. The temperatures of process streams are indicated in the figure. In this example, ambient air at 59° F. is supplied to the compressor, where it is compressed and heated to a temperature of 1700° F. in a heat exchange system comprising one, two or more recuperator heat exchangers. The 1700° F. air is passed through a turbine to generate power, which produces an exhaust stream at 1100° F. The turbine exhaust and a portion of the heat exchange system exhaust are transported to the solar receiver, where they are heated to 1800° F. A portion of the solar receiver-heated air can be transported to the thermal storage system (similar to a cowper stove) for storage. The balance of the solar receiver-heated air is passed to the two-stage heat exchanger, where it is used to heat the compressed air upstream. It should be noted that other components, such as a startup combustor and/or a thermal recovery unit, could also be included in this example.

Example 3

Figure 10C:
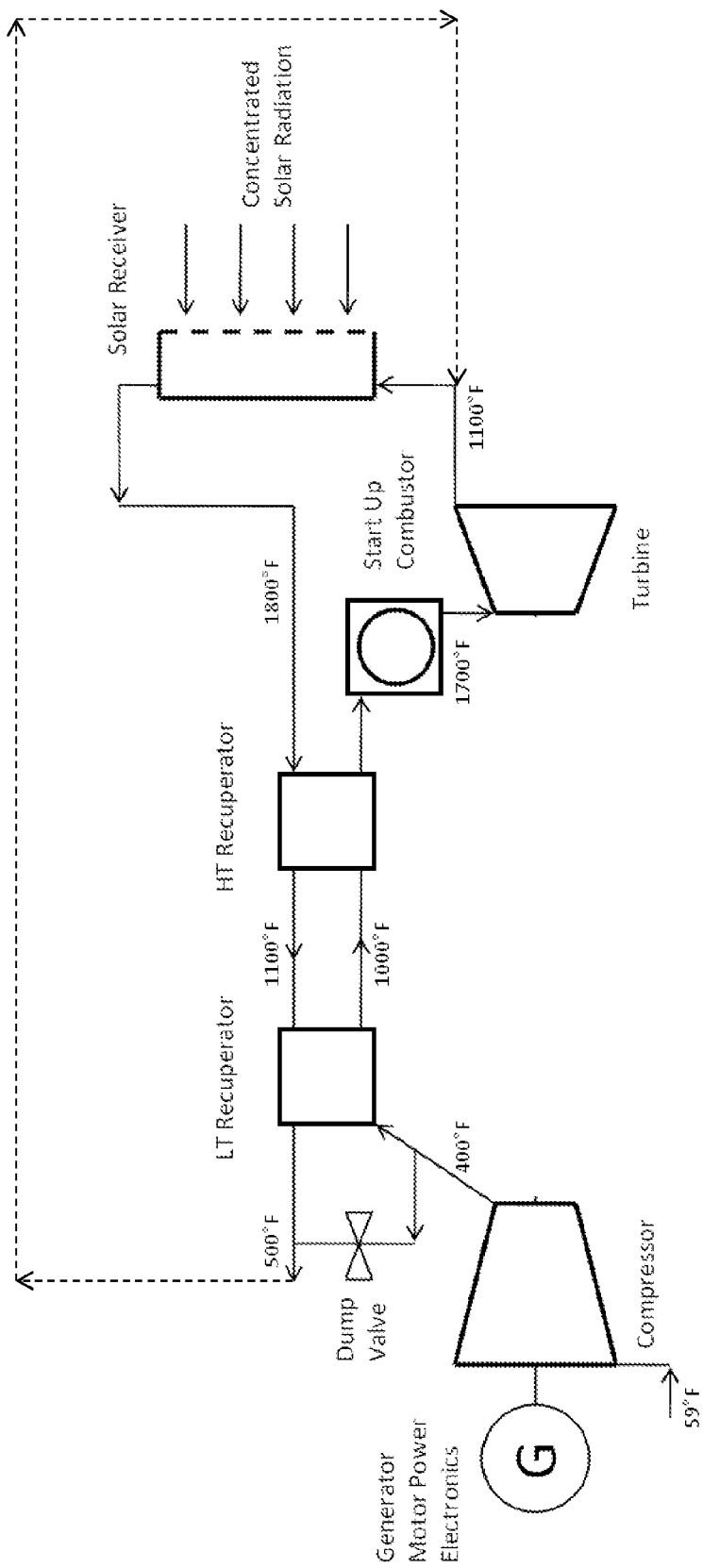

This example describes a concentrated solar power generation system in which thermal storage is not included. FIG. 10C includes a schematic diagram of the exemplary system. Air is used as the fluid in this system, and the temperatures of process streams are indicated in the figure. Similar to the system described in Example 1, ambient air at 59° F. is supplied to the compressor, where it is compressed and heated to a temperature of 1700° F. in a heat exchange system comprising one, two or more recuperator heat exchangers. The 1700° F. air is passed through a turbine to generate power, which produces an exhaust stream at 1100° F. The turbine exhaust (and optionally, a portion of the heat exchange system exhaust) is transported to the solar receiver, where they are heated to 1800° F. The solar receiver-heated air is then passed to the two-stage heat exchanger, where it is used to heat upstream compressed air.

Example 4

Figure 10D:
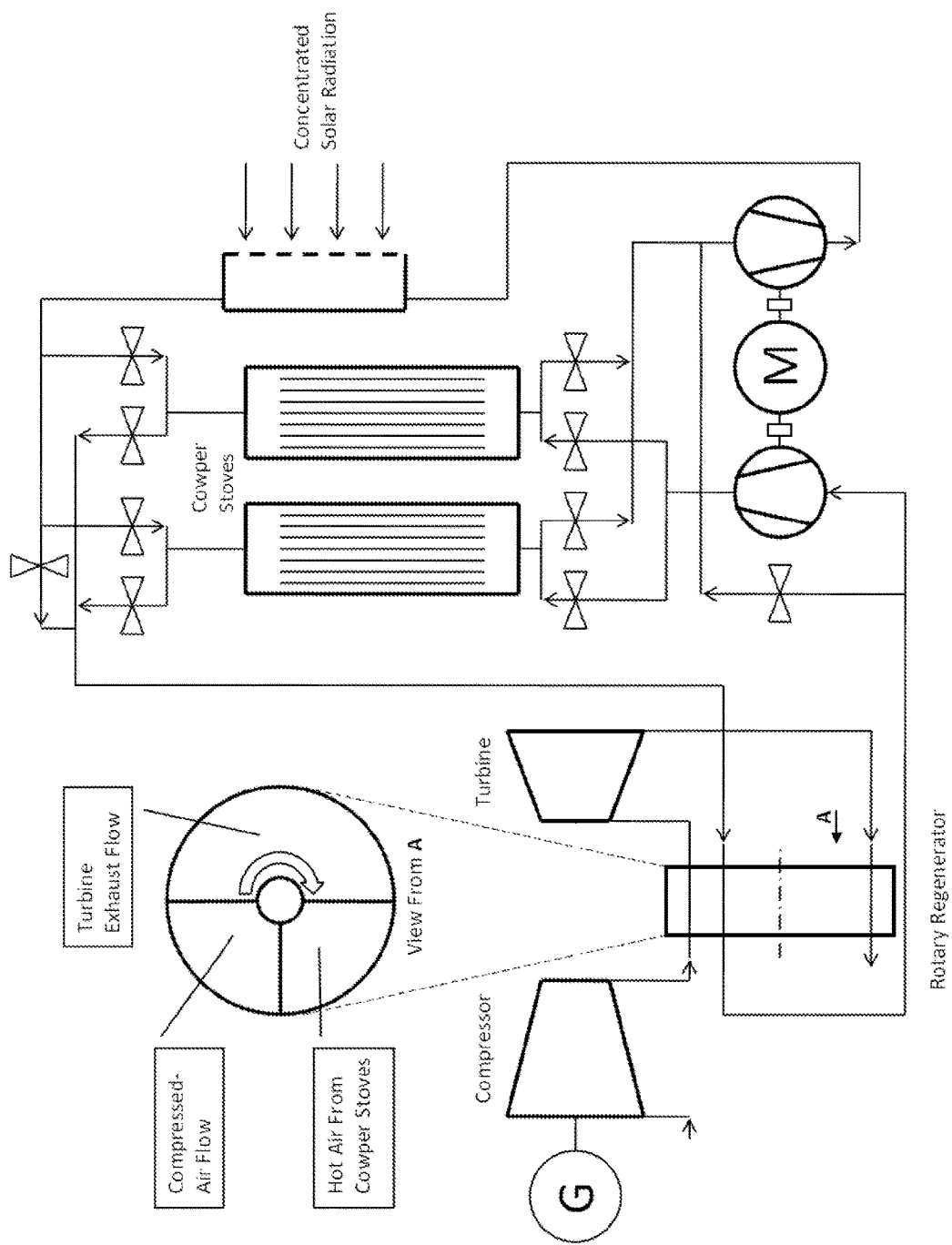

This example describes a concentrated solar power generation system in which one, two or more thermal storage units and one, two or more rotary heat exchangers are used within the system. FIG. 10D includes a schematic diagram of the exemplary system. In this example, rather than using a two-stage heat exchanger to heat the compressed air from the compressor, a single rotary heat exchanger is used. A cross-sectional view of the rotary heat exchanger is shown in the upper-left corner of the figure.

FIG. 10D also includes two thermal storage units. The units can be configured such that none, one, or both of the units is able to accept heated air from the solar receiver and/or provide heated air to the rotary regenerator for heating the compressed air stream to the turbine.

Example 5

Figure 10E:
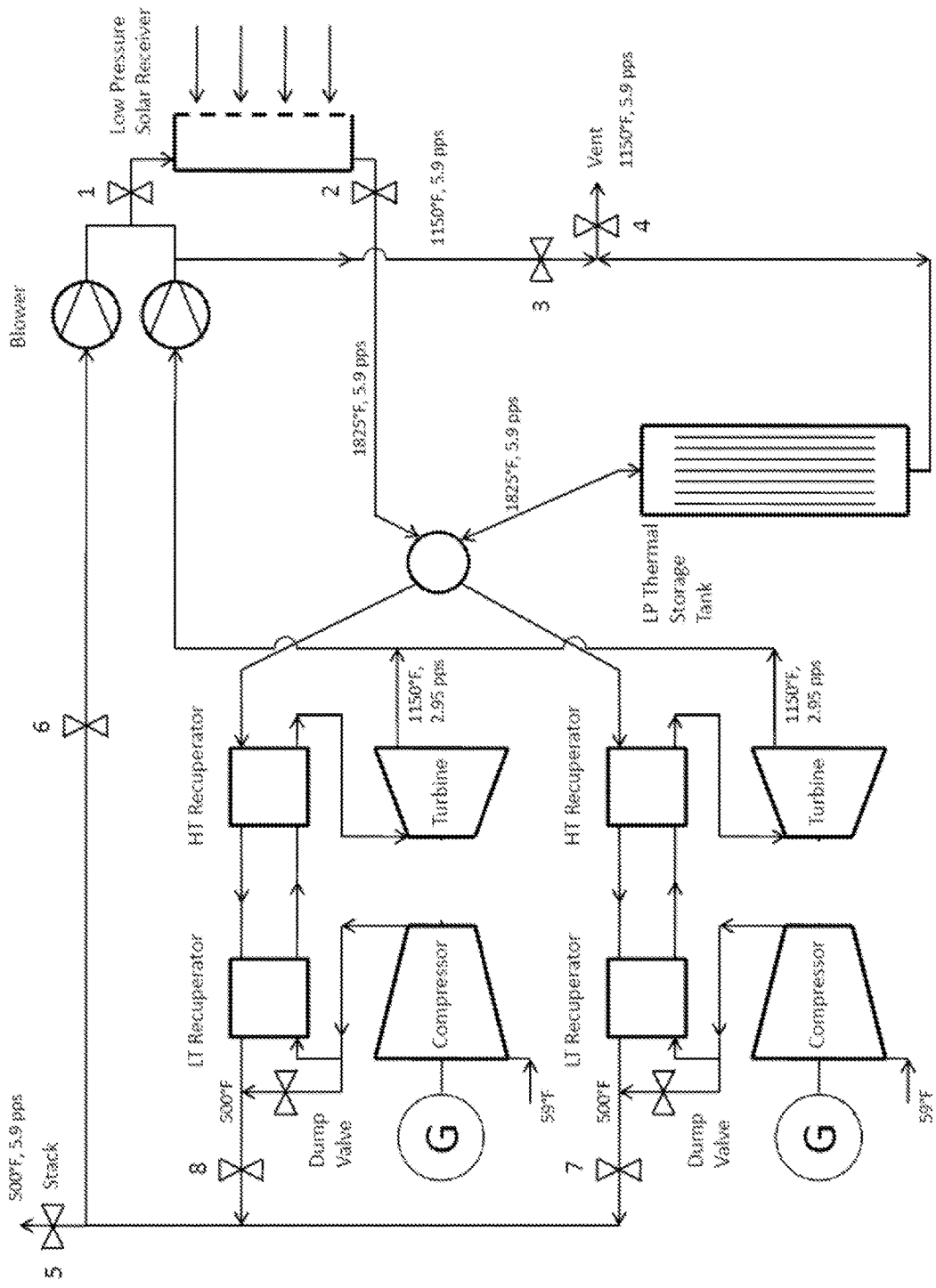

This example describes a concentrated solar power generation system in which two or more compressors and two or more turbines are used to produce energy. FIG. 10E includes a schematic diagram of the exemplary system. As in the previous examples, stream temperatures are provided in the figure.

Example 6

Figure 10F:
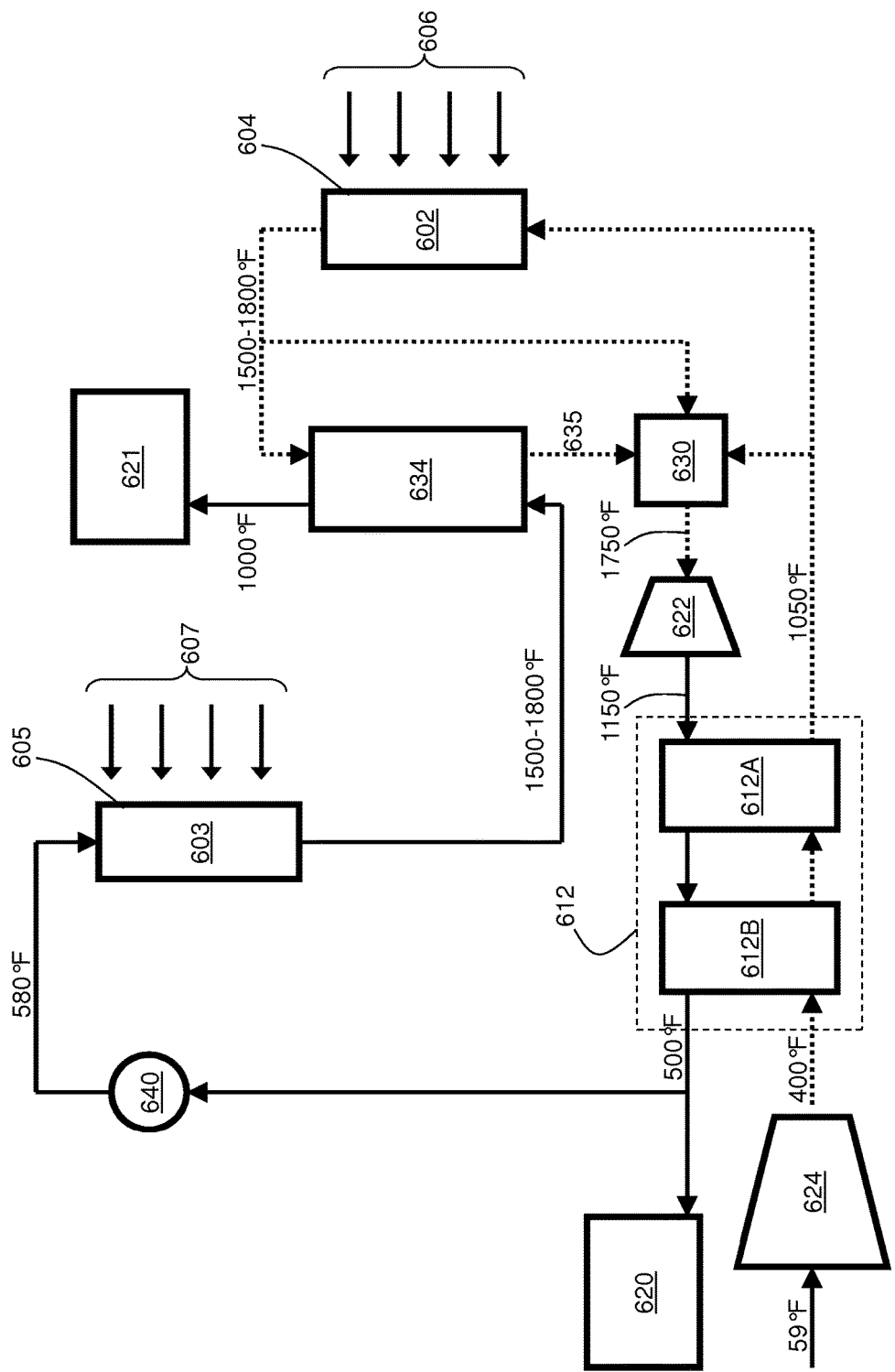

This example describes a concentrated solar power generation system in which a high-pressure solar receiver and a low-pressure solar receiver are used in a single system. FIG. 10F includes a schematic diagram of the exemplary system. As in the previous examples, stream temperatures are provided in the figure. The layout of the components in this example is similar to the layout described in association with FIG. 10E.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B", when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A solar receiver system comprising:
   a low pressure fluid chamber comprising a fluid inlet, a fluid outlet, and an opening for receiving concentrated solar radiation;
   a solar absorber housed within the low pressure fluid chamber;
   a transparent object that defines at least a portion of a wall of the low pressure fluid chamber;
   a gas turbine having an inlet and an exhaust outlet;
   a first fluidic pathway fluidically connected to the fluid outlet of the low pressure fluid chamber; and
   a second fluidic pathway positioned to receive heat transferred from the first fluidic pathway, the second fluidic pathway being connected to the inlet of the gas turbine;

wherein the fluid inlet of the low pressure fluid chamber is fluidically connected with the exhaust outlet of the gas turbine via one or more conduits to receive a substantially uncompressed fluid having a pressure of between 0.9 and 1.1 ATM into the low pressure fluid chamber; and wherein concentrated solar radiation received through the opening passes through the transparent object into the low pressure fluid chamber and impinges upon the solar absorber, and wherein the low pressure fluid chamber defines a fluid flow path from the fluid inlet to the fluid outlet, wherein, between the fluid inlet and the fluid outlet, the fluid flow path extends across at least a portion of the transparent object and through one or more passages within the solar absorber.

2. The solar receiver system of claim 1, wherein the transparent object has a parabolic shape.

3. The solar receiver system of claim 1, wherein the transparent object has a radius of curvature of 1 foot to 50 feet.

4. The solar receiver system of claim 1, wherein the transparent object has a diameter in a range of 1 meter to 5 meters.

5. The solar receiver system of claim 1, wherein the transparent object has a thickness in a range of 0.5 inch to 4 inches.

6. The solar receiver system of claim 1, wherein the maximum allowable working pressure of the low pressure fluid chamber is equal to or less than 2 atm.

7. The solar receiver system of claim 1, wherein the transparent object is quartz or silica glass.

8. The solar receiver system of claim 1, wherein the solar absorber comprises a plurality of segments.

9. The solar receiver system of claim 1 further comprising a secondary concentrator connected to the low pressure fluid chamber at the opening.

10. The solar receiver system of claim 9, wherein the secondary concentrator is configured with a plurality of reflective panels arranged such that incident solar radiation impinging the reflective panels is reflected toward the transparent object.

11. The solar receiver system of claim 1, wherein the low pressure fluid chamber contains the substantially uncompressed fluid having a pressure of between 0.9 and 1.1 ATM that is heated by concentrated solar radiation within the chamber.

12. The solar receiver system of claim 1, wherein the gas turbine is constructed and arranged to produce power generated through using a Brayton cycle.

13. A concentrated solar power generation system, comprising:

a solar receiver, comprising,
 a fluid chamber comprising a fluid inlet, a fluid outlet, and an opening for receiving concentrated solar radiation;
 a solar absorber housed within the fluid chamber;
 a transparent object that defines at least a portion of a wall of the fluid chamber, wherein concentrated solar radiation received through the opening passes through the transparent object into the fluid chamber and impinges upon the solar absorber to produce a heated first fluid having a first pressure;

a heat exchange system comprising a heat exchange unit positioned downstream of the solar receiver having an inlet fluidically connected to the fluid outlet of the fluid chamber, the heat exchange system being configured to transfer heat from the heated first fluid to a second fluid having a second pressure, the second pressure being greater than the first pressure to provide a heated second fluid; and a gas turbine in fluid communication with and downstream of an outlet of the heat exchange system, configured to receive the heated second fluid at a gas turbine inlet, wherein the gas turbine further comprises a gas turbine exhaust outlet fluidically connected to the fluid inlet of the fluid chamber via one or more conduits, to deliver a substantially uncompressed fluid having a pressure of between 0.9 and 1.1 ATM to the fluid chamber.

14. The system of claim 13, further comprising a thermal storage system configured to receive at least a portion of the heated first fluid, and wherein the outlet of the solar receiver is fluidically connected to the thermal storage system.

15. The system of claim 14, wherein the thermal storage system comprises an outlet fluidically connected to the inlet of the heat exchange system.

16. The system of claim 13, wherein the gas turbine is configured to generate power using a Brayton cycle.

* * * * *

UNITED STATES PATENT AND TRADEMARK OFFICE
CERTIFICATE OF CORRECTION

| | | |
|---|---|---|
| PATENT NO. | : 9,726,155 B2 | |
| APPLICATION NO. | : 13/823013 | |
| DATED | : August 8, 2017 | |
| INVENTOR(S) | : Bruce N. Anderson et al. | |

It is certified that error appears in the above-identified patent and that said Letters Patent is hereby corrected as shown below:

In the Specification

At Column 1, Line 52, "minors" should read --mirrors--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*